(12) United States Patent
Leuthardt et al.

(10) Patent No.: US 9,076,203 B2
(45) Date of Patent: Jul. 7, 2015

(54) IMAGE GUIDED SURGERY WITH DYNAMIC IMAGE RECONSTRUCTION

(75) Inventors: Eric C. Leuthardt, St. Louis, MA (US);
Nathan P. Myhrvold, Medina, WA (US); Dennis J. Rivet, Portsmouth, VA (US); Michael A. Smith, Phoenix, AZ (US); Thomas A. Weaver, San Mateo, CA (US); Lowell L. Wood, Jr., Bellevue, WA (US); Victoria Y. H. Wood, Livermore, CA (US); Edward S. Boyden, Cambridge, MA (US); Roderick A. Hyde, Redmond, WA (US); Muriel Y. Ishikawa, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1511 days.

(21) Appl. No.: 11/986,785

(22) Filed: Nov. 26, 2007

(65) Prior Publication Data
US 2009/0136099 A1 May 28, 2009

(51) Int. Cl.
*G06K 9/00* (2006.01)
*G06T 7/00* (2006.01)

(52) U.S. Cl.
CPC .......... *G06T 7/0028* (2013.01); *G06K 2209/05* (2013.01); *G06T 2207/10072* (2013.01); *G06T 2207/30016* (2013.01)

(58) Field of Classification Search
CPC .......... G06K 9/20; G06K 9/224; G06T 15/00; G06T 15/08; G06T 17/00
USPC ................... 382/129, 154; 345/419; 356/396; 600/414, 426
See application file for complete search history.

(56) References Cited

U.S. PATENT DOCUMENTS

| | | | | |
|---|---|---|---|---|
| 4,793,357 A | * | 12/1988 | Lindstrom | 600/431 |
| 6,016,439 A | | 1/2000 | Acker | |
| 6,196,715 B1 | * | 3/2001 | Nambu et al. | 378/197 |
| 6,573,890 B1 | * | 6/2003 | Lengyel | 345/419 |
| 6,633,686 B1 | * | 10/2003 | Bakircioglu et al. | 382/294 |
| 7,225,012 B1 | | 5/2007 | Susil et al. | |
| 7,286,866 B2 | * | 10/2007 | Okerlund et al. | 600/407 |
| 7,457,478 B2 | * | 11/2008 | Aoyama et al. | 382/275 |
| 2001/0027271 A1 | * | 10/2001 | Franck et al. | 600/426 |
| 2003/0130576 A1 | * | 7/2003 | Seeley et al. | 600/426 |
| 2003/0212322 A1 | * | 11/2003 | Haacke | 600/410 |
| 2004/0105573 A1 | * | 6/2004 | Neumann et al. | 382/103 |
| 2004/0127788 A1 | | 7/2004 | Arata | |
| 2004/0202364 A1 | * | 10/2004 | Otani et al. | 382/154 |
| 2004/0252889 A1 | * | 12/2004 | Liu et al. | 382/190 |
| 2005/0015005 A1 | * | 1/2005 | Kockro | 600/427 |
| 2005/0031176 A1 | * | 2/2005 | Hertel et al. | 382/128 |
| 2005/0031197 A1 | * | 2/2005 | Knopp | 382/154 |
| 2005/0033108 A1 | * | 2/2005 | Sawyer | 600/9 |
| 2005/0033149 A1 | * | 2/2005 | Strommer et al. | 600/407 |
| 2005/0101855 A1 | * | 5/2005 | Miga et al. | 600/407 |
| 2005/0113961 A1 | * | 5/2005 | Sabol et al. | 700/182 |
| 2005/0197568 A1 | * | 9/2005 | Vass et al. | 600/426 |
| 2005/0203384 A1 | | 9/2005 | Sati et al. | |
| 2006/0002626 A1 | * | 1/2006 | Matsumoto | 382/276 |
| 2006/0064248 A1 | * | 3/2006 | Saidi et al. | 702/19 |
| 2006/0100508 A1 | * | 5/2006 | Morrison | 600/426 |

(Continued)

*Primary Examiner* — Michael Logie
*Assistant Examiner* — Jason McCormack

(57) ABSTRACT

A method may include processing two or more fiducials included in a three-dimensional medical image and included in a current image to generate two or more transform coefficients of a transform, and applying the transform to the three-dimensional medical image to form a present image.

38 Claims, 40 Drawing Sheets

(56) References Cited

U.S. PATENT DOCUMENTS

| | | |
|---|---|---|
| 2006/0184025 A1* | 8/2006 | Sumi .............................. 600/438 |
| 2006/0241406 A1* | 10/2006 | Noujeim ........................ 600/426 |
| 2008/0015429 A1* | 1/2008 | Tsonton et al. ................ 600/414 |
| 2008/0019581 A1* | 1/2008 | Gkanatsios et al. ........... 382/131 |
| 2008/0242978 A1* | 10/2008 | Simon et al. ................... 600/426 |
| 2008/0298672 A1* | 12/2008 | Wallack et al. ................ 382/154 |

* cited by examiner

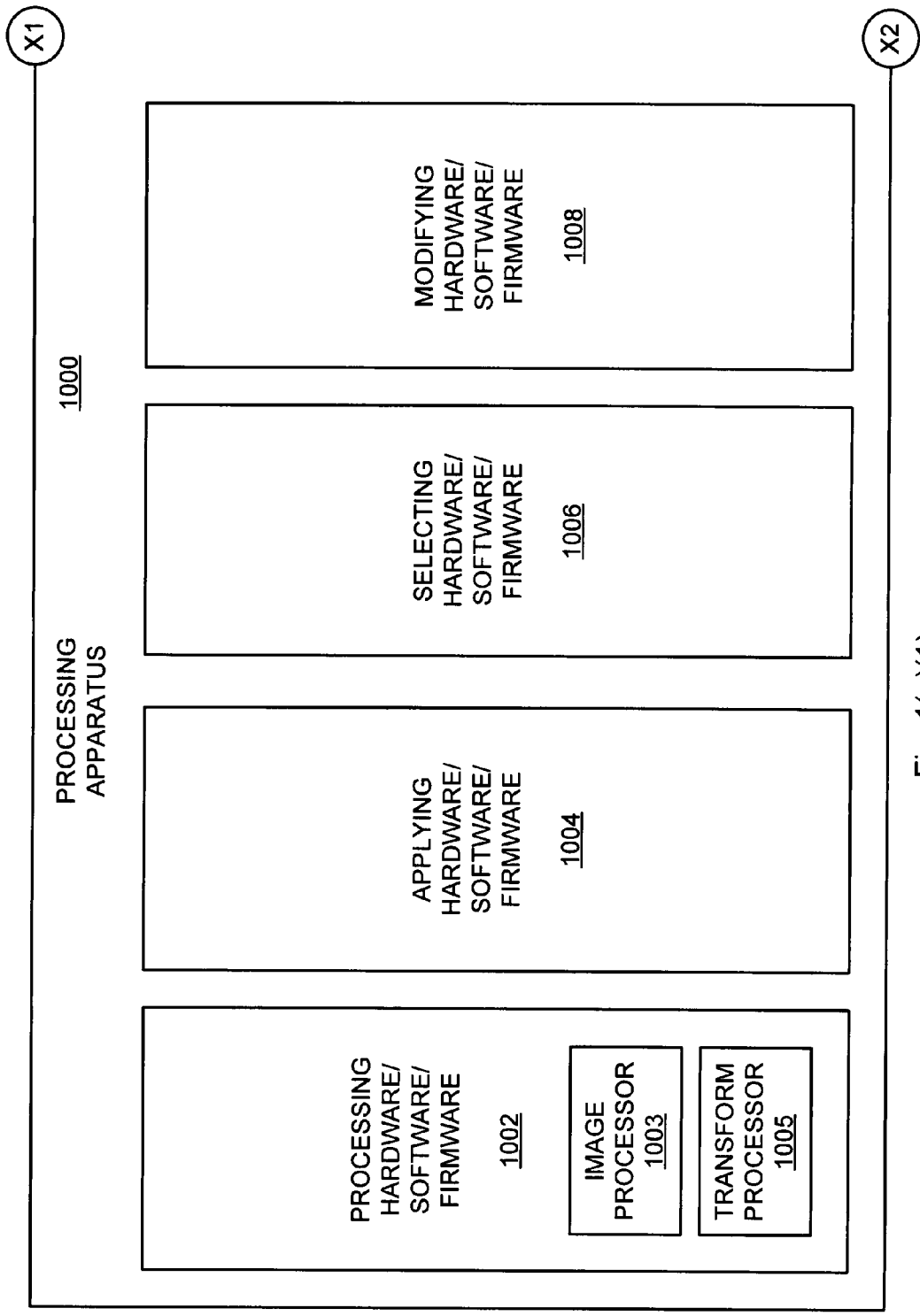
Fig. 1(a)(1)

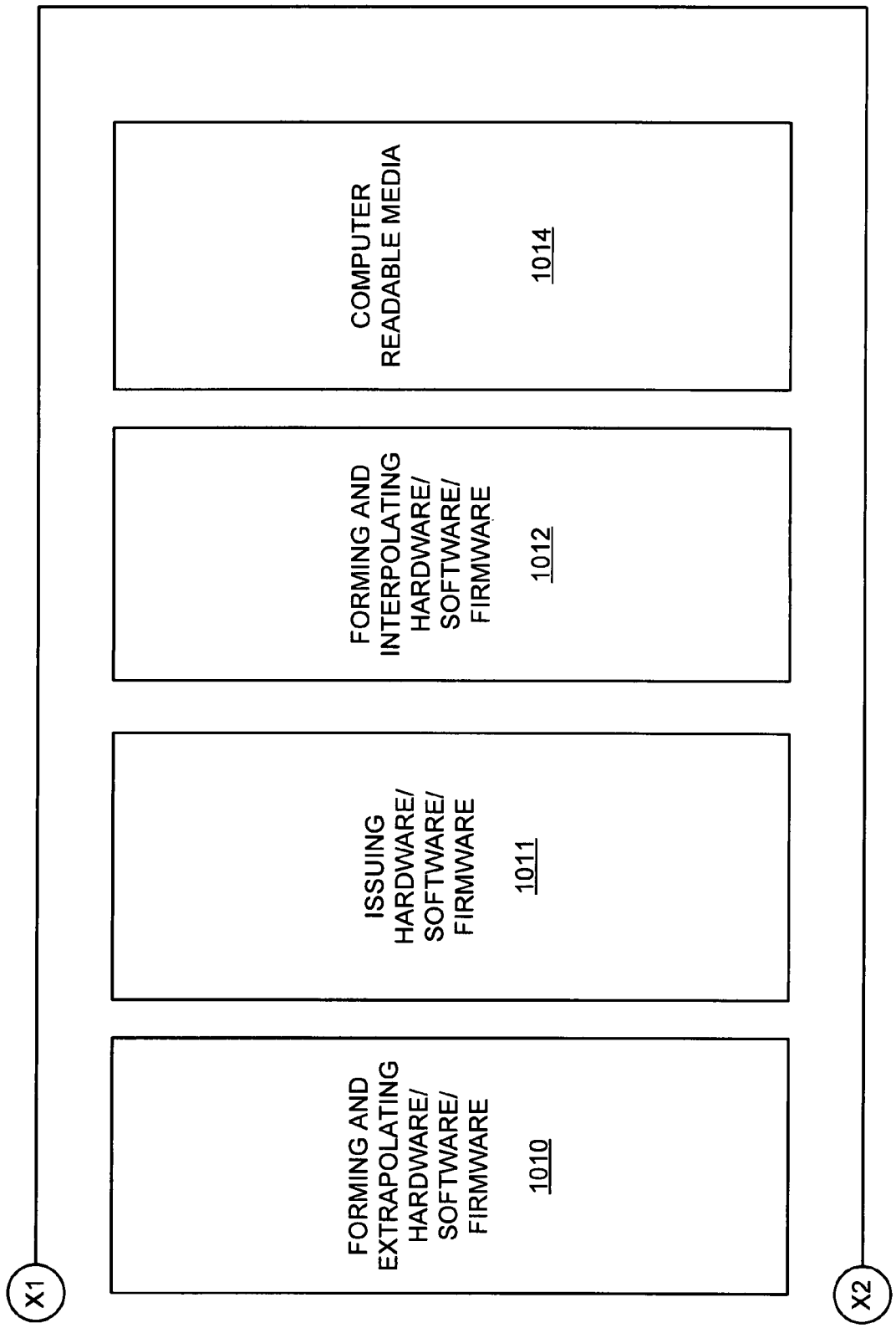
Fig. 1(a)(2)

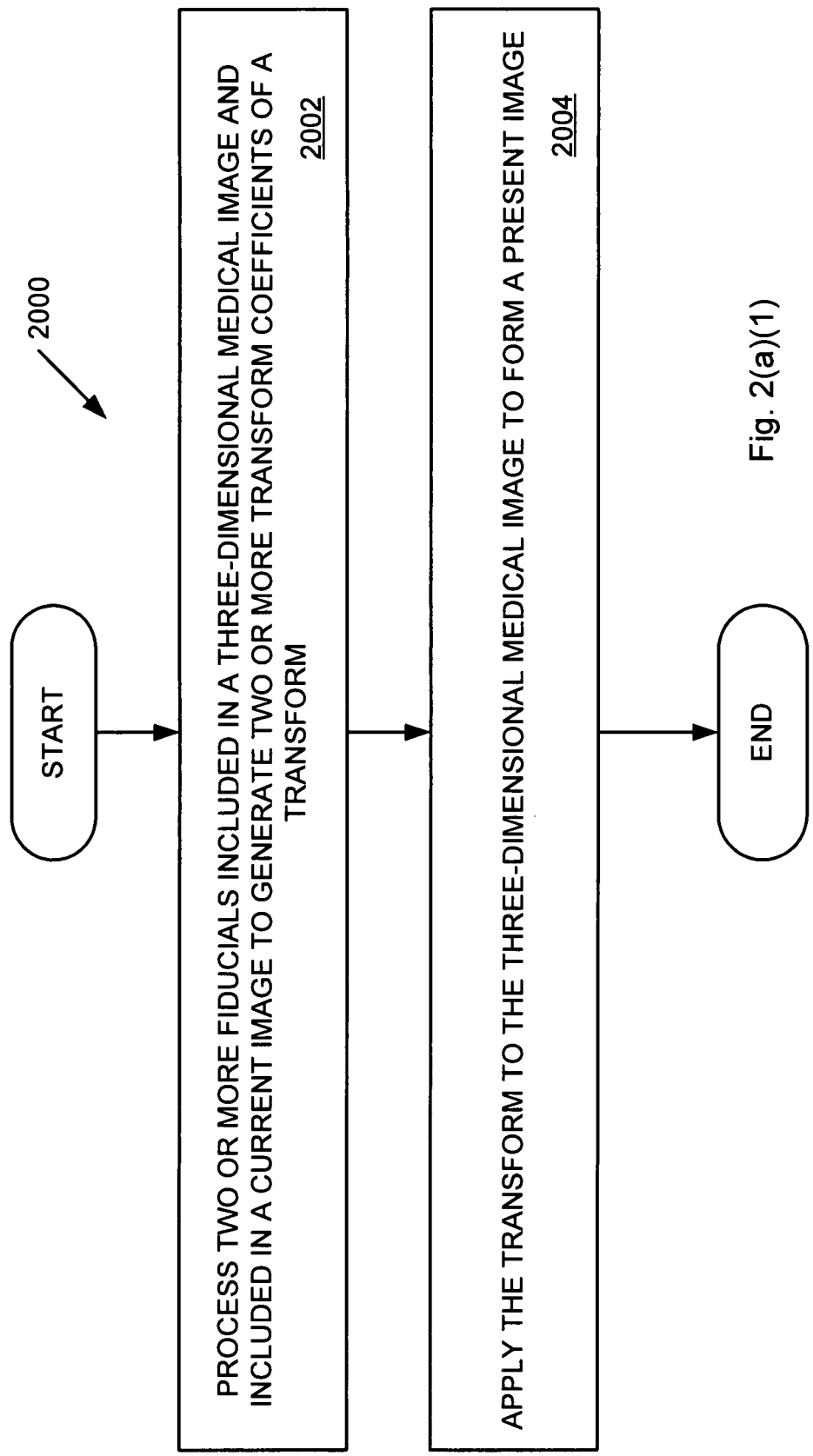

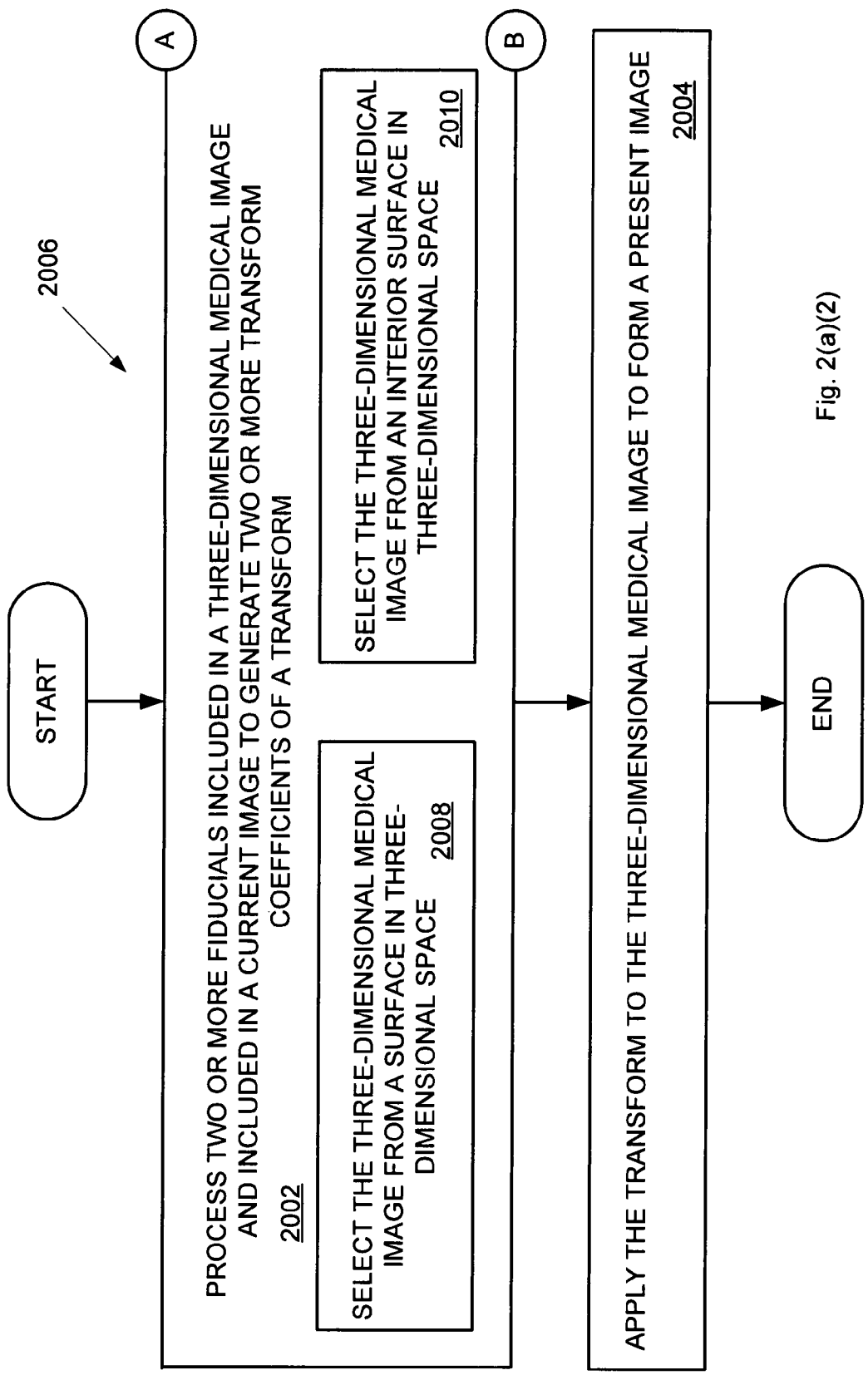
Fig. 2(a)(2)

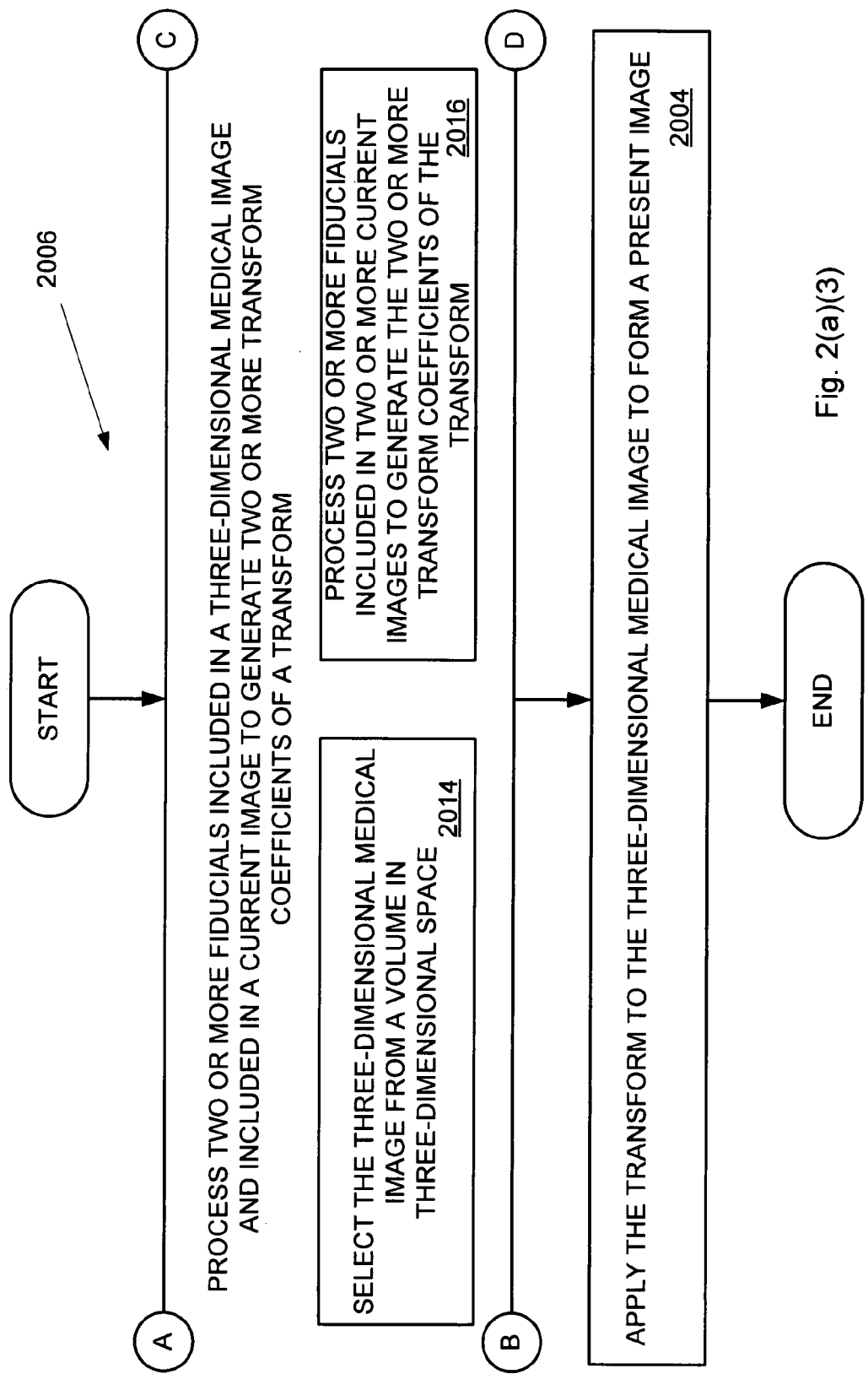

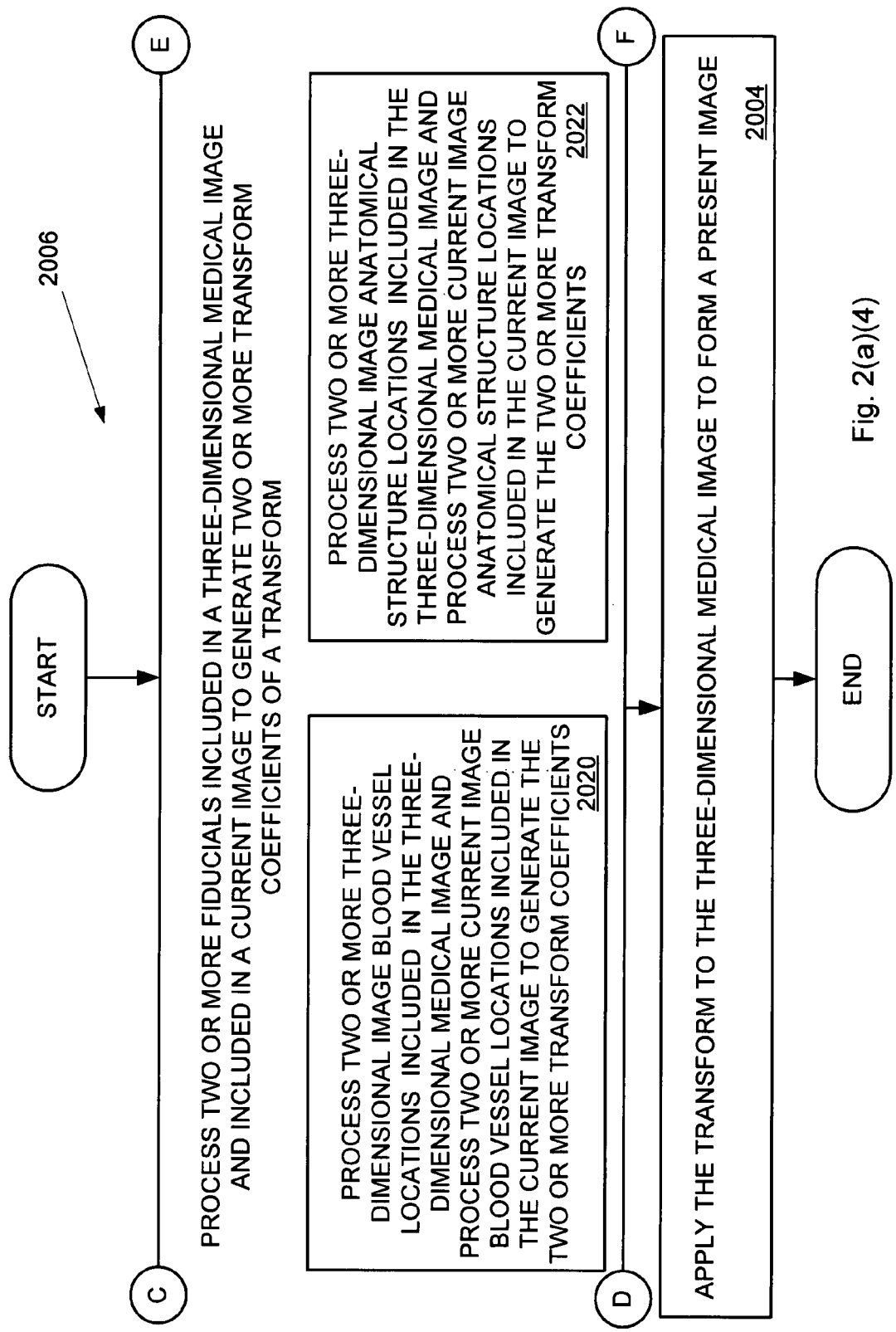
Fig. 2(a)(4)

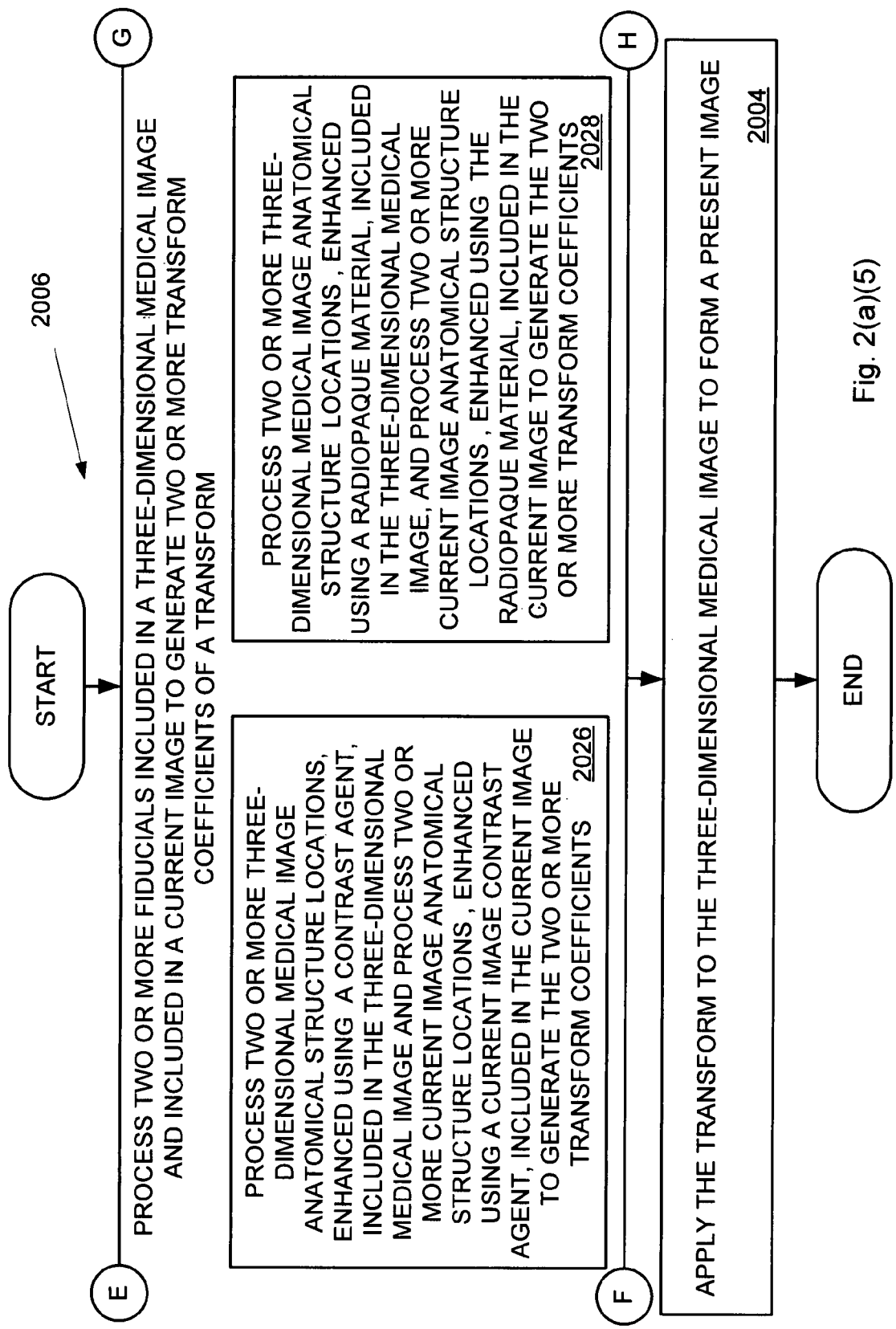
Fig. 2(a)(5)

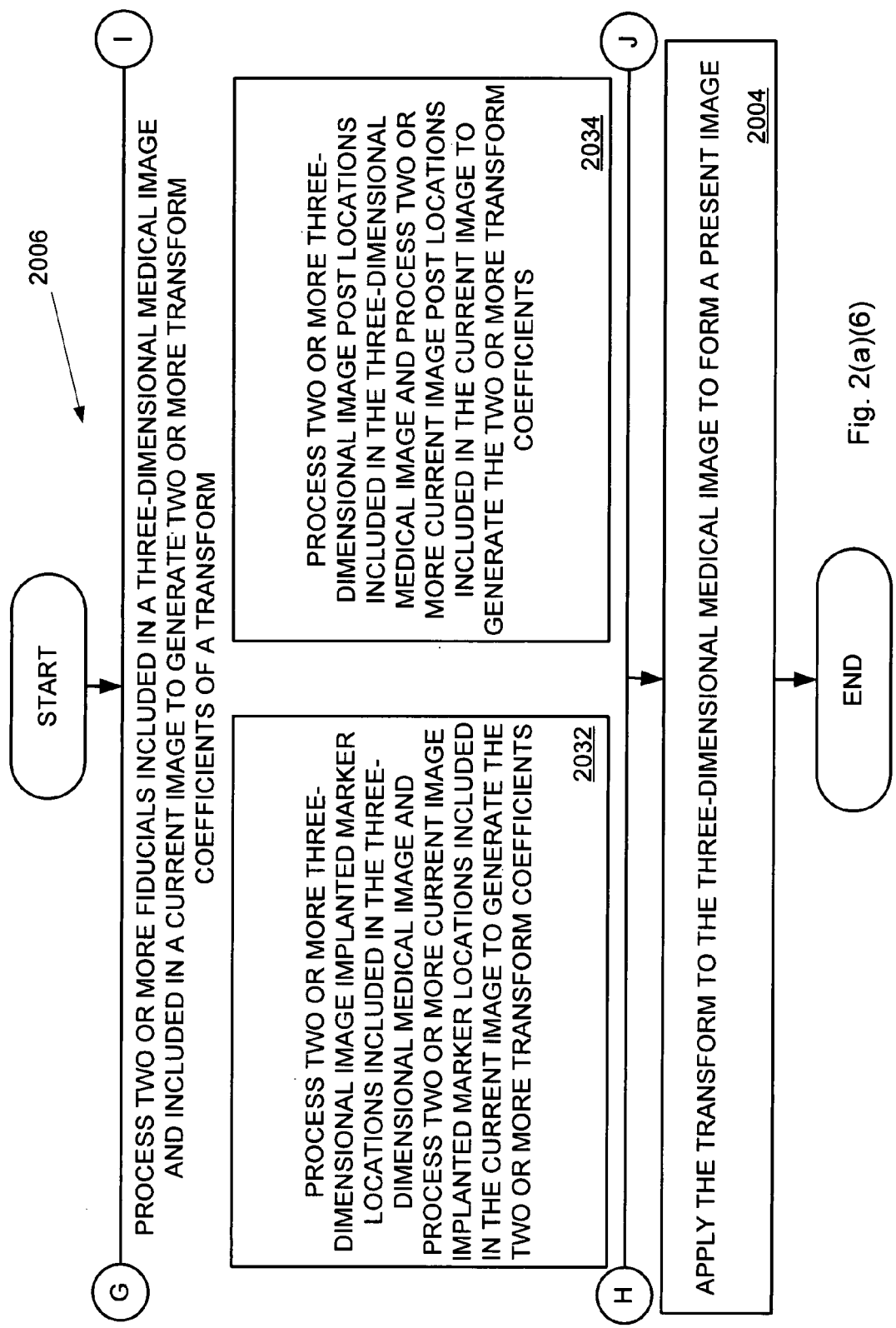
Fig. 2(a)(6)

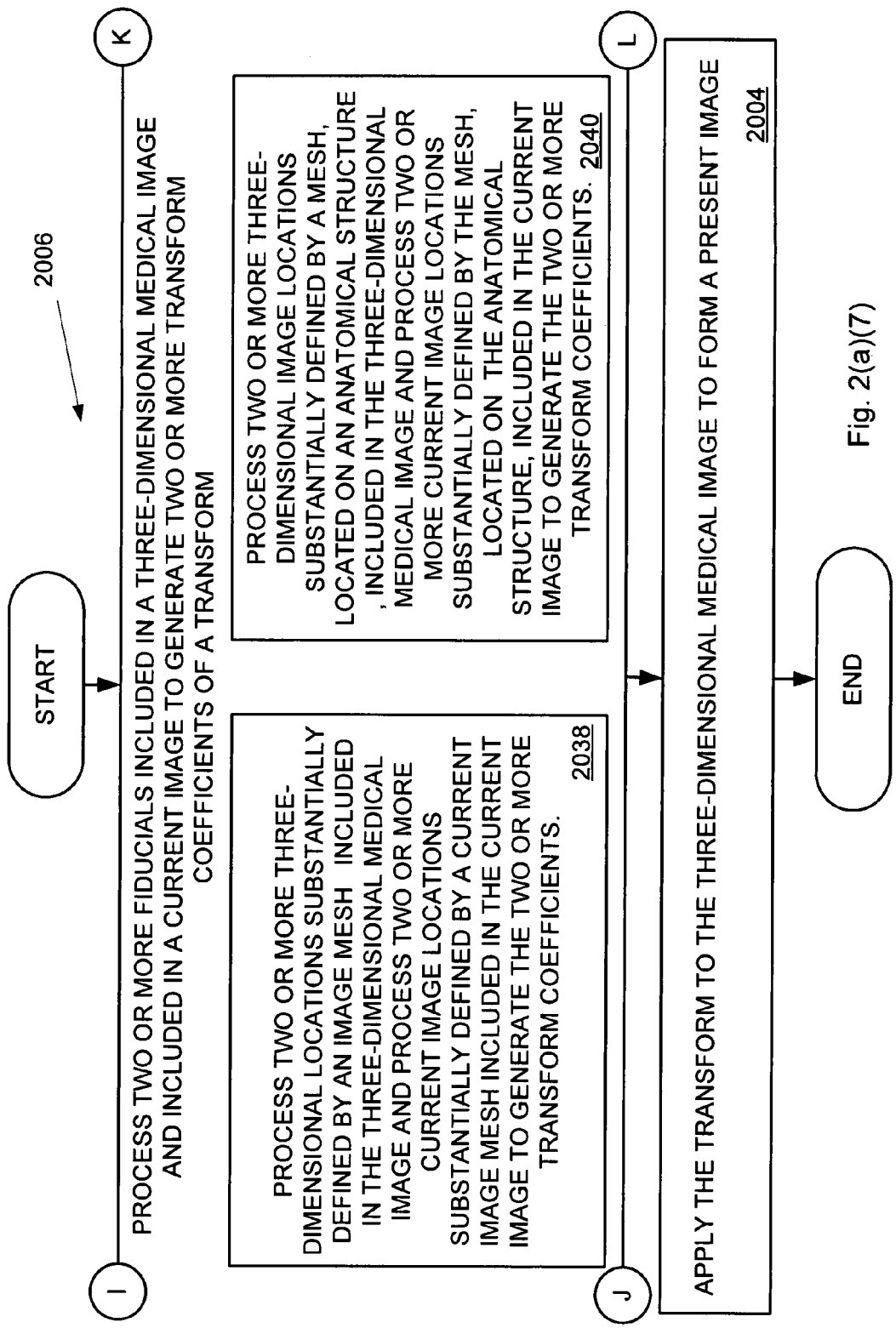
Fig. 2(a)(7)

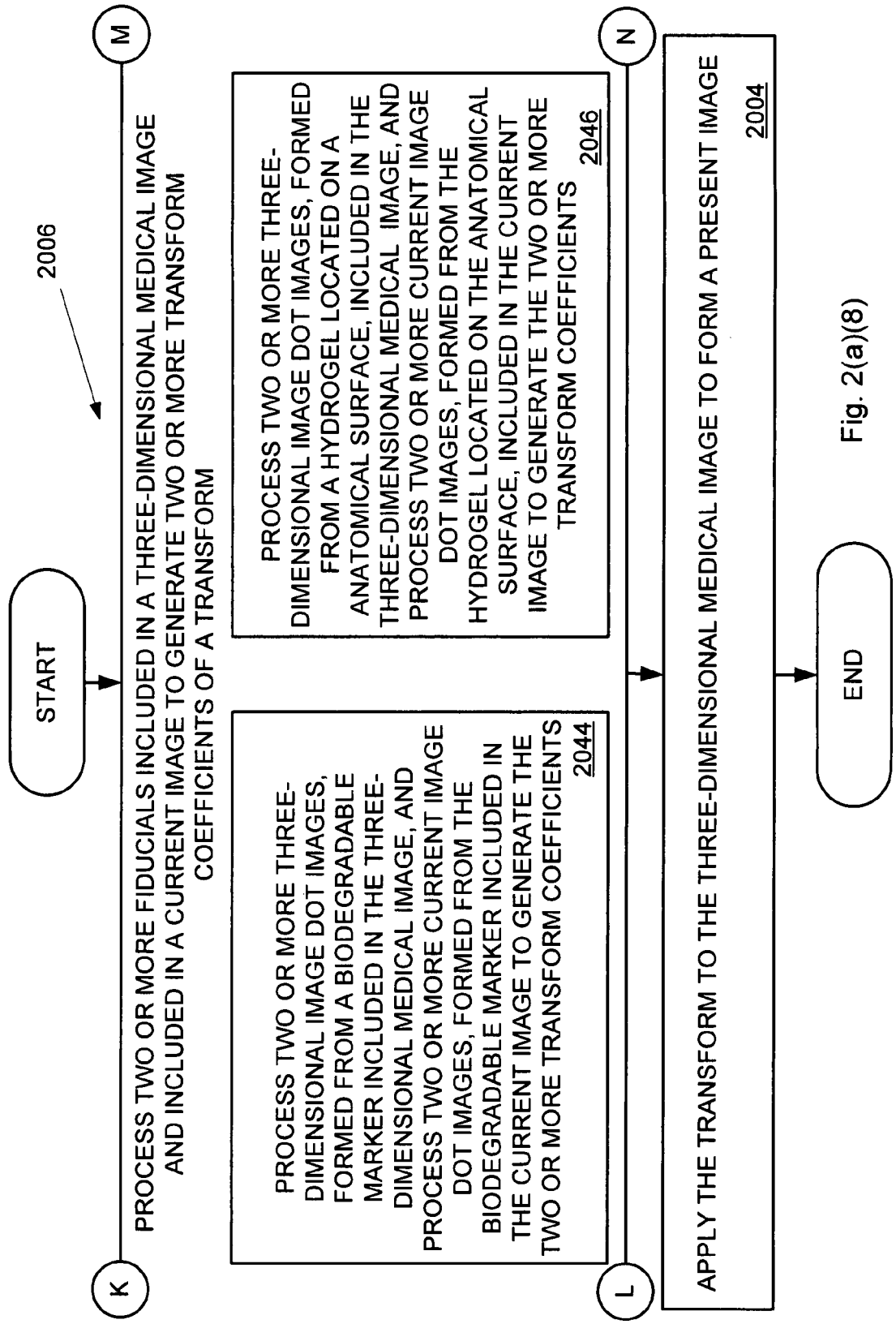
Fig. 2(a)(8)

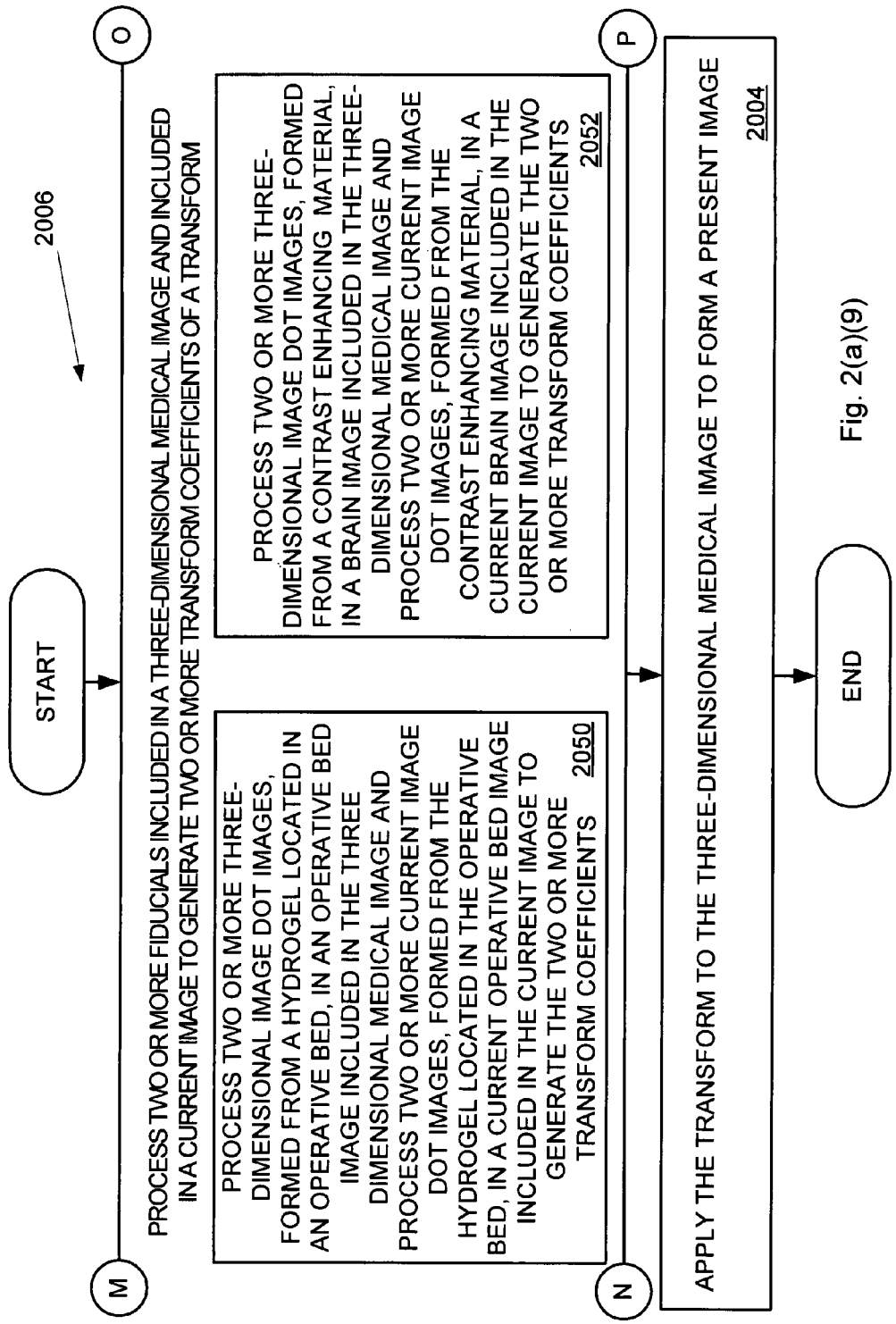
Fig. 2(a)(9)

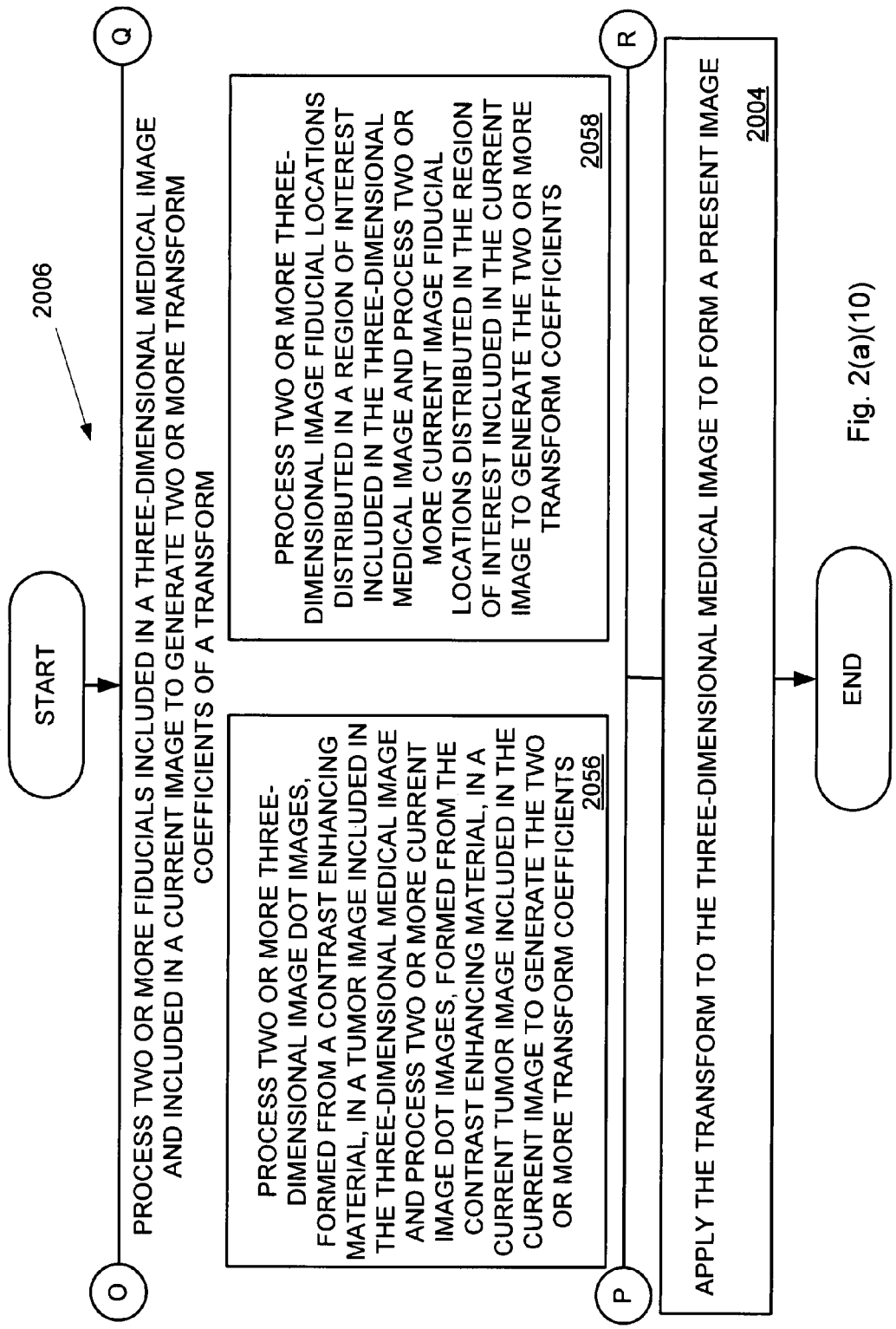
Fig. 2(a)(10)

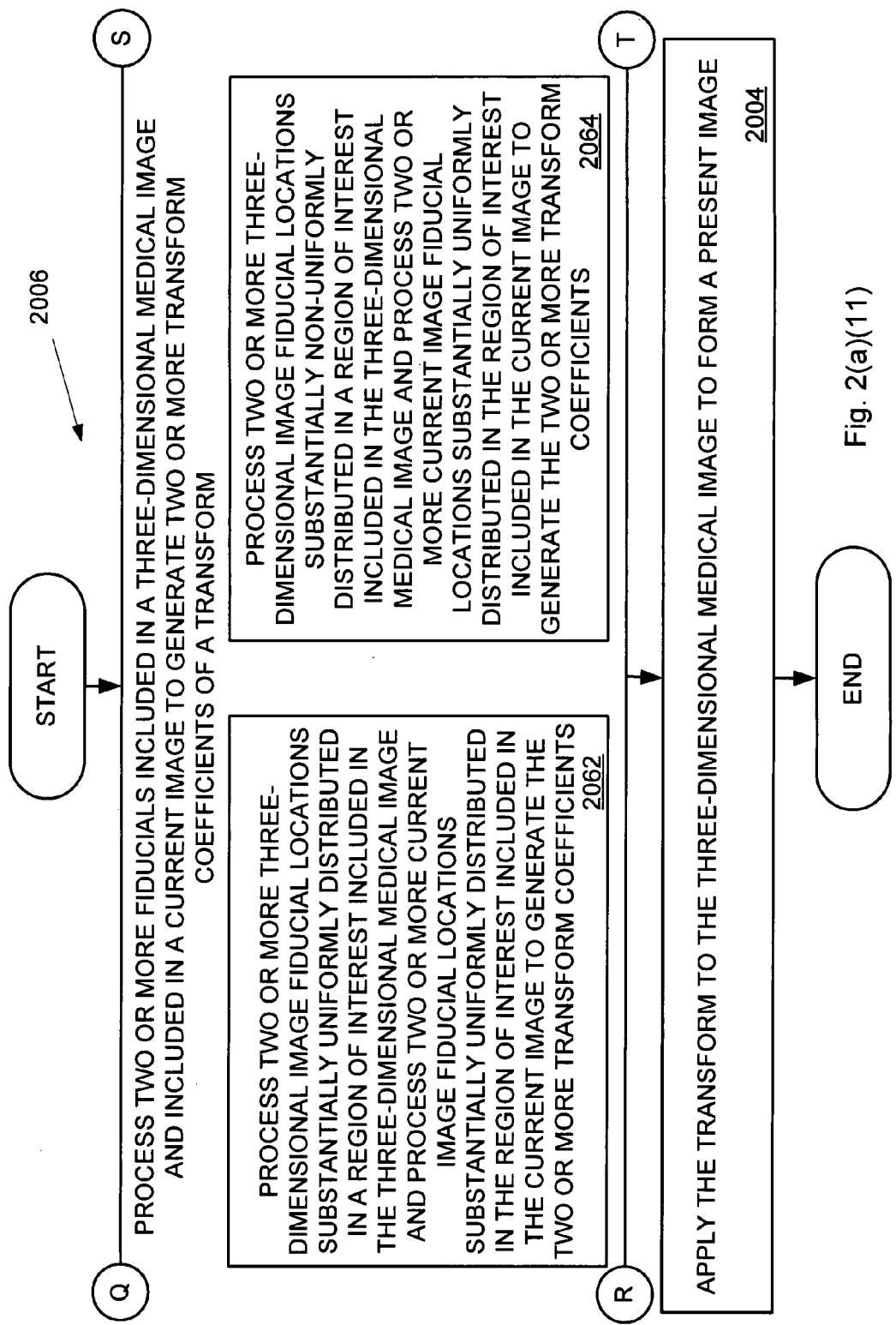
Fig. 2(a)(11)

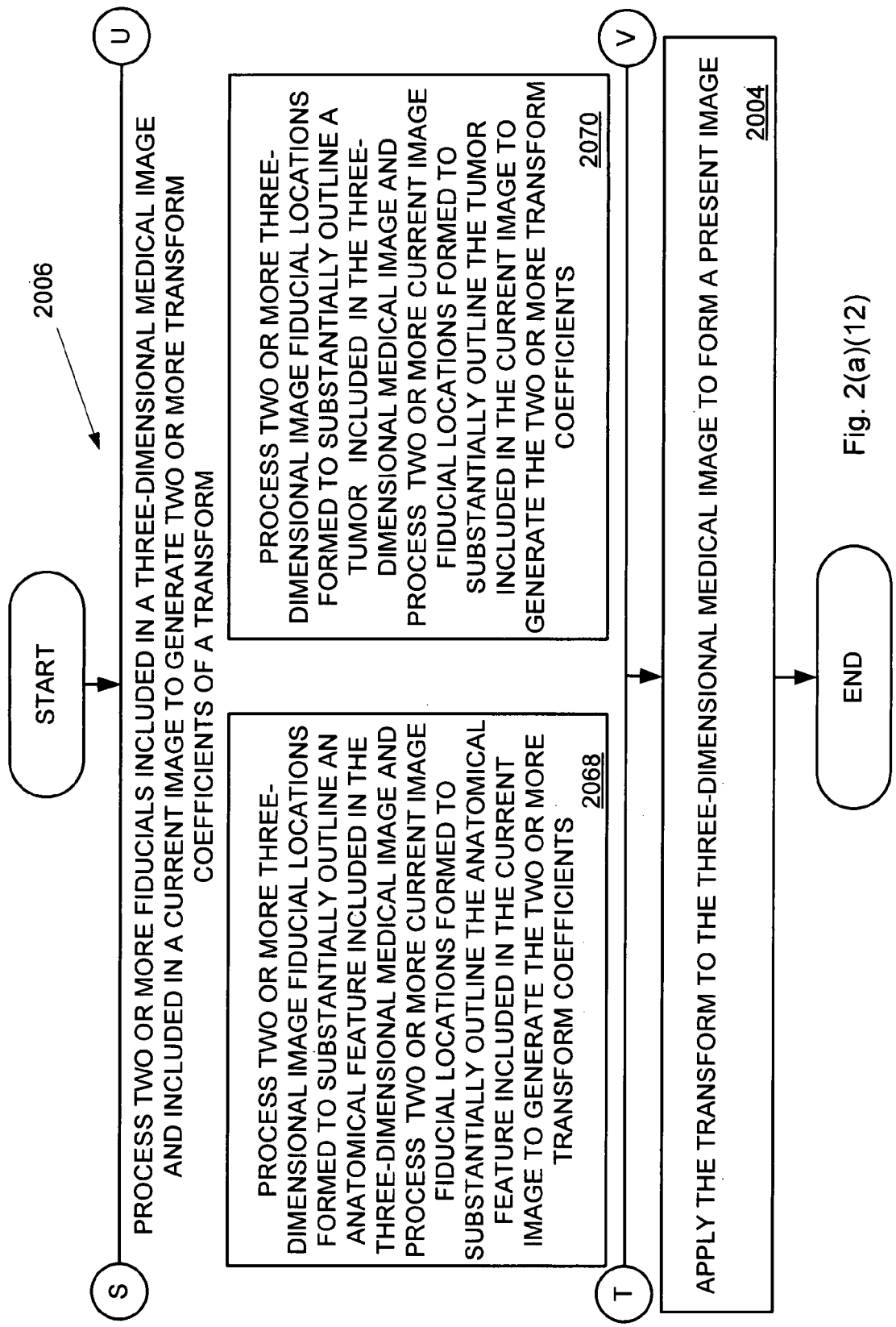

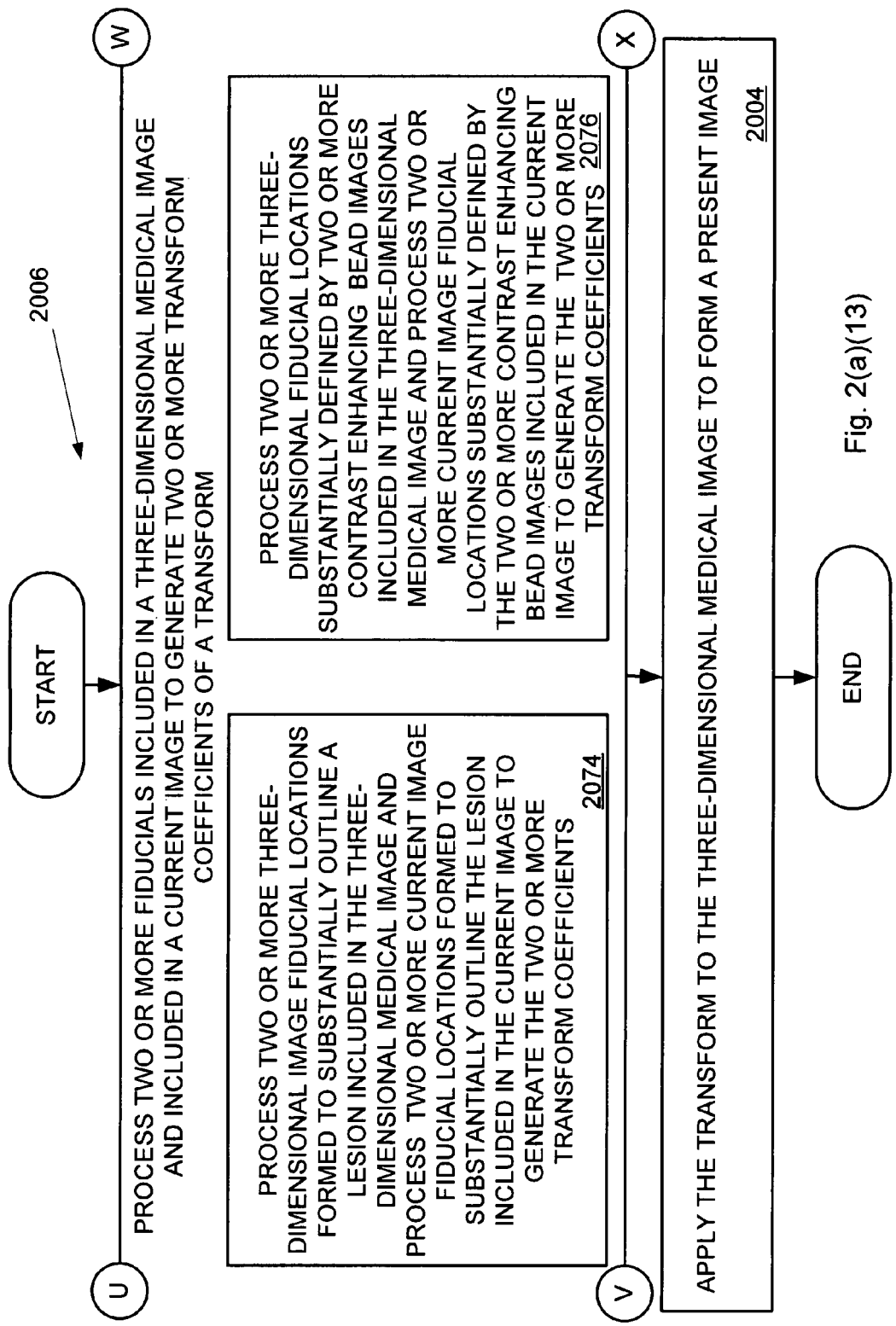
Fig. 2(a)(13)

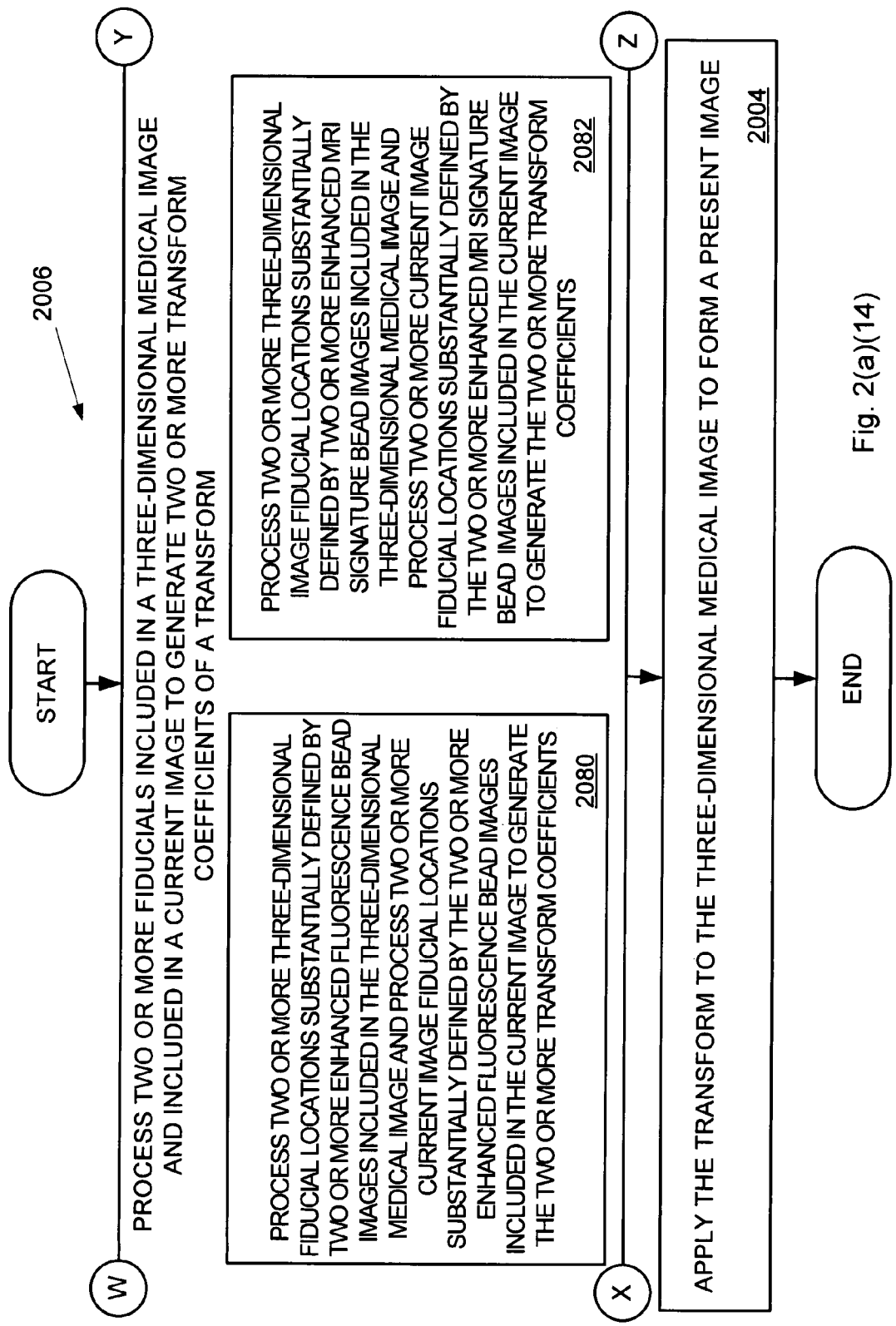
Fig. 2(a)(14)

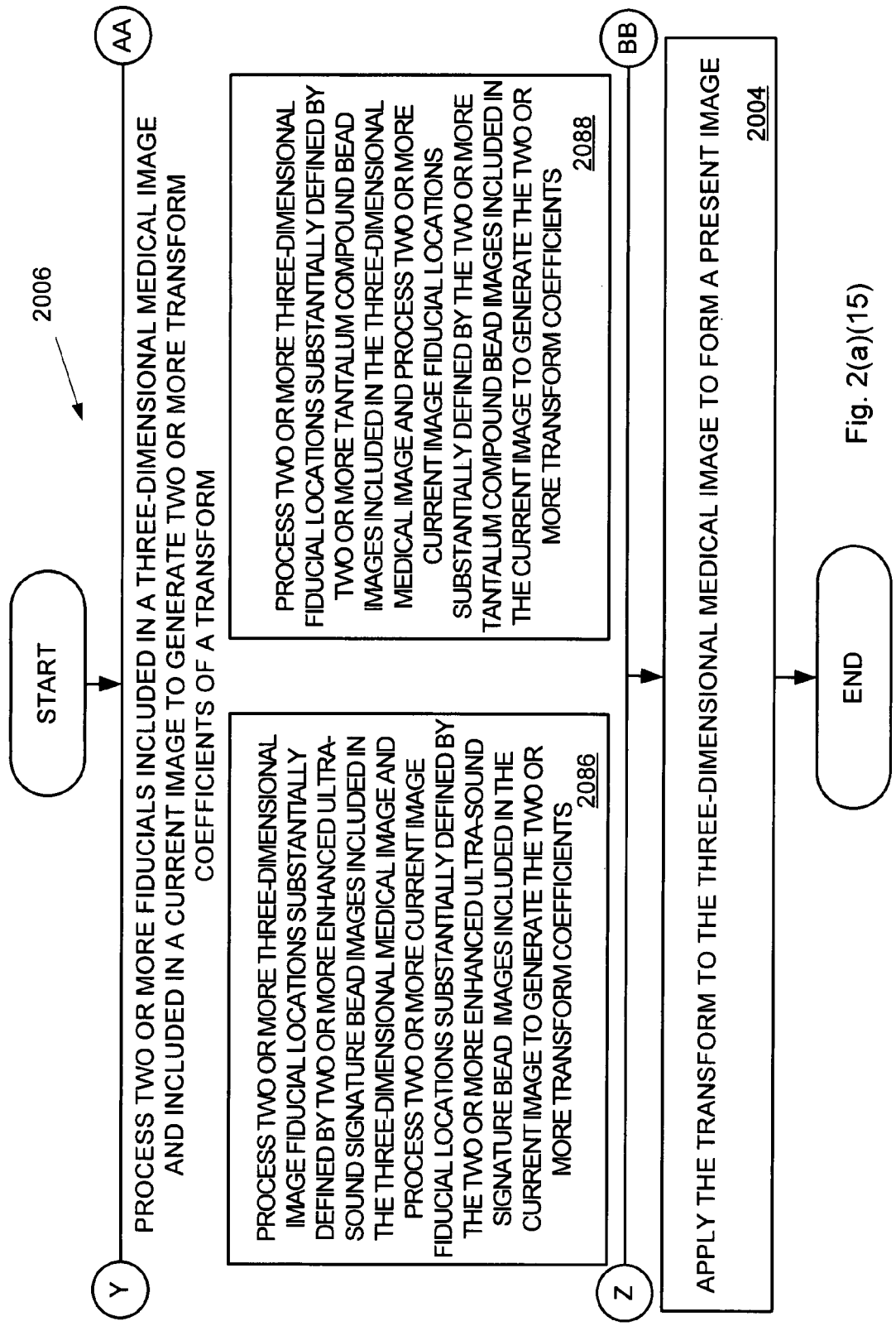
Fig. 2(a)(15)

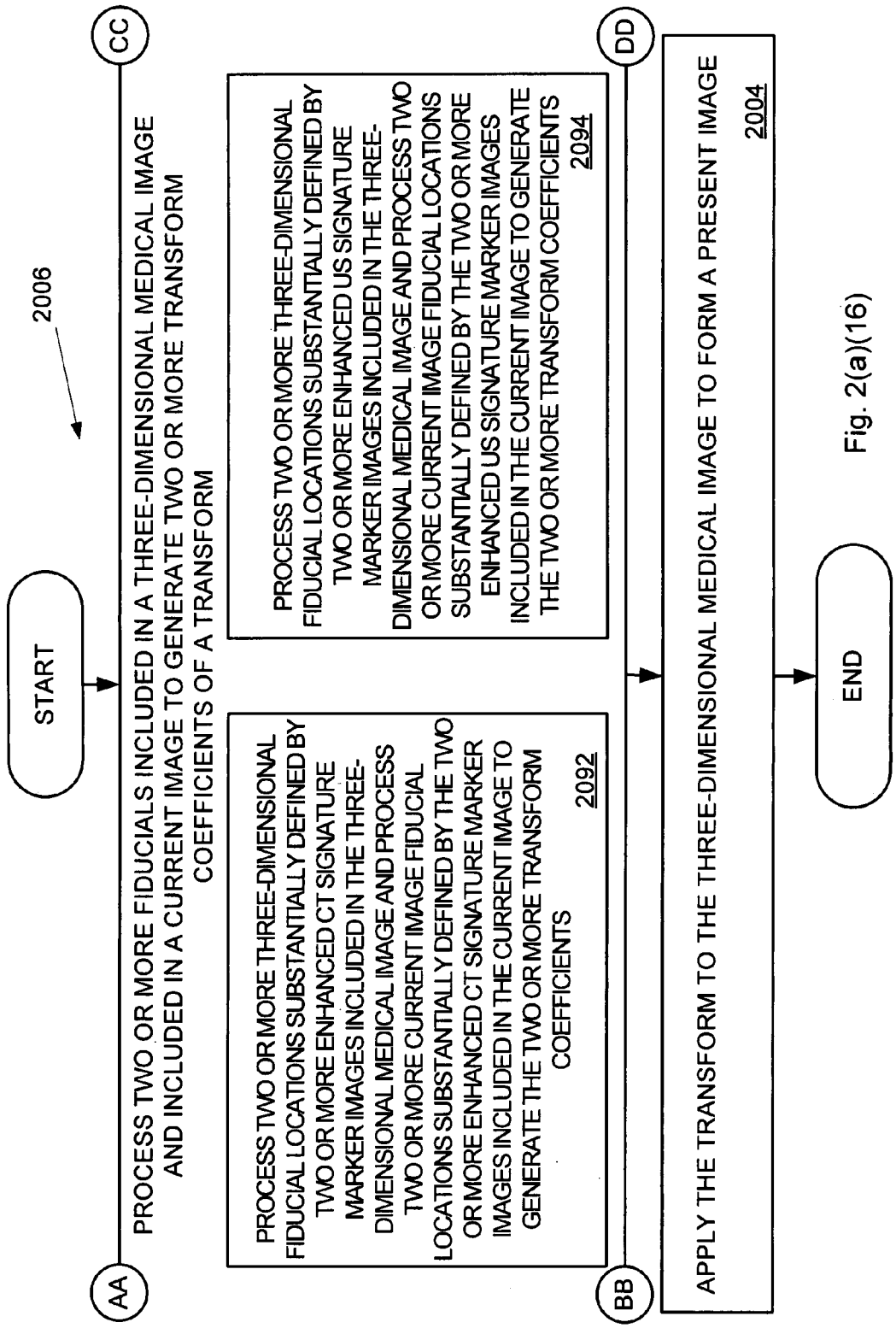
Fig. 2(a)(16)

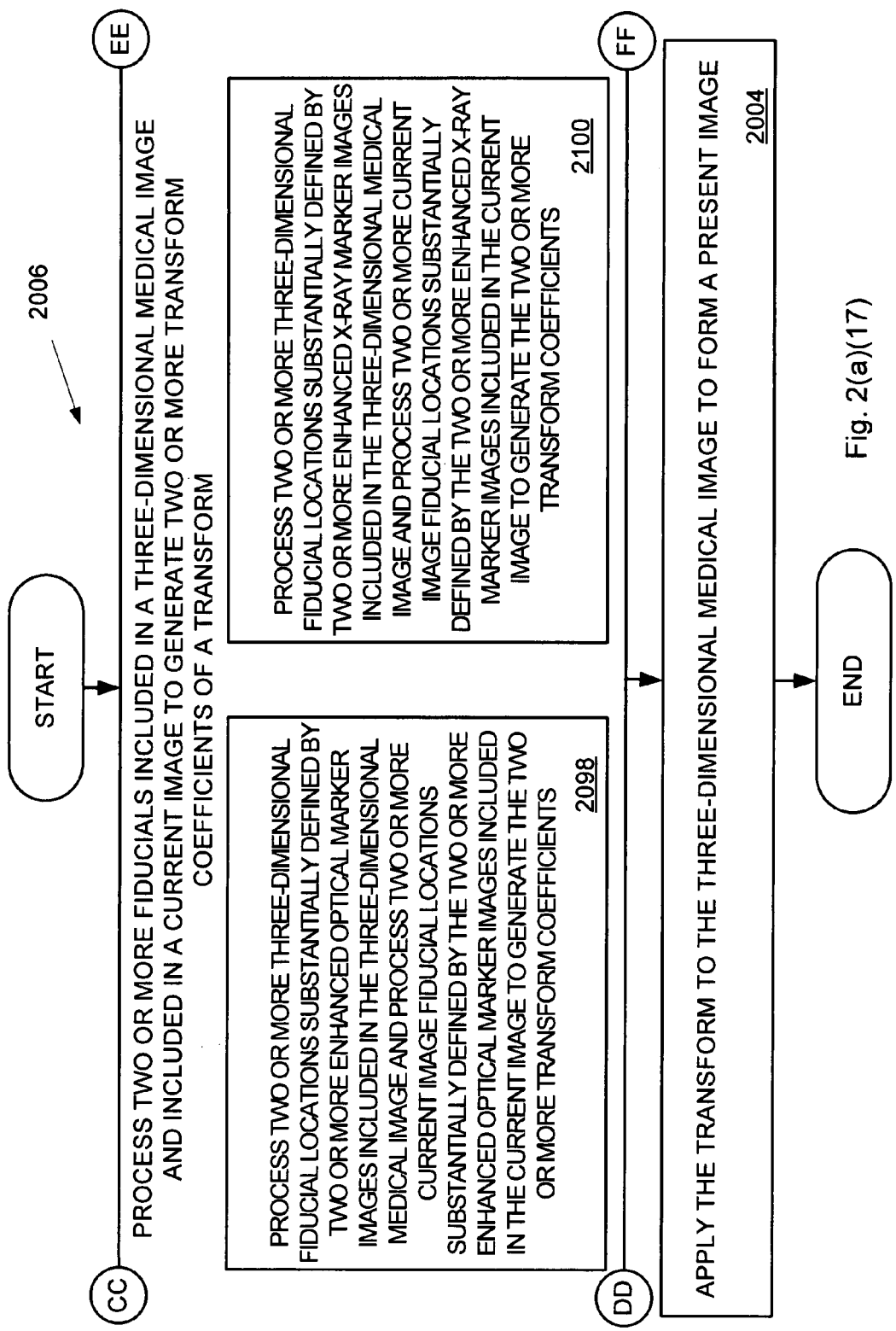

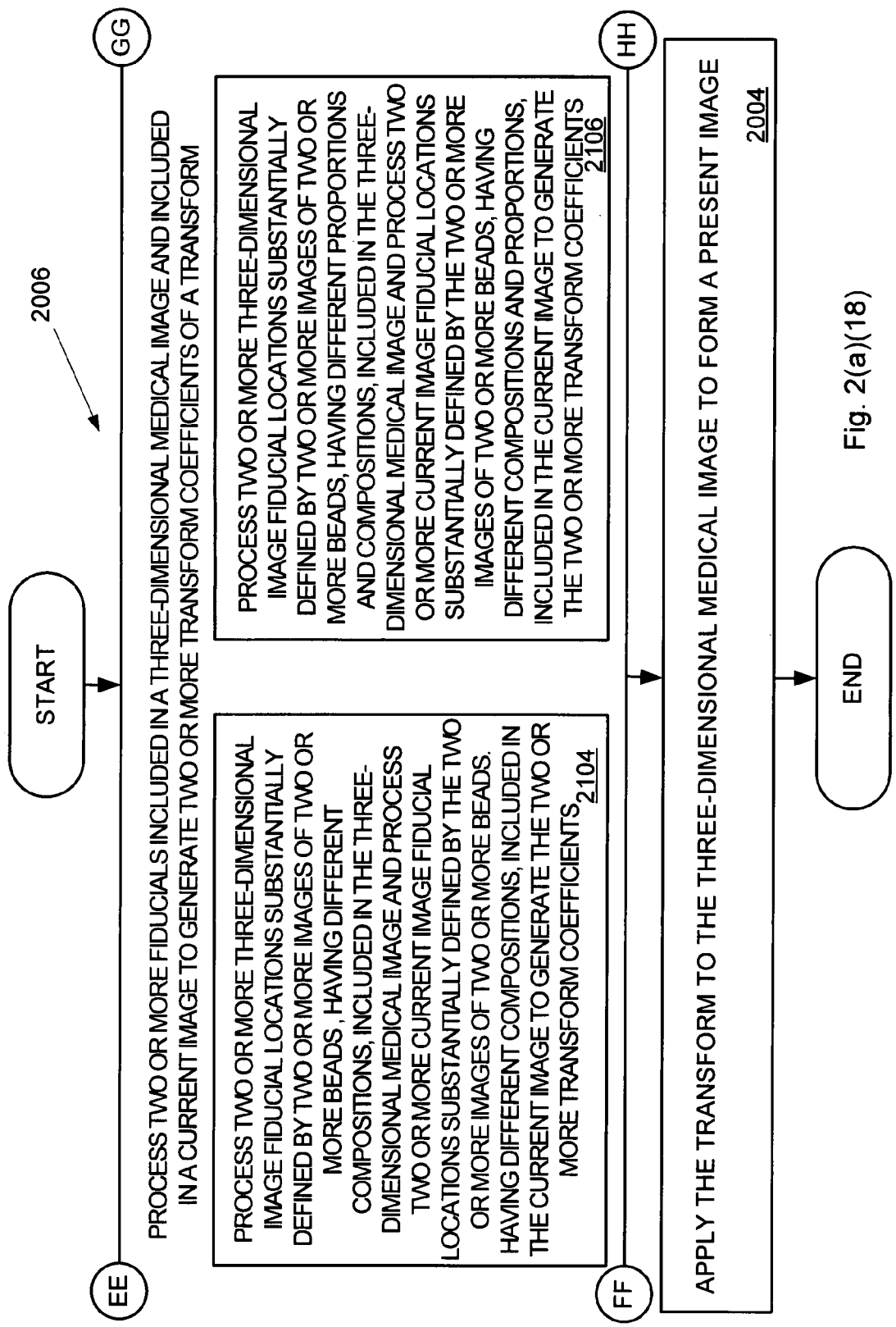
Fig. 2(a)(18)

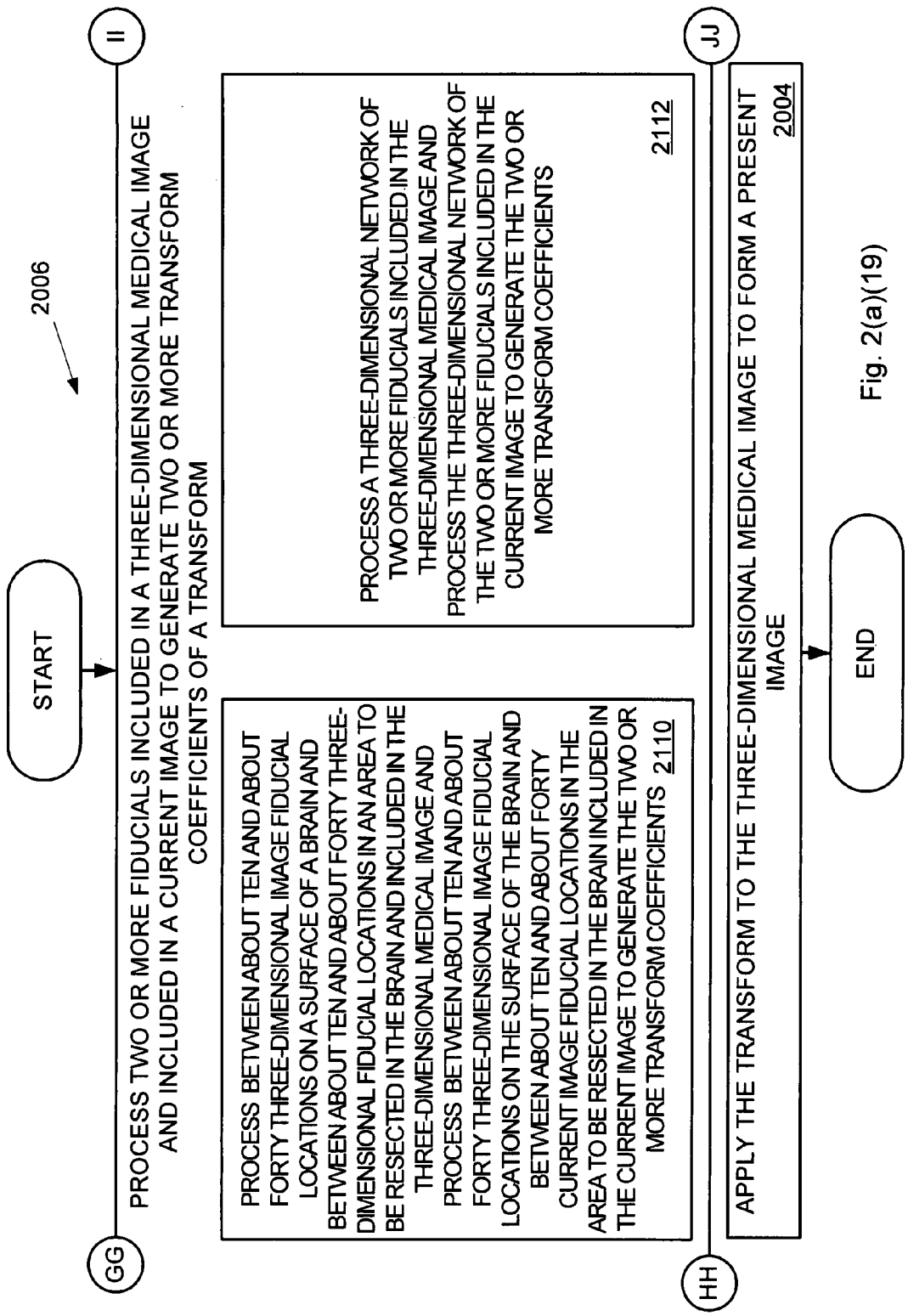
Fig. 2(a)(19)

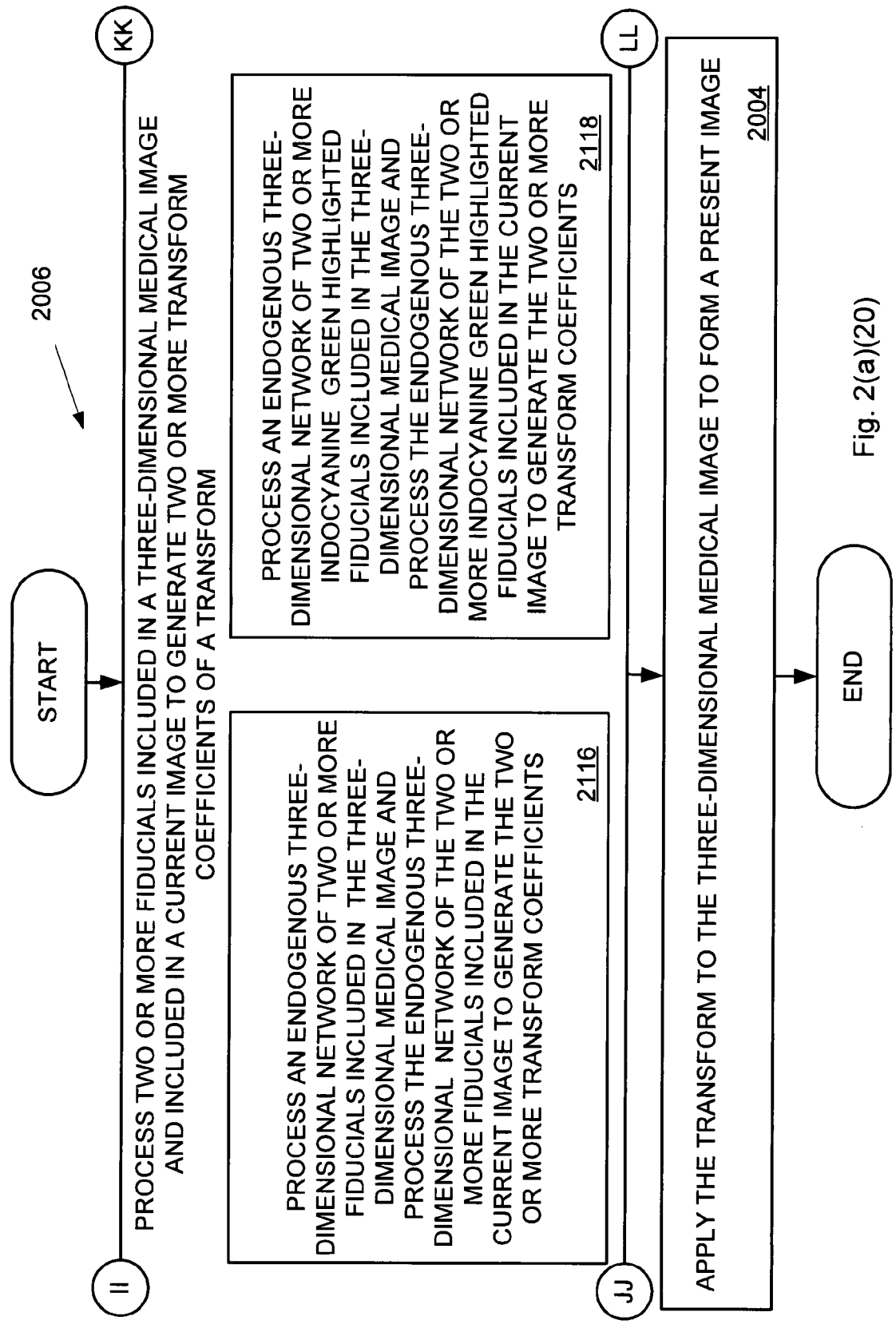
Fig. 2(a)(20)

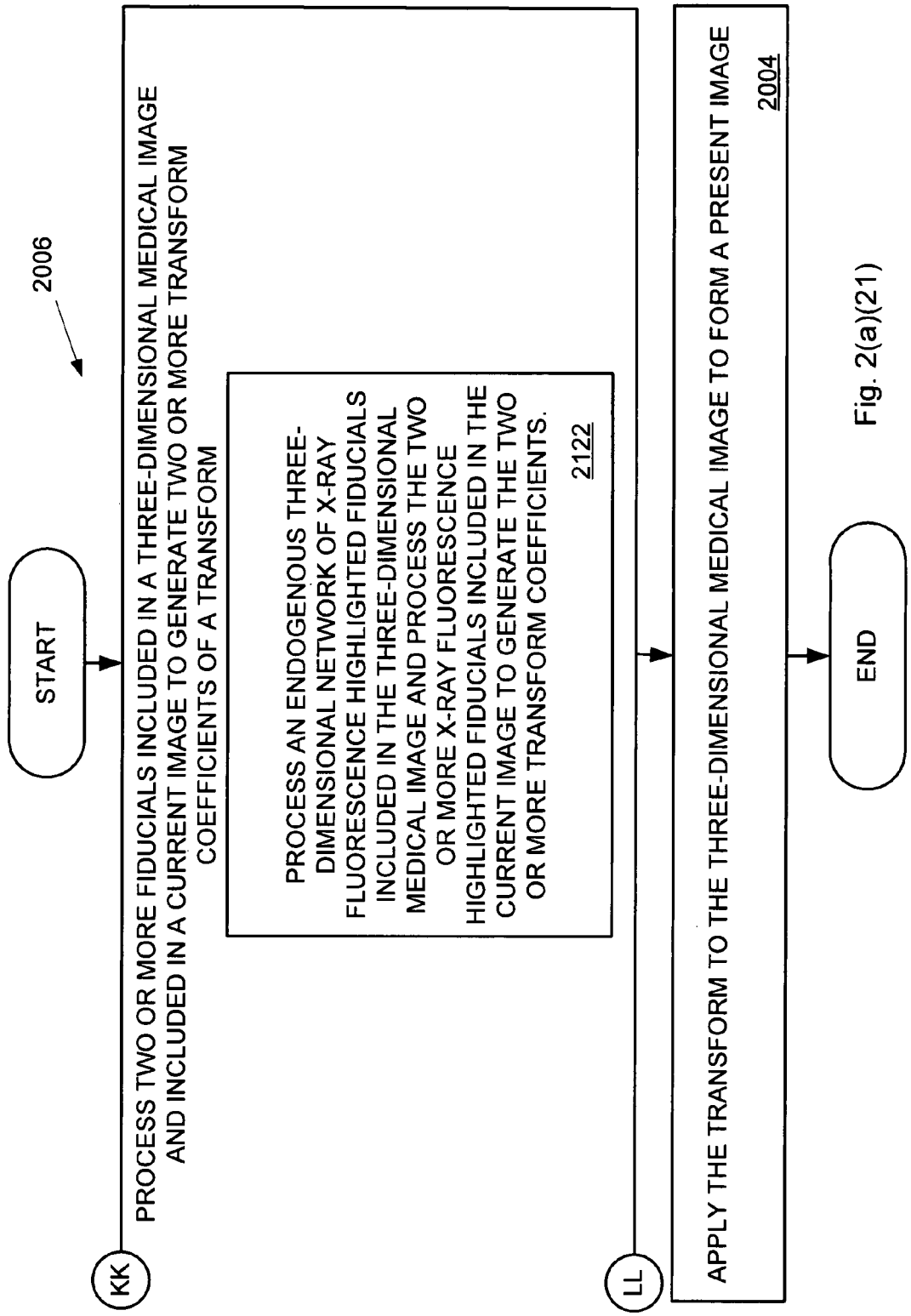
Fig. 2(a)(21)

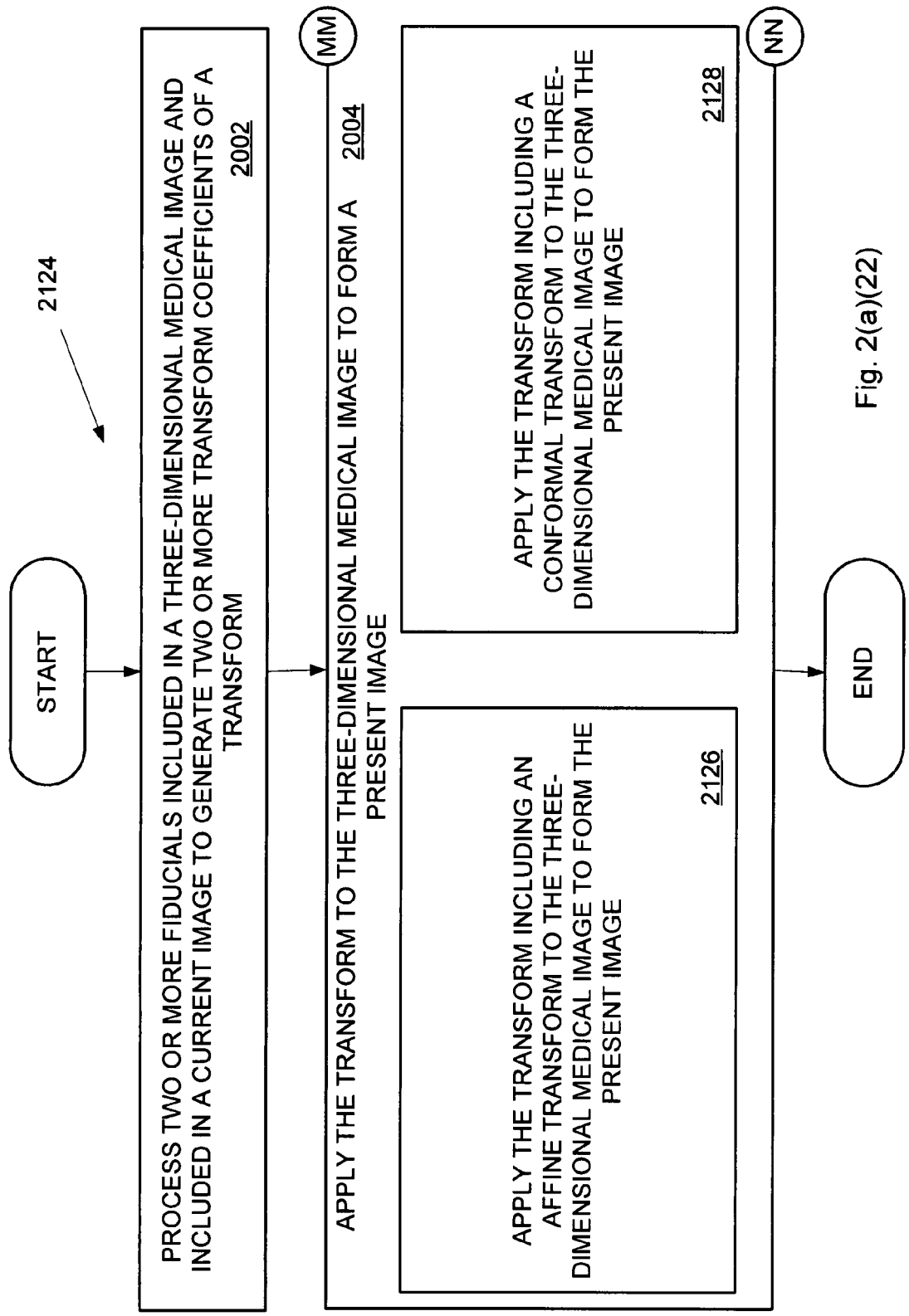
Fig. 2(a)(22)

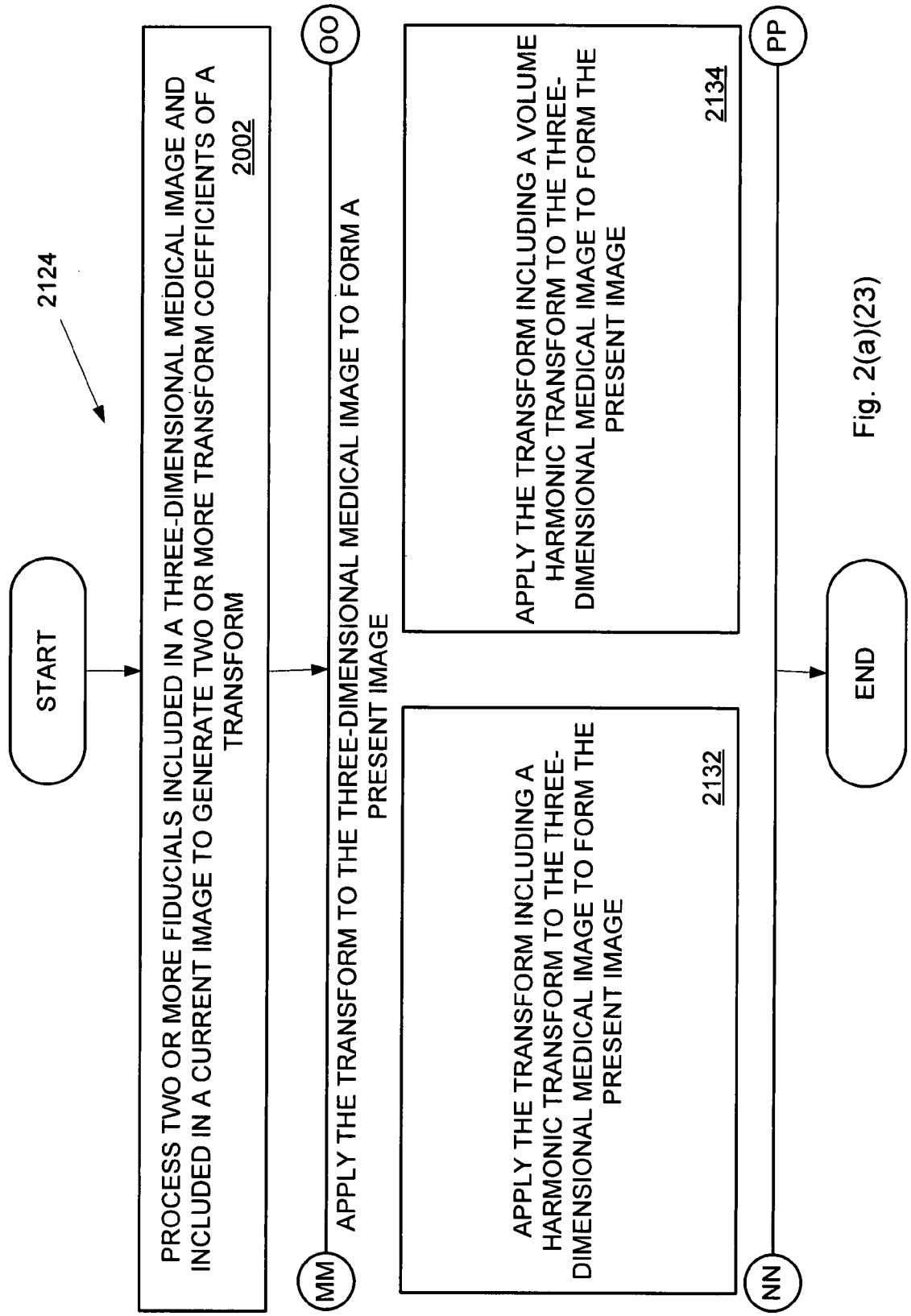
Fig. 2(a)(23)

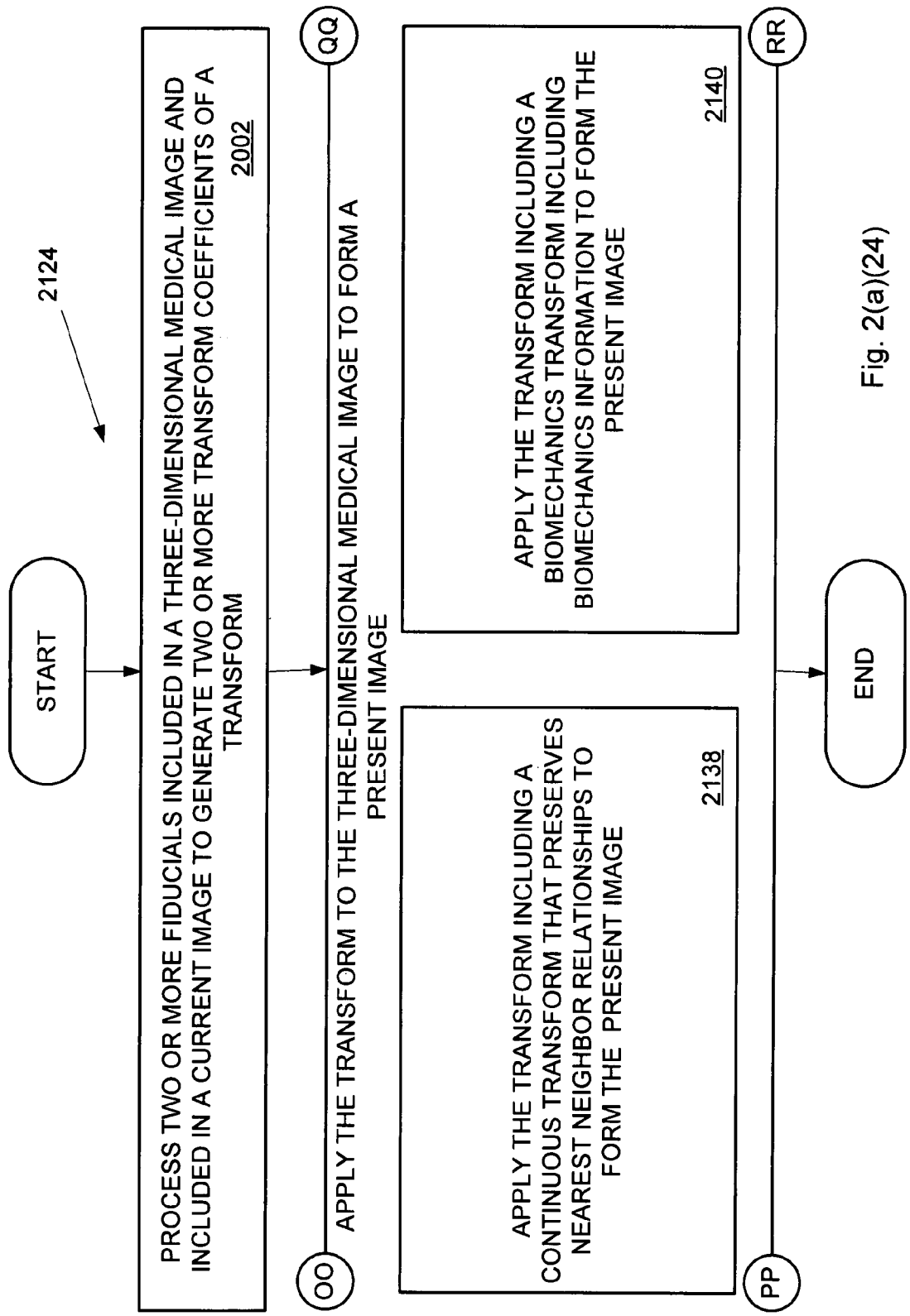
Fig. 2(a)(24)

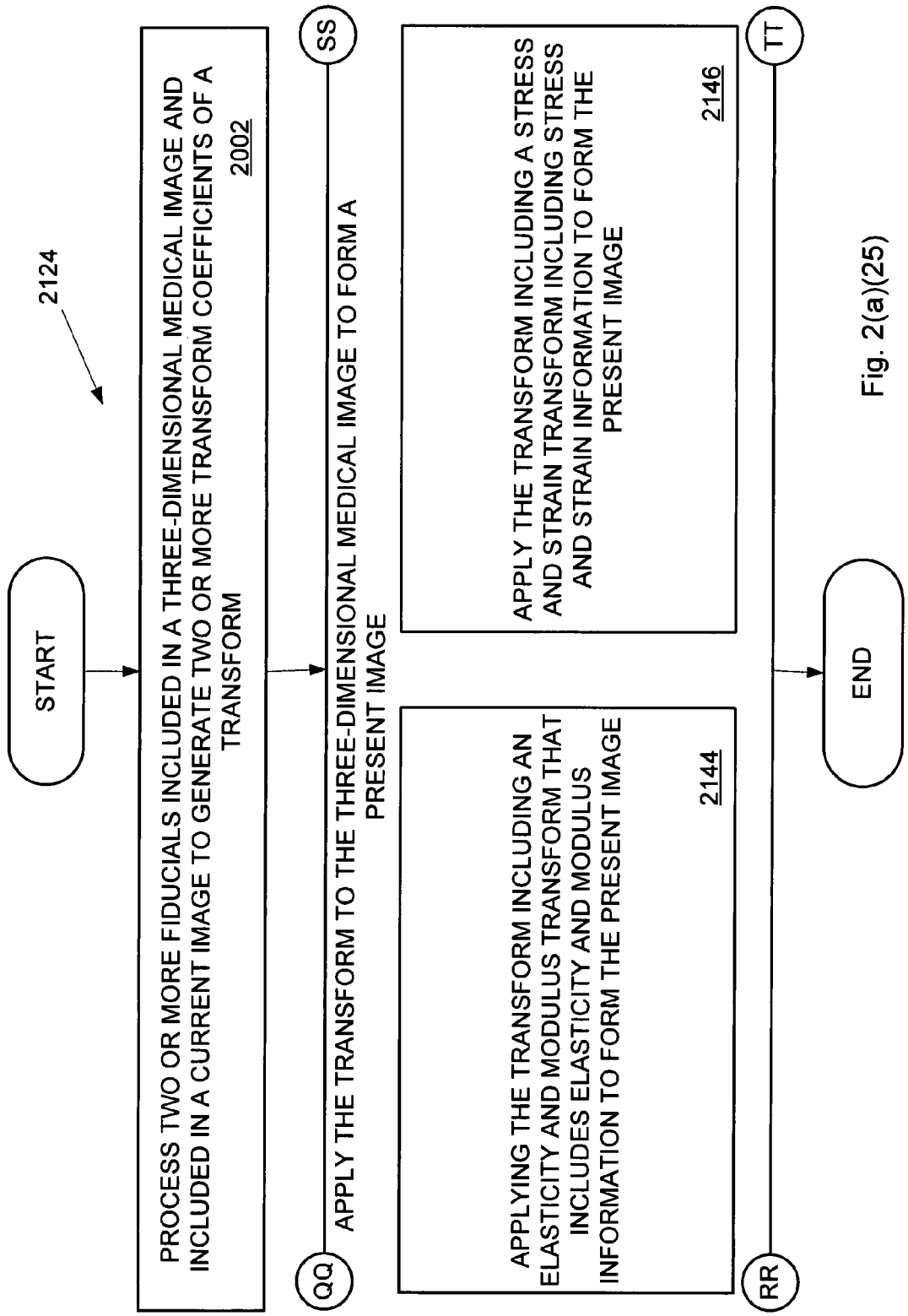
Fig. 2(a)(25)

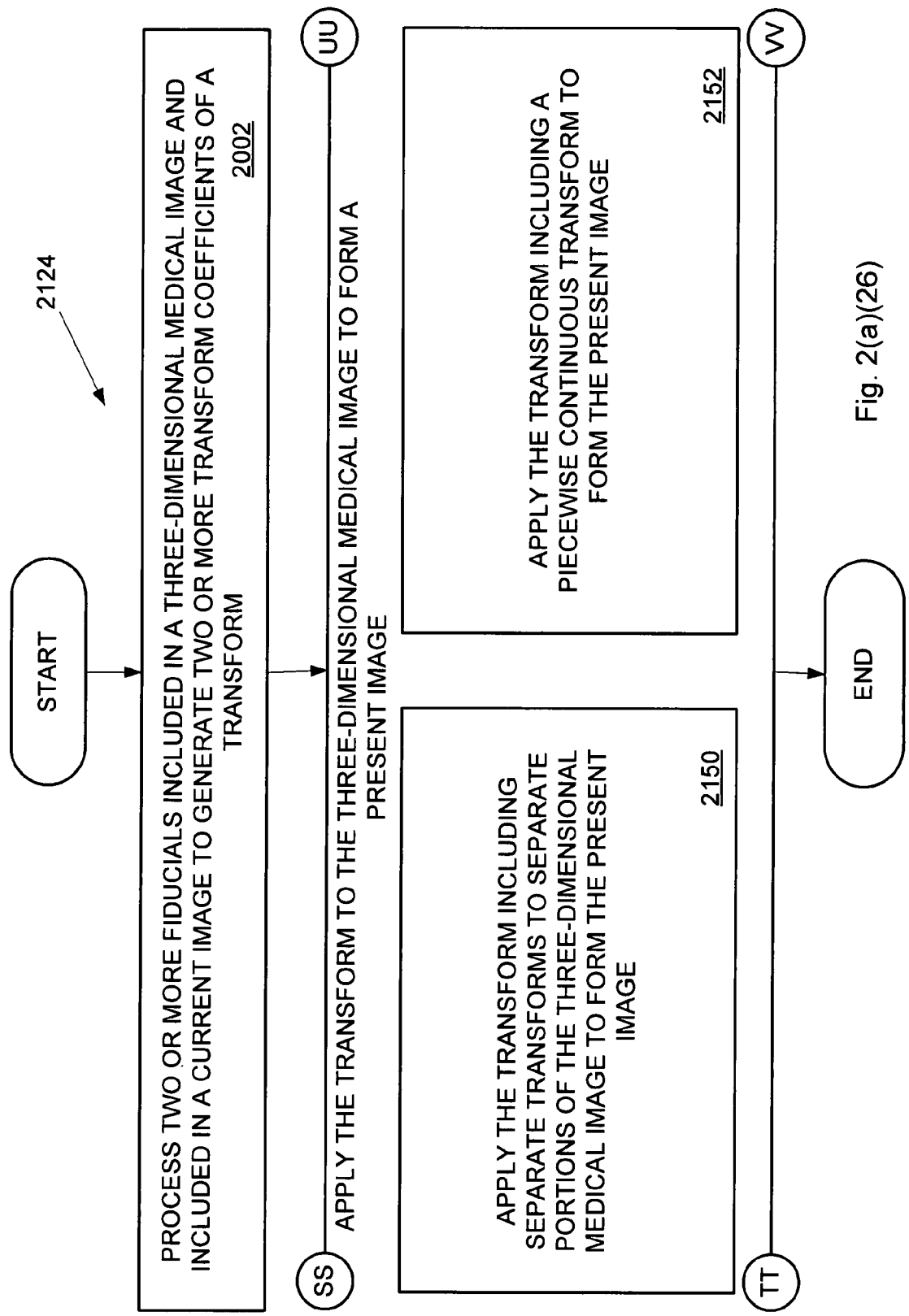

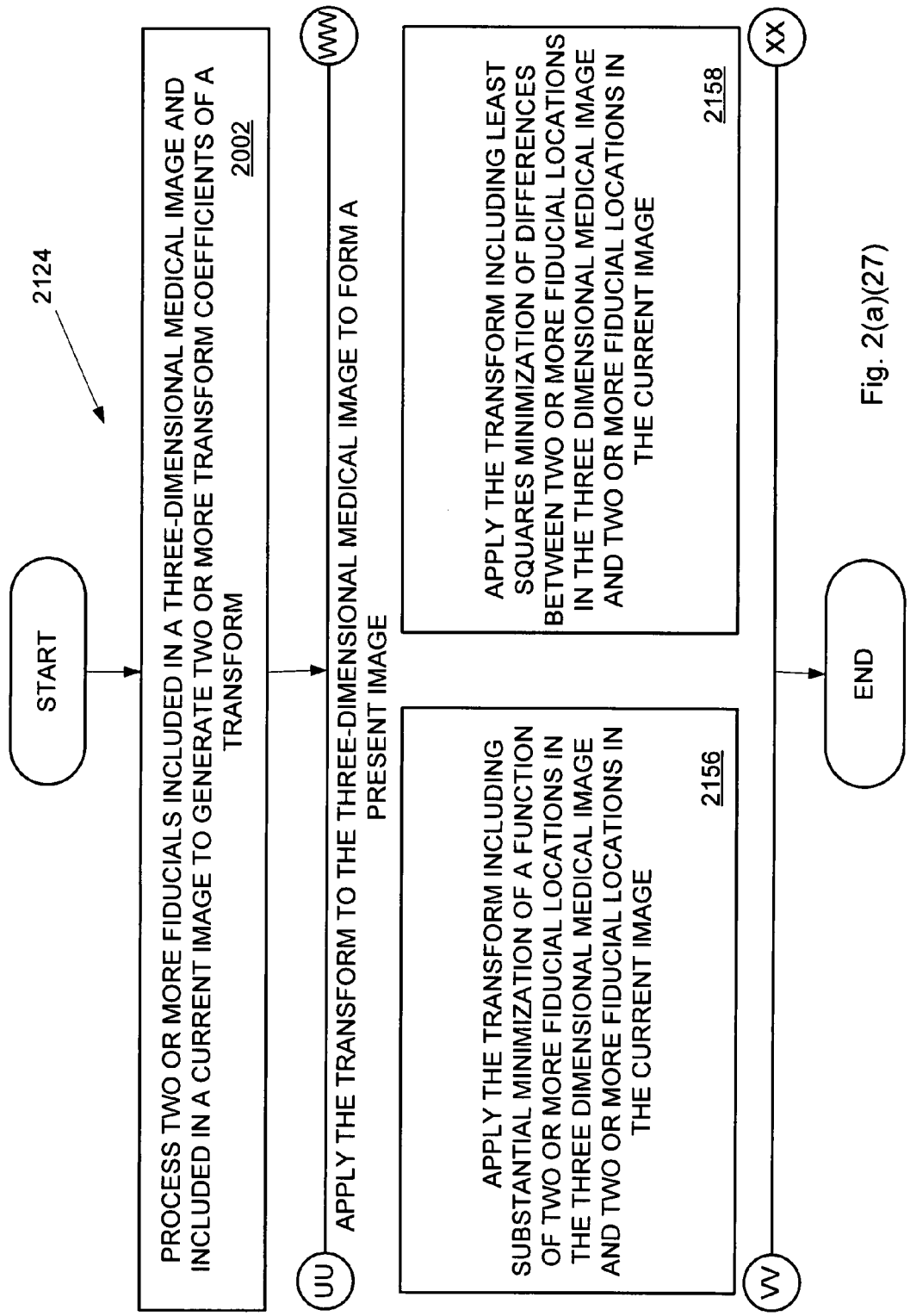
Fig. 2(a)(27)

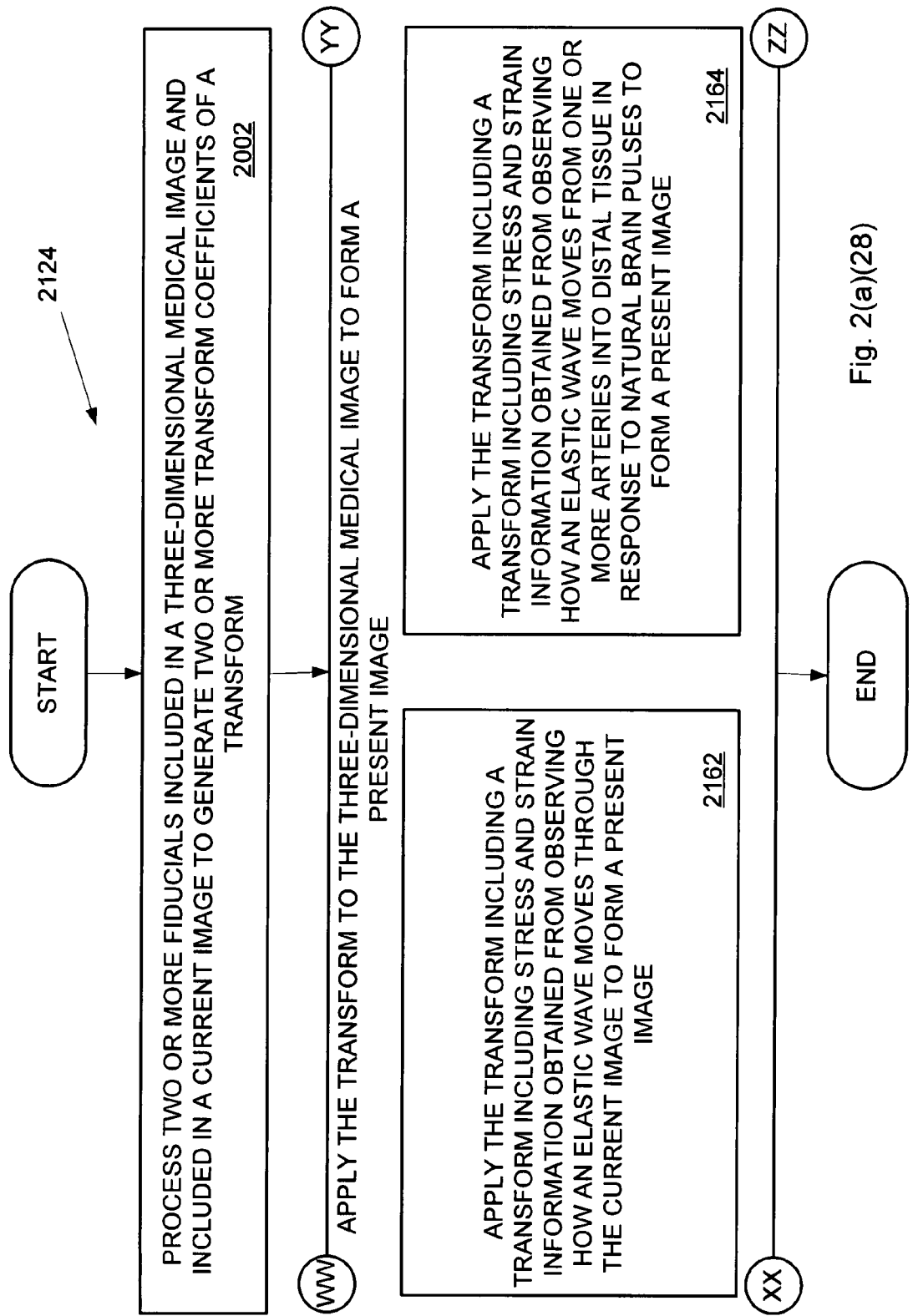
Fig. 2(a)(28)

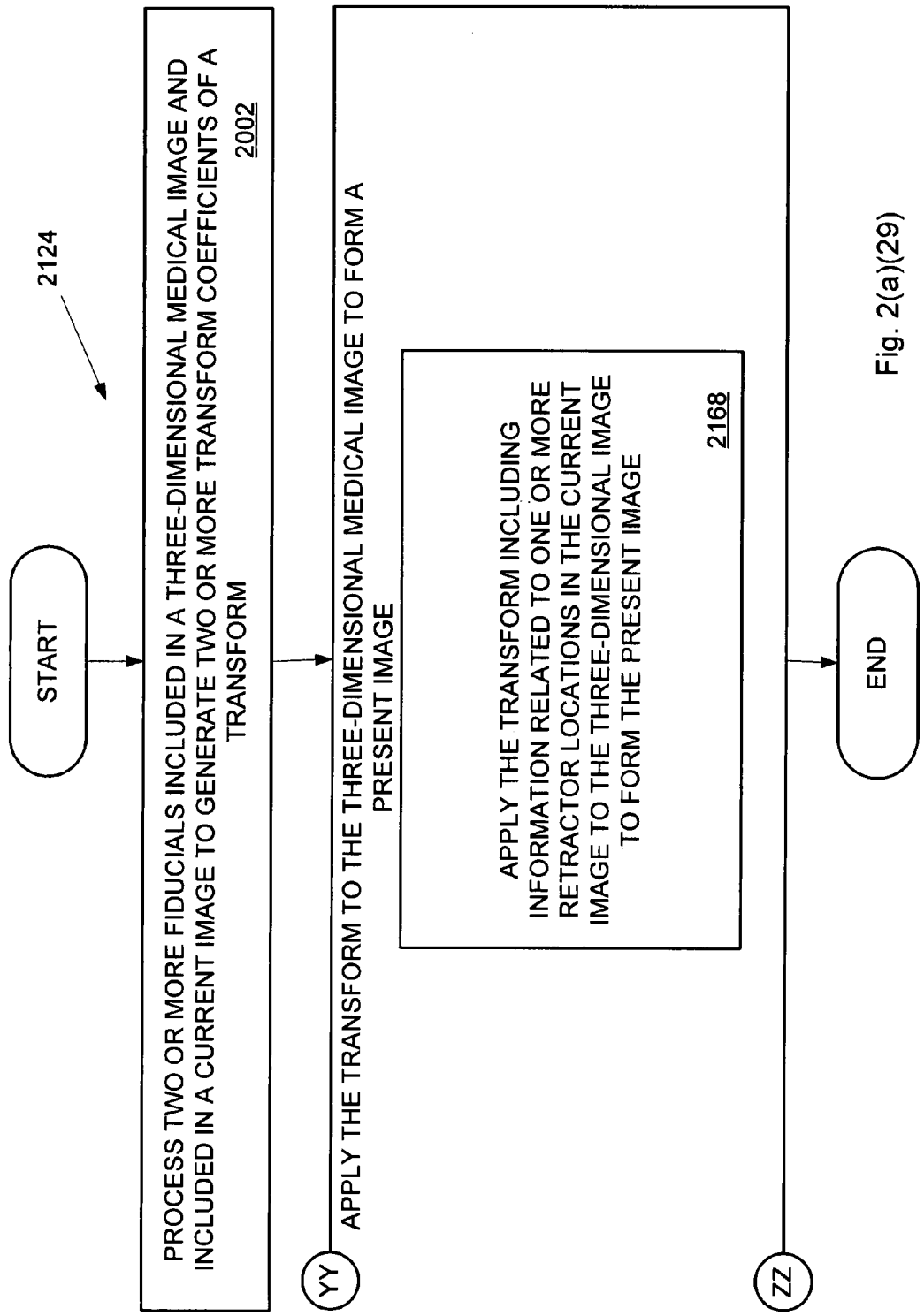

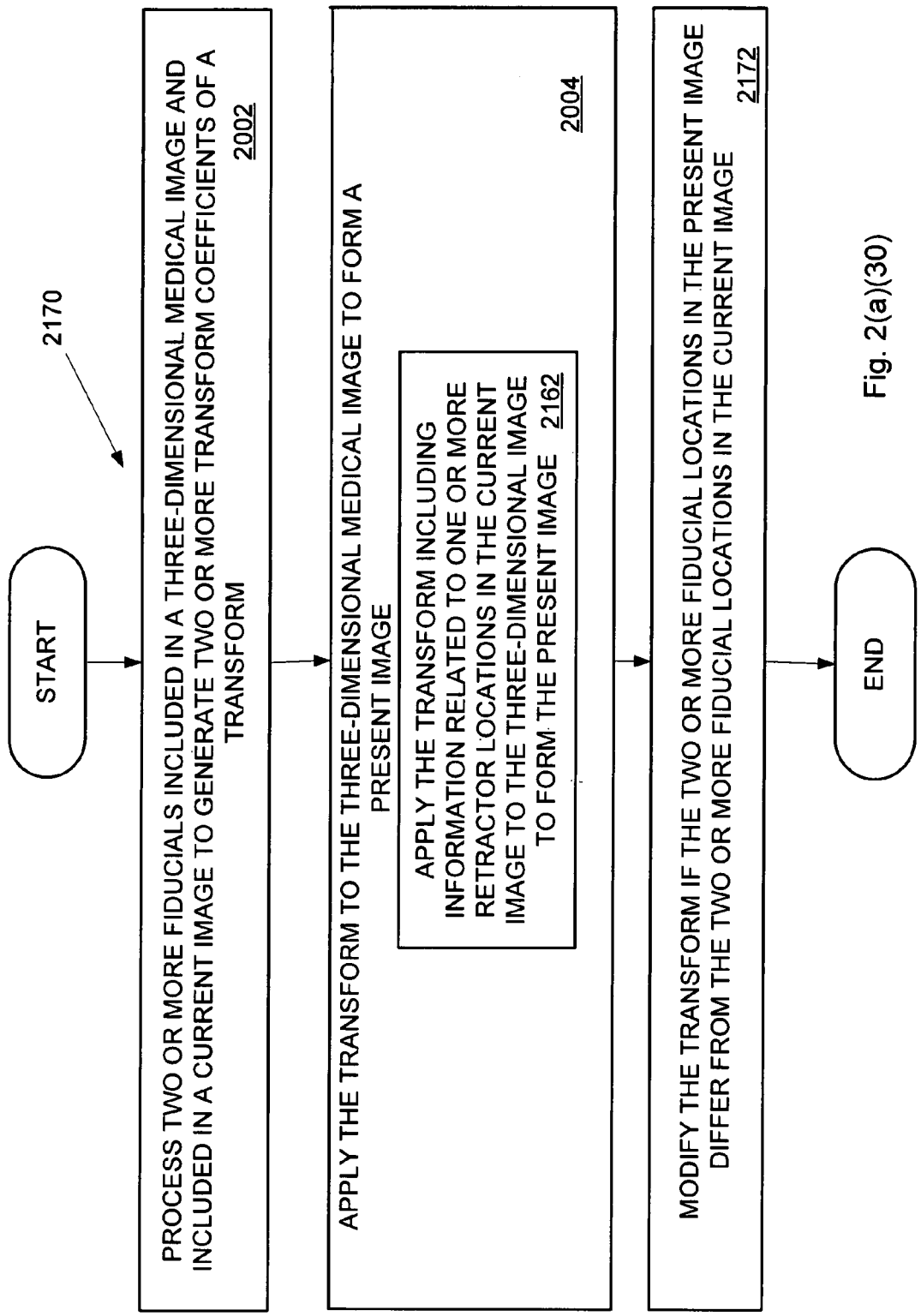
Fig. 2(a)(30)

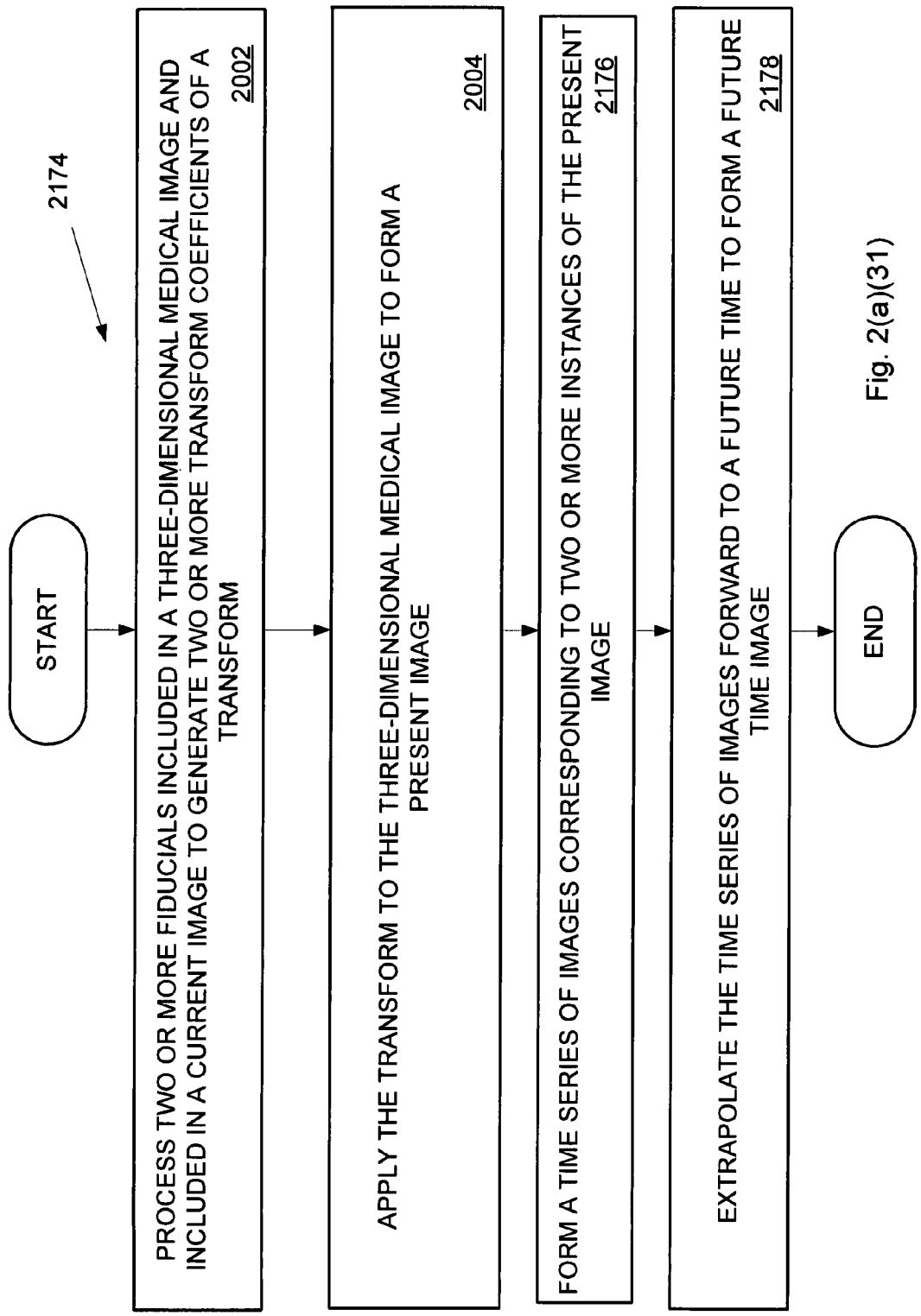
Fig. 2(a)(31)

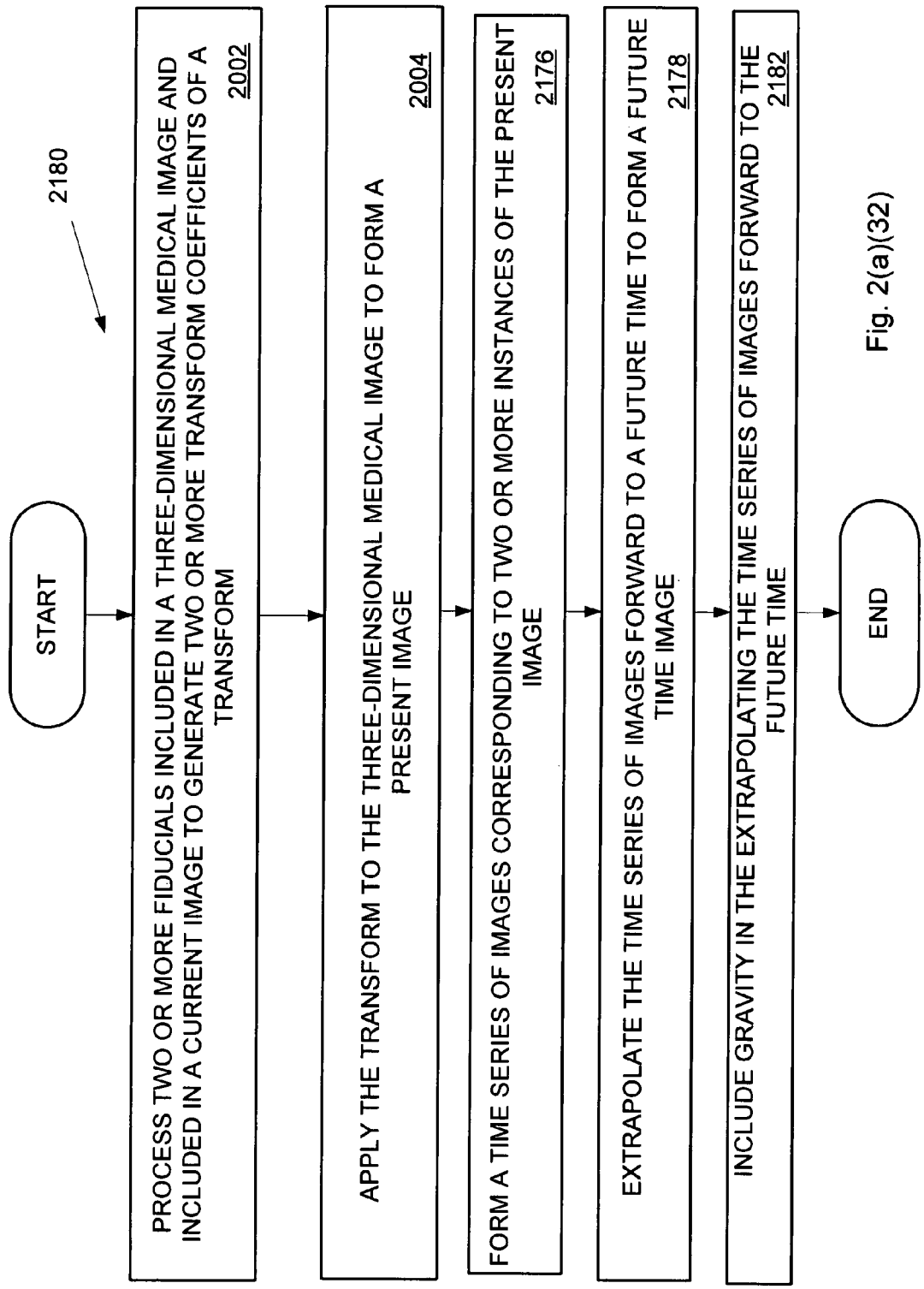
Fig. 2(a)(32)

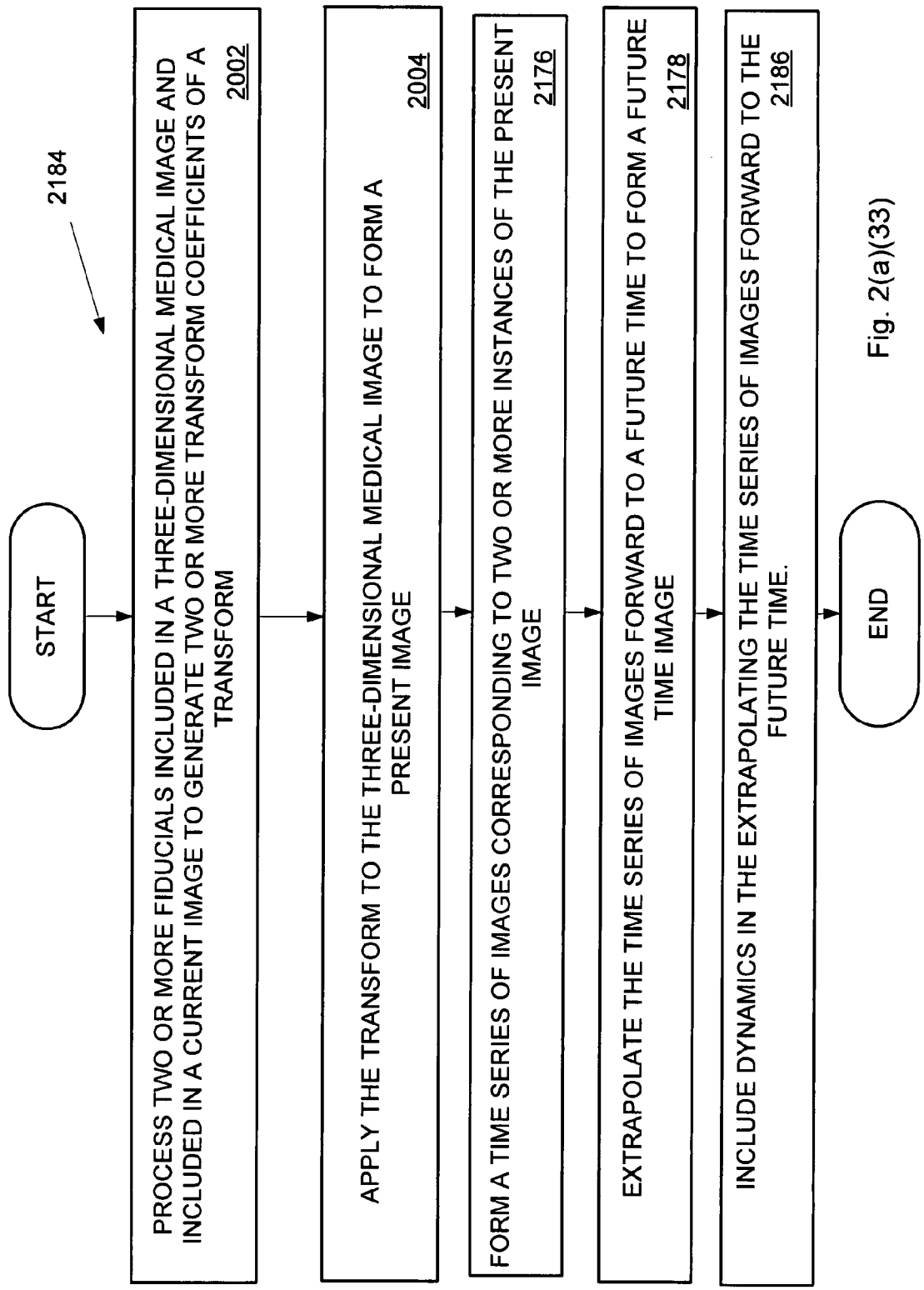

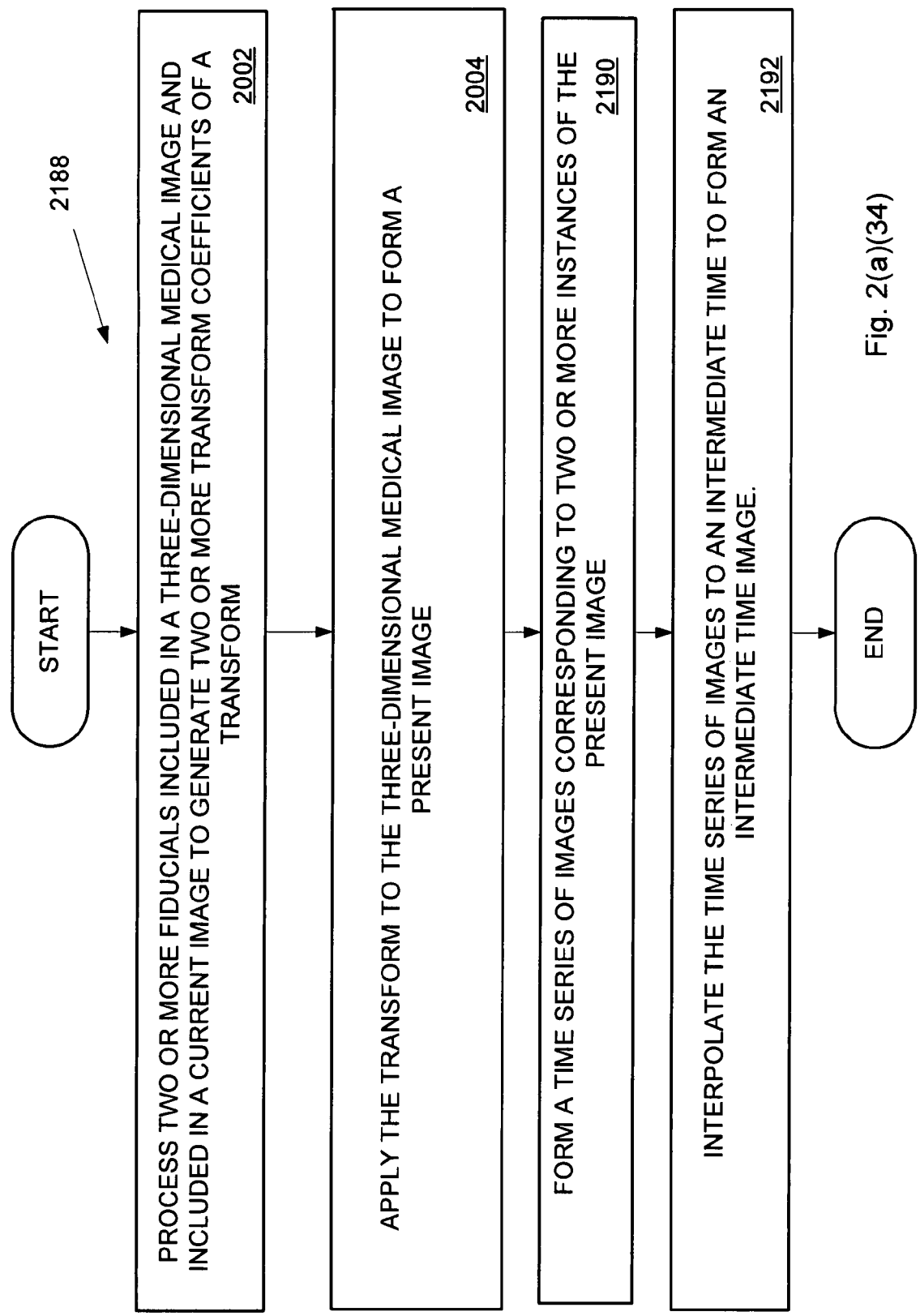
Fig. 2(a)(34)

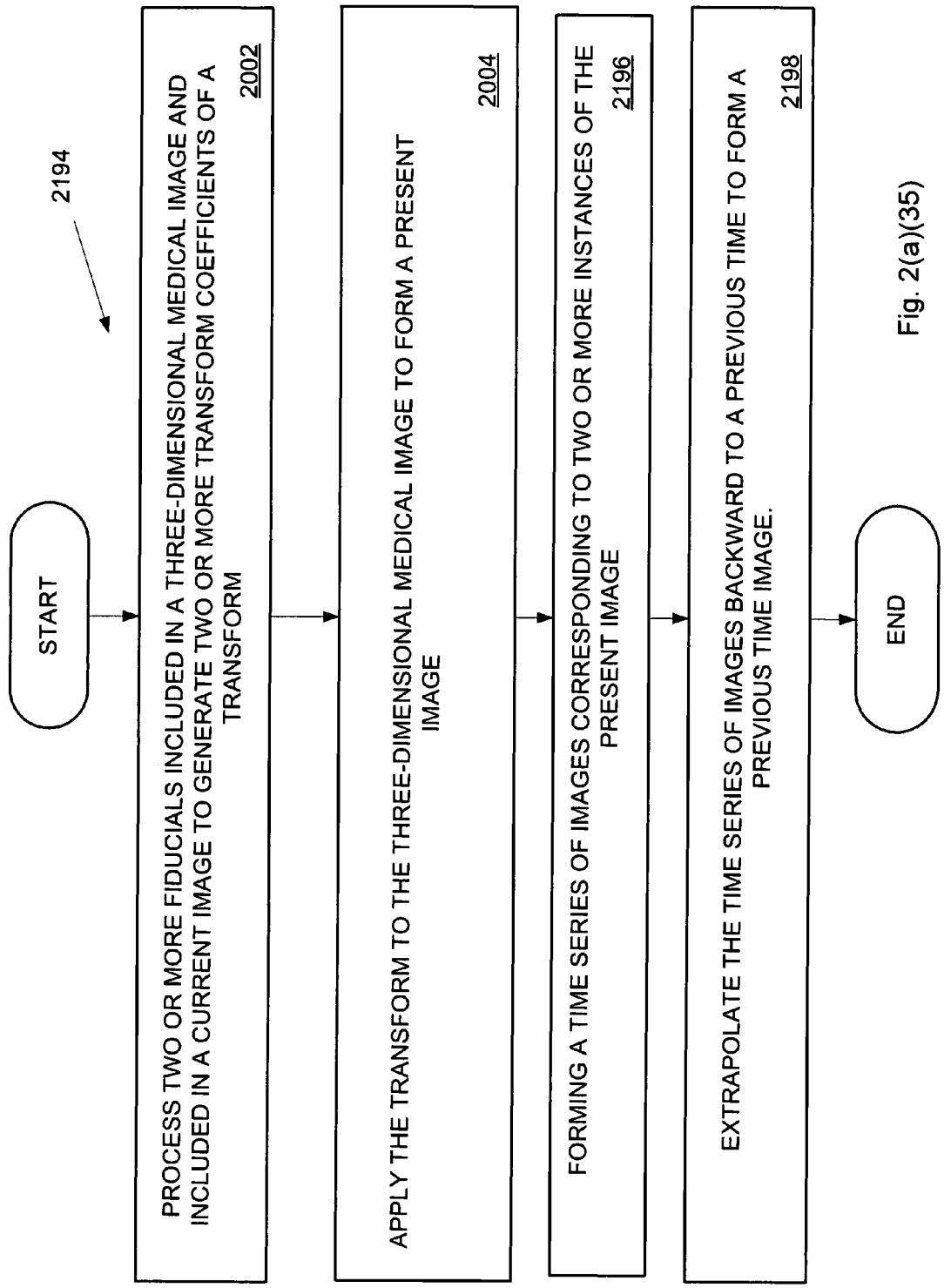
Fig. 2(a)(35)

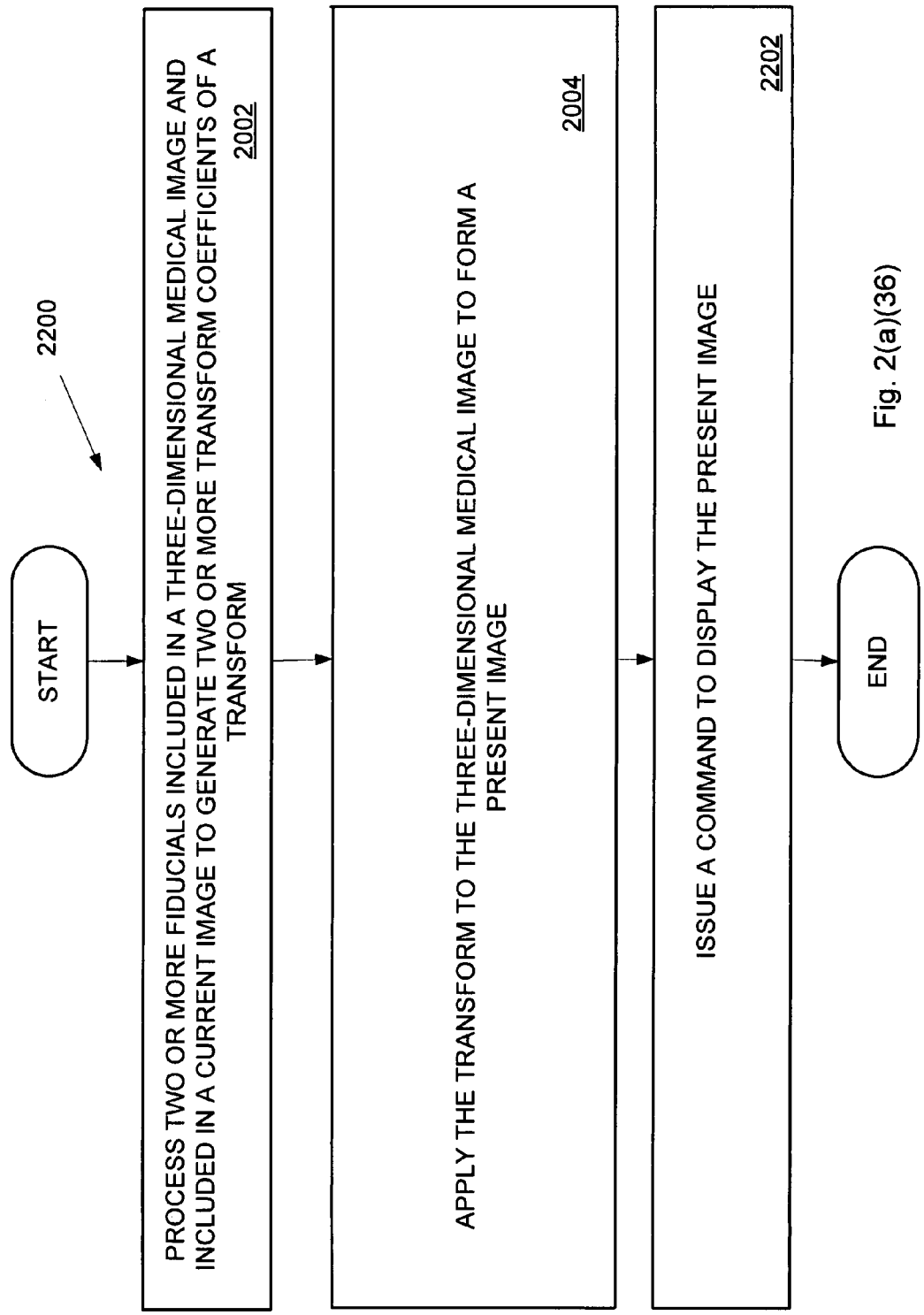
Fig. 2(a)(36)

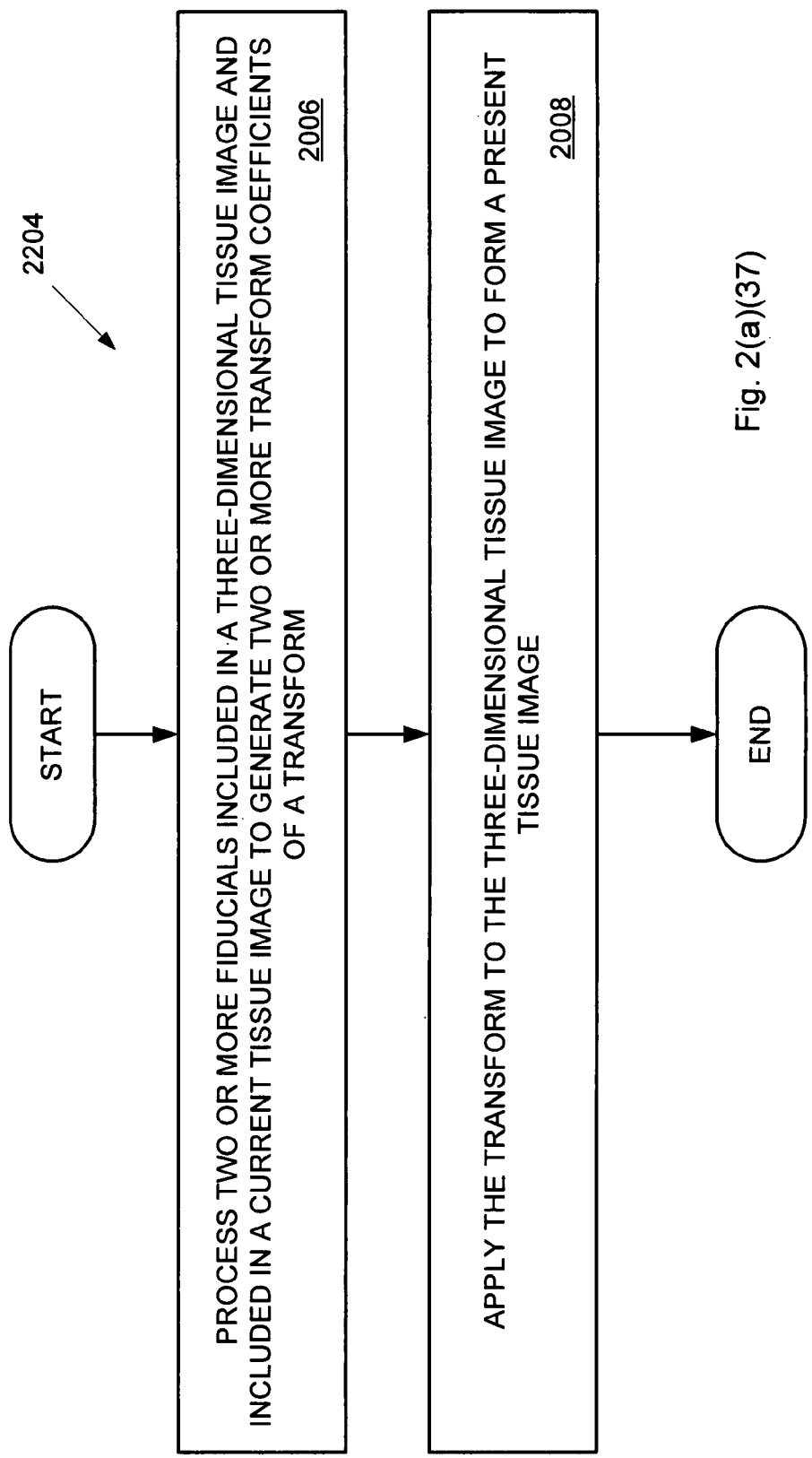

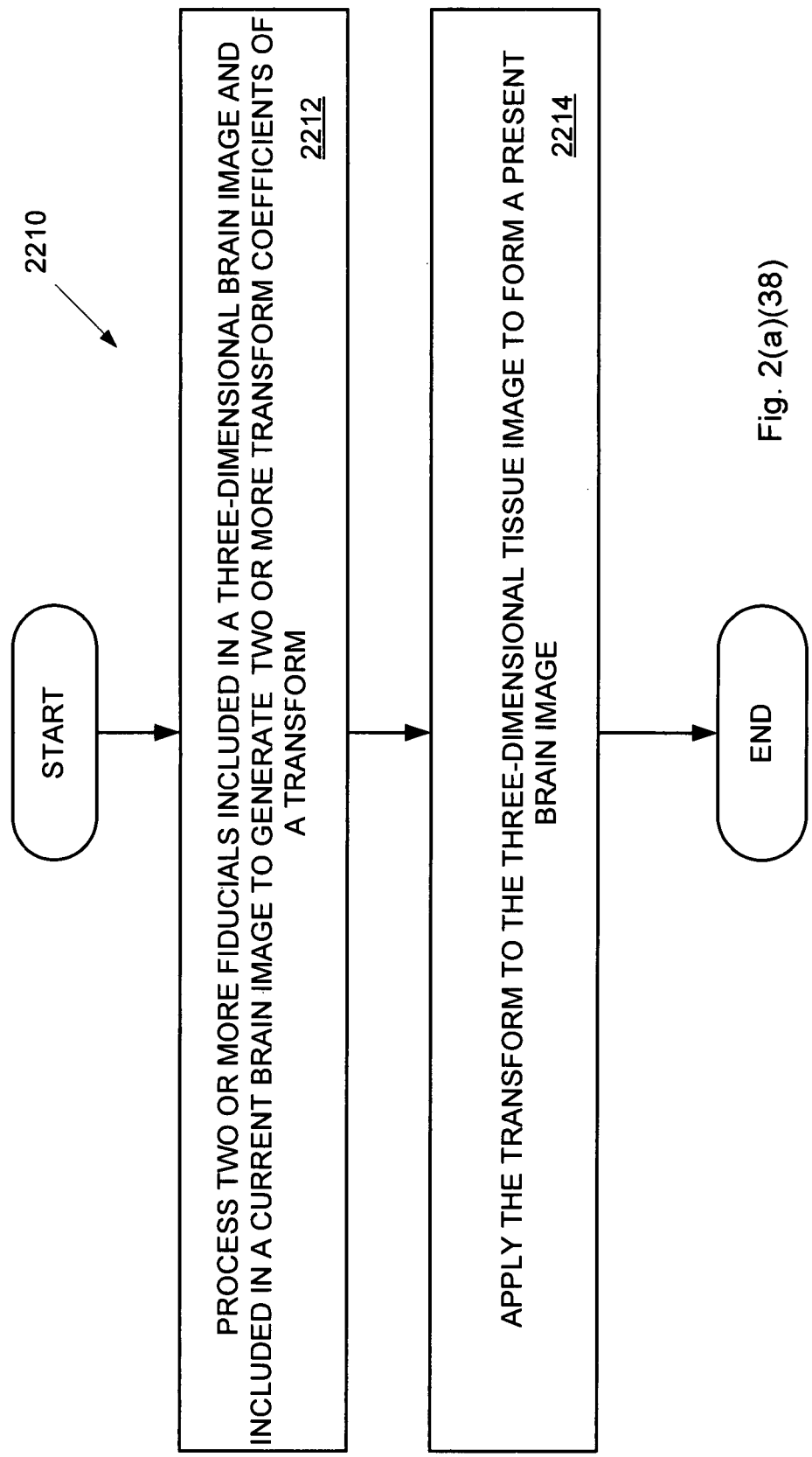

IMAGE GUIDED SURGERY WITH DYNAMIC IMAGE RECONSTRUCTION

FIELD

The subject matter is related to processing three-dimensional medical images.

BACKGROUND

Real-time images available during surgery may not have the resolution that would be most helpful to a surgeon while performing the surgery. Three-dimensional medical images of a subject generated prior to surgery may have higher resolution than real-time images generated during surgery and therefore may be useful during surgery. However, a three-dimensional medical image generated prior to surgery may not accurately reflect the subject at the time of surgery. For these and other reasons, apparatuses and methods for transforming three-dimensional medical images, which may be generated prior to and/or during surgery, to accurately reflect the subject at and/or near the time of surgery may be useful.

SUMMARY

In one aspect, a method includes but is not limited to processing two or more fiducials included in a three-dimensional medical image and included in a current image to generate two or more transform coefficients of a transform, and applying the transform to the three-dimensional medical image to form a present image. In addition to the foregoing, other method aspects are described in the claims, drawings, and text forming a part of the present disclosure.

In one aspect, a method includes but is not limited to: processing two or more fiducials included in a three-dimensional tissue image and included in a current tissue image to generate two or more transform coefficients of a transform; and applying the transform to the three-dimensional tissue image to form a present tissue image. In addition to the foregoing, other method aspects are described in the claims, drawings, and text forming a part of the present disclosure.

In one aspect, a method includes but is not limited to processing two or more fiducials included in a three-dimensional brain image and included in a current brain image to generate two or more transform coefficients of a transform, and applying the transform to the three-dimensional tissue image to form a present brain image. In addition to the foregoing, other method aspects are described in the claims, drawings, and text forming a part of the present disclosure.

In one aspect, a computer readable media including stored executable instructions which-when executed on a computer system cause the computer system to perform a method that includes but is not limited to processing two or more fiducials included in a three-dimensional medical image and included in a current image to generate two or more transform coefficients of a transform, and applying the transform to the three-dimensional medical image to form a present image. In addition to the foregoing, other computer readable media aspects are described in the claims, drawings, and text forming a part of the present disclosure.

In one aspect, an apparatus includes but is not limited to means for processing two or more fiducials included in a three-dimensional medical image and included in a current image to generate two or more transform coefficients of a transform, and means for applying the transform to the three-dimensional medical image to form a present image. In addition to the foregoing, other apparatus aspects are described in the claims, drawings, and text forming a part of the present disclosure.

In one aspect, an apparatus includes but is not limited to an image processor to process two or more fiducials included in a three-dimensional medical image and included in a current image to generate two or more transform coefficients of a transform, and a transform processor to apply the transform to the three-dimensional medical image to form a present image. In addition to the foregoing, other apparatus aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware configured to effect the herein referenced method aspects depending upon the design choices of the system designer.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE DRAWINGS

FIG. 1(a)(1) and FIG. 1(a)(2) show a block diagram of a processing apparatus in accordance with some embodiments.

FIG. 2(a)(1) shows a flow diagram of a method suitable for use in connection with the apparatus shown in FIG. 1(a)(1) in accordance with some embodiments.

FIG. 2(a)(2), FIG. 2(a)(3), FIG. 2(a)(4), FIG. 2(a)(5), FIG. 2(a)(6), FIG. 2(a)(7), FIG. 2(a)(8), FIG. 2(a)(9), FIG. 2(a)(10), FIG. 2(a)(11), FIG. 2(a)(12), FIG. 2(a)(13), FIG. 2(a)(14), FIG. 2(a)(15), FIG. 2(a)(16), FIG. 2(a)(17), FIG. 2(a)(18), FIG. 2(a)(19), FIG. 2(a)(20), FIG. 2(a)(21), FIG. 2(a)(22), FIG. 2(a)(23), FIG. 2(a)(24), FIG. 2(a)(25), FIG. 2(a)(26), FIG. 2(a)(27), FIG. 2(a)(28), and FIG. 2(a)(29) show a flow diagram of methods, illustrated within the context of the method shown in FIG. 2(a)(1), in accordance with some embodiments.

FIG. 2(a)(30) shows a flow diagram of a method, illustrated within the context of the method shown in FIG. 2(a)(30), and further including modifying the transform if the two or more fiducial locations in the present image differ from the two or more fiducial locations in the current image in accordance with some embodiments.

FIG. 2(a)(31) shows a flow diagram of a method, illustrated within the context of the method shown in FIG. 2(a)(1), and further including forming a time series of images corresponding to two or more instances of the present image, and extrapolating the time series of images forward to a future time to form a future time image in accordance with some embodiments.

FIG. 2(a)(32) shows a flow diagram of a method, illustrated within the context of the method shown in FIG. 2(a)

(31), and further including gravity in the extrapolating the time series of images forward to the future time in accordance with some embodiments.

FIG. 2(a)(33) shows a flow diagram of a method, illustrated within the context of the method shown in FIG. 2(a)(31), and further including dynamics in the extrapolating the time series of images forward to the future time in accordance with some embodiments.

FIG. 2(a)(34) shows a flow diagram of a method, illustrated within the context of the method shown in FIG. 2(a)(1), and further including forming a time series of images corresponding to two or more instances of the present image, and interpolating the time series of images to an intermediate time to form an intermediate time image in accordance with some embodiments.

FIG. 2(a)(35) shows a flow diagram of a method, illustrated within the context of the method shown in FIG. 2(a)(1), and further including forming a time series of images corresponding to two or more instances of the present image, and extrapolating the time series of images backward to a previous time to form a previous time image in accordance with some embodiments.

FIG. 2(a)(36) shows a flow diagram of a method, illustrated within the context of the method shown in FIG. 2(a)(1), and further including issuing a command to display the present image in accordance with some embodiments.

FIG. 2(a)(37) shows a flow diagram of a method suitable for use in connection with the apparatus shown in FIG. 1(a)(1) in accordance with some embodiments.

FIG. 2(a)(38) shows a flow diagram of a method suitable for use in connection with the apparatus shown in FIG. 1(a)(1), in accordance with some embodiments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1(a)(1) and FIG. 1(a)(2) show a block diagram of a processing apparatus 1000 in accordance with some embodiments. In some embodiments, the processing apparatus 1000 may include processing hardware/software/firmware 1002, applying hardware/software/firmware 1004, selecting hardware/software/firmware 1006, modifying hardware/software/firmware 1008, forming and extrapolating hardware/software/firmware 1010, issuing hardware/software/firmware 1011, forming and interpolating hardware/software/firmware 1012, and a computer readable media 1014.

In some embodiments, the processing hardware/software/firmware 1002 may include an image processor 1003. The image processor 1003 may process an image, such as a three-dimensional medical image, by processing image elements in parallel. In some embodiments, the processing hardware/software/firmware 1002 may include a transform processor 1005. The transform processor 1005 may process an image, such as a three-dimensional medical image, by applying a transform to the image. Exemplary image processors and transform processors may include a complex instruction set processor, a reduced instruction set processor, or a very long instruction word processor.

FIG. 2(a)(1) shows a flow diagram of a method 2000 suitable for use in connection with the processing apparatus 1000 as shown in FIG. 1(a)(1) and FIG. 1(a)(2), in accordance with some embodiments. The method 2000 may include processing two or more fiducials included in a three-dimensional medical image and included in a current image to generate two or more transform coefficients of a transform (operation 2002), and applying the transform to the three-dimensional medical image to form a present image (operation 2004).

Referring to FIG. 1(a)(1) and FIG. 1(a)(2), in some embodiments, the processing hardware/software/firmware 1002 included in the processing apparatus 1000 may process two or more fiducials included in a three-dimensional medical image and included in a current image to generate two or more transform coefficients of a transform (operation 2002), as shown in FIG. 2(a)(1).

Referring again to FIG. 1(a)(1) and FIG. 1(a)(2), in some embodiments, the applying hardware/software/firmware 1004 may apply the transform to the three-dimensional medical image to form a present image (operation 2004), as shown in FIG. 2(a)(1).

Referring again to FIG. 1(a)(1) and FIG. 1(a)(2), in some embodiments, a means for processing, such as an image processor 1003, may process two or more fiducials included in a three-dimensional medical image and included in a current image to generate two or more transform coefficients of a transform, and a means for transforming, such as a transform processor 1005, may apply the transform to the three-dimensional medical image to form a present image in accordance with some embodiments.

Referring to FIG. 1(a)(1) and FIG. 1(a)(2), in some embodiments, the method 2000 may be used in connection with a computer readable media 1014 including stored executable instructions, which when executed on a computer system, for example processing apparatus 1000, cause the computer system to perform a method including processing two or more fiducials included in a three-dimensional medical image and included in a current image to generate two or more transform coefficients of a transform, and applying the transform to the three-dimensional medical image to form a present image in accordance with some embodiments.

Each of the two or more fiducials may include a standard or reference for use in identifying a location in the three-dimensional medical image and the current image. For example, arterial fiducials may form a standard reference in a human brain image. A three-dimensional medical image may include any image rendered in three dimensions that is suitable for use in connection with the practice of medicine. Exemplary three-dimensional images suitable for use in connection with the practice of medicine may include brain images, lung images, heart images, kidney images, and stomach images. A current image may include an image including the three-dimensional medical image or a portion of the three-dimensional image formed at a time after the three-dimensional medical image was formed. For example a current image may include an image of a brain formed during surgery. A transform may include a mathematical transformation. Exemplary mathematical transformations include affine and conformal transformations. Each of the two or more transform coefficients may include a numerical value suitable for use in connection with the transform. Exemplary numerical values may include real and imaginary values. A present image may include an image including the three-dimensional medical image or a portion of the three-dimensional medical image. Exemplary medical images may include images of a brain, lungs, kidneys, and a heart.

FIG. 2(a)(2) shows a flow diagram of a method 2006, illustrated within the context of method 2000 as shown in FIG. 2(a)(1), wherein processing two or more fiducials included in a three-dimensional medical image and included in a current image to generate two or more transform coefficients of a transform (operation 2002) may include selecting the three-dimensional medical image from a surface in a three-dimensional space (operation 2008), and may include selecting the three-dimensional medical image from an interior surface in three-dimensional space in accordance with some embodiments (operation 2010).

Referring to FIG. 1(a)(1) and FIG. 1(a)(2), in some embodiments, the selecting hardware/software/firmware 1006 included in the processing apparatus 1000 may select the three-dimensional medical image from a surface in a three-dimensional space (operation 2008).

Referring again to FIG. 1(a)(1) and FIG. 1(a)(2), in some embodiments, the selecting hardware/software/firmware 1006 included in the processing apparatus 1000 may select the three-dimensional medical image from an interior surface in three-dimensional space in accordance with some embodiments (operation 2010).

Three-dimensional space may include space in which three measurements locate any point. For example, three-dimensional space may include three measurements that locate a particular part of the hypothalamus. A surface in three-dimensional space may include a boundary in three-dimensional space or a two-dimensional locus of points in three-dimensional space. For example, a boundary in three-dimensional space may include a boundary between the parietal lobe and the frontal lobe in a human brain. An interior surface in three-dimensional space may include an inner boundary of a three-dimensional figure. For example, an inner boundary may include a boundary of the occipital lobe in a human brain.

FIG. 2(a)(3) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include selecting the three-dimensional medical image from a volume in three-dimensional space (operation 2014), and may include processing two or more fiducials included in two or more current images to generate the two or more transform coefficients of the transform (operation 2016).

Referring to FIG. 1(a)(1) and FIG. 1(a)(2), in some embodiments, the selecting hardware/software/firmware 1006 included in the processing apparatus 1000 may select the three-dimensional medical image from a volume in three-dimensional space (operation 2014).

Referring again to FIG. 1(a)(1) and FIG. 1(a)(2), in some embodiments, the processing hardware/software/firmware 1002 included in the processing apparatus 1000 may process two or more fiducials included in two or more current images to generate the two or more transform coefficients of the transform (operation 2016).

A volume in three-dimensional space may include the space occupied by a three-dimensional object. Exemplary three-dimensional objects may include a brain, heart, lungs, kidneys, and muscles.

FIG. 2(a)(4) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing two or more three-dimensional image blood vessel locations included in the three-dimensional medical image and processing two or more current image blood vessel locations included in the current image to generate the two or more transform coefficients (operation 2020) and may include processing two or more three-dimensional image anatomical structure locations included in the three-dimensional medical image and processing two or more current image anatomical structure locations included in the current image to generate the two or more transform coefficients (operation 2022).

Referring to FIG. 1(a)(1) and FIG. 1(a)(2), in some embodiments, the processing hardware/software/firmware 1002 included in the processing apparatus 1000 may process two or more three-dimensional image blood vessel locations included in the three-dimensional medical image and processing two or more current image blood vessel locations included in the current image to generate the two or more transform coefficients (operation 2020).

Referring again to FIG. 1(a)(1) and FIG. 1(a)(2), in some embodiments, the processing hardware/software/firmware 1002 included in the processing apparatus 1000 may process two or more three-dimensional image anatomical structure locations included in the three-dimensional medical image, and process two or more current image anatomical structure locations included in the current image to generate the two or more transform coefficients (operation 2022).

A blood vessel may include passages or canals that convey blood. Blood vessel locations may include coordinates that locate blood vessels in three-dimensional space. Anatomical structures may include structures included in animals. Blood vessels are exemplary anatomical structures. Other exemplary anatomical structures may include heart, lung, kidney, and spleen. For an anatomical structure located in three dimensions, the anatomical structure location may include coordinates that locate the anatomical structure in three dimensions.

FIG. 2(a)(5) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing two or more three-dimensional medical image anatomical structure locations, enhanced using a contrast agent, included in the three-dimensional medical image and processing two or more current image anatomical structure locations, enhanced using a current image contrast agent, included in the current image to generate the two or more transform coefficients (operation 2026) and may include processing two or more three-dimensional medical image anatomical structure locations, enhanced using a radiopaque material, included in the three-dimensional medical image, and processing two or more current image anatomical structure locations, enhanced using the radiopaque material, included in the current image to generate the two or more transform coefficients (operation 2028).

Referring to FIG. 1(a)(1) and FIG. 1(a)(2), in some embodiments, the processing hardware/software/firmware 1002 included in the processing apparatus 1000 may process two or more three-dimensional medical image anatomical structure locations, enhanced using a contrast agent, included in the three-dimensional medical image, and process two or more current image anatomical structure locations, enhanced using a current image contrast agent, included in the current image to generate the two or more transform coefficients (operation 2026).

Referring again to FIG. 1(*a*)(1) and FIG. 1(*a*)(2), in some embodiments, the processing hardware/software/firmware 1002 included in the processing apparatus 1000 may process two or more three-dimensional medical image anatomical structure locations, enhanced using a radiopaque material, included in the three-dimensional medical image, and process two or more current image anatomical structure locations, enhanced using the radiopaque material, included in the current image to generate the two or more transform coefficients (operation 2028).

Contrast agents may include a material, such as barium, used in radiography to increase the contrast of an image. Contrast agents may include positive contrast agents and negative contrast agents. Exemplary positive contrast agents may include barium and iodine. Exemplary negative contrast agents may include perflurocarbons. A positive contrast agent absorbs x-rays more strongly than the anatomical structure being examined. A negative contrast agent absorbs x-rays less strongly than the anatomical structure being examined. Anatomical structures and locations of anatomical structures may be enhanced using a contrast agent. A radiopaque material, a material substantially impenetrable by x-rays, is one type of contrast agent. Anatomical structure locations may be enhanced in an image, such as an x-ray image, by introducing a radiopaque material into the anatomical structure.

FIG. 2(*a*)(6) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image implanted marker locations included in the three-dimensional medical image and processing two or more current image implanted marker locations included in the current image to generate the two or more transform coefficients (operation 2032), and may include processing two or more three-dimensional image post locations included in the three-dimensional medical image and processing two or more current image post locations included in the current image to generate the two or more transform coefficients (operation 2034).

Referring to FIG. 1(*a*)(1) and FIG. 1(*a*)(2), in some embodiments, the processing hardware/software/firmware 1002 included in the processing apparatus 1000 may process two or more three-dimensional image implanted marker locations included in the three-dimensional medical image, and process two or more current image implanted marker locations included in the current image to generate the two or more transform coefficients (operation 2032).

Referring again to FIG. 1(*a*)(1) and FIG. 1(*a*)(2), in some embodiments, the processing hardware/software/firmware 1002 included in the processing apparatus 1000 may process two or more three-dimensional image post locations included in the three-dimensional medical image, and process two or more current image post locations included in the current image to generate the two or more transform coefficients (operation 2034).

An implanted marker may include materials or structures implanted in a subject to identify a location in an anatomical structure included in the subject. Implanted marker locations may include coordinates in three-dimensional space that define the location of an implanted marker in the three-dimensional space. An image post is an example of an implanted marker. In some embodiments, an image post includes a substantially cylindrical structure that may be identified in a medical image. Exemplary materials suitable for use in forming an image post may include iron and manganese. Image post locations may include coordinates in three-dimensional space that define the location of the image post, for example, in an anatomical structure in a medical image.

FIG. 2(*a*)(7) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional locations substantially defined by an image mesh included in the three-dimensional medical image and processing two or more current image locations substantially defined by a current image mesh included in the current image to generate the two or more transform coefficients (operation 2038), and may include processing two or more three-dimensional image locations substantially defined by a mesh, located on an anatomical structure, included in the three-dimensional medical image and processing two or more current image locations substantially defined by the mesh, located on the anatomical structure, included in the current image to generate the two or more transform coefficients (operation 2040).

Referring to FIG. 1(*a*)(1) and FIG. 1(*a*)(2), in some embodiments, the processing hardware/software/firmware 1002 included in the processing apparatus 1000 may process two or more three-dimensional locations substantially defined by an image mesh included in the three-dimensional medical image, and process two or more current image locations substantially defined by a current image mesh included in the current image to generate the two or more transform coefficients (operation 2038).

Referring again to FIG. 1(*a*)(1) and FIG. 1(*a*)(2), in some embodiments, the processing hardware/software/firmware 1002 included in the processing apparatus 1000 may process two or more three-dimensional image locations substantially defined by a mesh, located on an anatomical structure, included in the three-dimensional medical image, and process two or more current image locations substantially defined by the mesh, located on the anatomical structure, included in the current image to generate the two or more transform coefficients (operation 2040).

An image mesh may include a structure, such as a wire mesh structure, or a fabric that includes a network of open areas within fabric. In some embodiments, the fabric includes a metal. An image mesh may be used to identify locations in an anatomical structure. For example, the location of an anatomical structure in an image may be substantially defined by a mesh located on the anatomical structure.

FIG. 2(*a*)(8) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image dot images, formed from a biodegradable marker included in the three-dimensional medical image, and processing two or more current image dot images, formed from the biodegradable marker included in the current image to generate the two or more transform coefficients (operation 2044), and may include processing two or more three-dimensional image dot images, formed from a hydrogel located on an anatomical surface, included in the three-dimensional medical image, and processing two or more current image dot images, formed from the hydrogel located on the anatomical surface, included in the current image to generate the two or more transform coefficients (operation 2046).

Referring to FIG. 1(*a*)(1) and FIG. 1(*a*)(2), in some embodiments, the processing hardware/software/firmware 1002 included in the processing apparatus 1000 may process two or more three-dimensional image dot images, formed from a biodegradable marker included in the three-dimensional medical image, and process two or more current image dot images, formed from the biodegradable marker included in the current image to generate the two or more transform coefficients (operation 2044).

Referring again to FIG. 1(*a*)(1) and FIG. 1(*a*)(2), in some embodiments, the processing hardware/software/firmware 1002 included in the processing apparatus 1000 may process two or more three-dimensional image dot images, formed from a hydrogel located on an anatomical surface, included in the three-dimensional medical image, and process two or more current image dot images, formed from the hydrogel located on the anatomical surface, included in the current image to generate the two or more transform coefficients (operation 2046).

A biodegradable marker may include a material or structure capable of being decomposed in a biological environment, such as when introduced into an anatomical structure, such as a human brain. In some embodiments, a biodegradable marker may be used to form dot images in a medical image. A hydrogel may include a colloidal gel in which water is the dispersion medium. A hydrogel is an exemplary material suitable for use in forming dot images in a medical image. A hydrogel introduced into an anatomical structure included in a subject may provide a biodegradable marker for the anatomical structure.

FIG. 2(*a*)(9) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image dot images, formed from a hydrogel located in an operative bed, in an operative bed image included in the three dimensional medical image and processing two or more current image dot images, formed from the hydrogel located in the operative bed, in a current operative bed image included in the current image to generate the two or more transform coefficients (operation 2050), and may include processing two or more three-dimensional image dot images, formed from a contrast enhancing material, in a brain image included in the three-dimensional medical image and processing two or more current image dot images, formed from the contrast enhancing material, in a current brain image included in the current image to generate the two or more transform coefficients (2052).

Referring to FIG. 1(*a*)(1) and FIG. 1(*a*)(2), in some embodiments, the processing hardware/software/firmware 1002 included in the processing apparatus 1000 may process two or more three-dimensional image dot images, formed from a hydrogel located in an operative bed, in an operative bed image included in the three dimensional medical image, and process two or more current image dot images, formed from the hydrogel located in the operative bed, in a current operative bed image included in the current image to generate the two or more transform coefficients (operation 2050).

Referring again to FIG. 1(*a*)(1) and FIG. 1(*a*)(2), in some embodiments, the processing hardware/software/firmware 1002 included in the processing apparatus 1000 may process two or more three-dimensional image dot images, formed from a contrast enhancing material, in a brain image included in the three-dimensional medical image, and process two or more current image dot images, formed from the contrast enhancing material, in a current brain image included in the current image to generate the two or more transform coefficients (2052).

An operative bed may include a location for a surgical operation. The location of an operative bed in a medical image may be identified by introducing a hydrogel in the form of hydrogel dots into the operative bed. When introduced into an operative bed included in a brain, hydrogel dots may be used to locate anatomical structures, such as arteries, within the brain. In some embodiments, dot images may be formed from a contrast enhancing material.

FIG. 2(*a*)(10) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image dot images, formed from a contrast enhancing material, in a tumor image included in the three-dimensional medical image and processing two or more current image dot images, formed from the contrast enhancing material, in a current tumor image included in the current image to generate the two or more transform coefficients (operation 2056), and may include processing two or more three-dimensional image fiducial locations distributed in a region of interest included in the three-dimensional medical image and processing two or more current image fiducial locations distributed in the region of interest included in the current image to generate the two or more transform coefficients (operation 2058).

Referring to FIG. 1(*a*)(1) and FIG. 1(*a*)(2), in some embodiments, the processing hardware/software/firmware 1002 included in the processing apparatus 1000 may process two or more three-dimensional image dot images, formed from a contrast enhancing material, in a tumor image included in the three-dimensional medical image, and process two or more current image dot images, formed from the contrast enhancing material, in a current tumor image included in the current image to generate the two or more transform coefficients (operation 2056).

Referring again to FIG. 1(*a*)(1) and FIG. 1(*a*)(2), in some embodiments, the processing hardware/software/firmware 1002 included in the processing apparatus 1000 may process two or more three-dimensional image fiducial locations distributed in a region of interest included in the three-dimensional medical image, and process two or more current image fiducial locations distributed in the region of interest included in the current image to generate the two or more transform coefficients (operation 2058).

A contrast enhancing material may be used in radiography to increase the contrast in a portion of an image, such as a tumor image, included in a brain image. Exemplary contrast enhancing materials may include hydrogels. Fiducial locations include the locations of fiducial markers. Exemplary fiducial markers may include hydrogel dots. A region of interest may include the location of a tumor or the periphery of the location of a tumor, such as a cancer tumor, in an anatomical structure. Exemplary anatomical structures may include arteries. In some embodiments, fiducial markers are introduced into a region of interest, such as a tumor or the periphery of the tumor, to locate the tumor in a medical image.

FIG. 2(*a*)(11) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image fiducial locations substantially uniformly distributed in a region of interest included in the three-dimensional medical image and processing two or more current image fiducial locations substantially uniformly distributed in the region of interest included in the current image to generate the two or more transform coefficients (operation 2062), and may include processing two or more three-dimensional image fiducial locations substantially non-uniformly distributed in a region of interest included in the three-dimensional medical image and processing two or more current image fiducial locations substantially uniformly distributed in the region of interest included in the current image to generate the two or more transform coefficients (operation 2064).

Referring to FIG. 1(*a*)(1) and FIG. 1(*a*)(2), in some embodiments, the processing hardware/software/firmware 1002 included in the processing apparatus 1000 may process two or more three-dimensional image fiducial locations substantially uniformly distributed in a region of interest included in the three-dimensional medical image, and process two or more current image fiducial locations substantially uniformly distributed in the region of interest included in the current image to generate the two or more transform coefficients (operation 2062).

Referring again to FIG. 1(*a*)(1) and FIG. 1(*a*)(2), in some embodiments, the processing hardware/software/firmware 1002 included in the processing apparatus 1000 may process two or more three-dimensional image fiducial locations substantially non-uniformly distributed in a region of interest included in the three-dimensional medical image, and process two or more current image fiducial locations substantially uniformly distributed in the region of interest included in the current image to generate the two or more transform coefficients (operation 2064).

Fiducial locations or markers may be introduced into a region of interest. A region of interest may include a particular anatomical structures or a tumor, such as a cancer tumor. In some embodiments, two or more fiducial locations may be introduced and distributed substantially uniformly in the region of interest. Substantially uniform distribution may include a distribution having a substantially constant distance between fiducial locations. Substantially uniform distribution of fiducial locations substantially enables the measurement of structures in the region of interest. In some embodiments, fiducial locations may be introduced and distributed substantially non-uniformly in a region of interest. Substantially non-uniform distribution may include a random distribution.

FIG. 2(*a*)(12) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image fiducial locations formed to substantially outline an anatomical feature included in the three-dimensional medical image and processing two or more current image fiducial locations formed to substantially outline the anatomical feature included in the current image to generate the two or more transform coefficients (operation 2068), and may include processing two or more three-dimensional image fiducial locations formed to substantially outline a tumor included in the three-dimensional medical image and processing two or more current image fiducial locations formed to substantially outline the tumor included in the current image to generate the two or more transform coefficients (operation 2070).

Referring to FIG. 1(*a*)(1) and FIG. 1(*a*)(2), in some embodiments, the processing hardware/software/firmware 1002 included in the processing apparatus 1000 may process two or more three-dimensional image fiducial locations formed to substantially outline an anatomical feature included in the three-dimensional medical image, and process two or more current image fiducial locations formed to substantially outline the anatomical feature included in the current image to generate the two or more transform coefficients (operation 2068).

Referring again to FIG. 1(*a*)(1) and FIG. 1(*a*)(2), in some embodiments, the processing hardware/software/firmware 1002 included in the processing apparatus 1000 may process two or more three-dimensional image fiducial locations formed to substantially outline a tumor included in the three-dimensional medical image and process two or more current image fiducial locations formed to substantially outline the tumor included in the current image to generate the two or more transform coefficients (operation 2070).

Fiducial locations may be selected or formed to identify the location of an anatomical feature or a tumor. Exemplary anatomical features may include arteries or bones. Exemplary tumors may include cancer tumors including benign and malignant tumors. In some embodiments, fiducial locations may be selected or formed to substantially outline an anatomical feature. In some embodiments, fiducial locations may be selected or formed to substantially outline a tumor. Substantially outlining an anatomical feature or a tumor assists in determining when the anatomical feature or tumor has been removed or reduced in size.

Fiducial locations may be selected or formed to identify the location of an anatomical feature or a lesion. In some embodiments, fiducial locations may be selected or formed to substantially outline an anatomical feature. In some embodiments, fiducial locations may be selected or formed to substantially outline a lesion. Substantially outlining an anatomical feature or a lesion assists in determining when the anatomical feature or lesion has been removed or reduced in size.

Lesions may include a tumor, vascular anomaly (aneurysm, arteriovenous malformation, or cavemoma), inflammatory lesion, congenital anomaly (e.g. cortical dysplasia, heterotopia) infection, blood clot and stroke.

FIG. 2(*a*)(13) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional image fiducial locations formed to substantially outline a lesion included in the three-dimensional medical image and processing two or more current image fiducial locations formed to substantially outline the lesion included in the current image to generate the two or more transform coefficients (operation 2074), and may include processing two or more three-dimensional fiducial locations substantially defined by two or more contrast enhancing bead images included in the three-dimensional medical image and processing two or more current image fiducial locations substantially defined by the two or more contrast enhancing bead images included in the current image to generate the two or more transform coefficients (operation 2076).

Referring to FIG. 1(*a*)(1) and FIG. 1(*a*)(2), in some embodiments, the processing hardware/software/firmware 1002 included in the processing apparatus 1000 may process two or more three-dimensional image fiducial locations formed to substantially outline a lesion included in the three-dimensional medical image, and process two or more current image fiducial locations formed to substantially outline the lesion included in the current image to generate the two or more transform coefficients (operation 2074).

Referring again to FIG. 1(a)(1) and FIG. 1(a)(2), in some embodiments, the processing hardware/software/firmware 1002 included in the processing apparatus 1000 may process two or more three-dimensional fiducial locations substantially defined by two or more contrast enhancing bead images included in the three-dimensional medical image, and process two or more current image fiducial locations substantially defined by the two or more contrast enhancing bead images included in the current image to generate the two or more transform coefficients (operation 2076).

Fiducial locations may be selected or formed to substantially outline a lesion. Exemplary lesions may include wounds, injuries, or a pathological change in an organ or tissue, such as a brain tumor or a heart infection. Exemplary materials suitable for use in connection with substantially outlining a lesion may include contrast enhancing beads capable of forming bead images in a three-dimensional medical image. In some embodiments, exemplary contrast enhancing beads may include bead formed from gadolinium, iron, manganese, or perfluorocarbons. In some embodiments, fiducial locations may be substantially defined by two or more contrast enhancing bead images.

FIG. 2(a)(14) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing two or more three-dimensional fiducial locations substantially defined by two or more enhanced fluorescence bead images included in the three-dimensional medical image and processing two or more current image fiducial locations substantially defined by the two or more enhanced fluorescence bead images included in the current image to generate the two or more transform coefficients (operation 2080), and may include processing two or more three-dimensional image fiducial locations substantially defined by two or more enhanced MRI signature bead images included in the three-dimensional medical image and processing two or more current image fiducial locations substantially defined by the two or more enhanced MRI signature bead images included in the current image to generate the two or more transform coefficients (operation 2082).

Referring to FIG. 1(a)(1) and FIG. 1(a)(2), in some embodiments, the processing hardware/software/firmware 1002 included in the processing apparatus 1000 may process two or more three-dimensional fiducial locations substantially defined by two or more enhanced fluorescence bead images included in the three-dimensional medical image, and process two or more current image fiducial locations substantially defined by the two or more enhanced fluorescence bead images included in the current image to generate the two or more transform coefficients (operation 2080).

Referring again to FIG. 1(a)(1) and FIG. 1(a)(2), in some embodiments, the processing hardware/software/firmware 1002 included in the processing apparatus 1000 may process two or more three-dimensional image fiducial locations substantially defined by two or more enhanced MRI signature bead images included in the three-dimensional medical image, and process two or more current image fiducial locations substantially defined by the two or more enhanced MRI signature bead images included in the current image to generate the two or more transform coefficients (operation 2082).

Fiducial locations include identifying marks or other indicia of a location included in an image. In some embodiments, one or more fiducial locations may be formed from enhanced fluorescence bead images. Enhanced fluorescence bead images include bead images formed from the emission of radiation from one or more beads including a contrast agent and in response to radiation. In some embodiments, fiducial locations may be defined by two or more enhanced fluorescence bead images. In some embodiments, fiducial locations may be formed from enhanced MRI signature bead images. Enhanced MRI signature images may be formed by including one or more contrast agents in an MRI imaged bead. Exemplary MRI contrast agents include gadolinium, iron, manganese and perflurocarbons. In some embodiments, enhanced MRI signature images enable improved characterization of lesions and detection of malignant lesions in images. In some embodiments, fiducial locations may be defined by two or more enhanced MRI signature bead images.

Enhanced MRI signature may be one example of an imaging modality. Identification of fiducial locations is not limited to enhanced MRI signature. Other exemplary imaging modalities may include MRI, XRAY based imaging, CT, fluoroscopy, ultrasound (US), and optical imaging (e.g. NIR, direct visualization).

FIG. 2(a)(15) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing two or more three-dimensional image fiducial locations substantially defined by two or more enhanced ultra-sound signature bead images included in the three-dimensional medical image and processing two or more current image fiducial locations substantially defined by the two or more enhanced ultra-sound signature bead images included in the current image to generate the two or more transform coefficients (operation 2086), and may include processing two or more three-dimensional fiducial locations substantially defined by two or more tantalum compound bead images included in the three-dimensional medical image and processing two or more current image fiducial locations substantially defined by the two or more tantalum compound bead images included in the current image to generate the two or more transform coefficients (operation 2088).

Referring to FIG. 1(a)(1) and FIG. 1(a)(2), in some embodiments, the processing hardware/software/firmware 1002 included in the processing apparatus 1000 may process two or more three-dimensional image fiducial locations substantially defined by two or more enhanced ultra-sound signature bead images included in the three-dimensional medical image, and process two or more current image fiducial locations substantially defined by the two or more enhanced ultra-sound signature bead images included in the current image to generate the two or more transform coefficients (operation 2086).

Referring again to FIG. 1(a)(1) and FIG. 1(a)(2), in some embodiments, the processing hardware/software/firmware 1002 included in the processing apparatus 1000 may process two or more three-dimensional fiducial locations substantially defined by two or more tantalum compound bead images included in the three-dimensional medical image and process two or more current image fiducial locations substantially defined by the two or more tantalum compound bead images included in the current image to generate the two or more transform coefficients (operation 2088).

An enhanced ultrasound signature may be formed from ultrasound scanning or sonography by exposing a subject to sound waves to produce images of the subject. Enhanced ultrasound, which may be referred to as contrast-enhanced ultrasound, includes the use of ultrasound contrast agents with medical sonography. In some embodiments, ultrasound contrast agents include gas-filled microbubbles. Ultrasound images may be captured in real-time and may enable the capture of blood flowing through blood vessels. In some embodiments, ultrasound images may enable the diagnosis of medical conditions or assess organ damage. Enhanced ultrasound signatures may be formed from scanning an object, such as a bead, including a contrast enhancer. Ultrasound signature bead images may include images of one or more beads detectable using ultrasound. Information provided by ultrasound imaging may include pain information, swelling information and infection information. Exemplary organs suitable for scanning using enhanced ultrasound include the heart, liver, gallbladder, spleen, pancreas, kidneys, uterus, ovaries, eyes and thyroid glands. In some embodiments, beads suitable for use in connection with ultrasound imaging include one or more beads formed from a tantalum compound. Fiducial locations may be defined by two or more tantalum compound beads imaged using ultrasound techniques. Beads are not limited to a round shape. Non-round beads may be used in connection with fiducial location identification.

FIG. 2(*a*)(16) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional fiducial locations substantially defined by two or more enhanced CT signature marker images included in the three-dimensional medical image and processing two or more current image fiducial locations substantially defined by the two or more enhanced CT signature marker images included in the current image to generate the two or more transform coefficients (operation 2092), and may include processing two or more three-dimensional fiducial locations substantially defined by two or more enhanced US signature marker images included in the three-dimensional medical image and processing two or more current image fiducial locations substantially defined by the two or more enhanced US signature marker images included in the current image to generate the two or more transform coefficients (operation 2094).

Referring to FIG. 1(*a*)(1) and FIG. 1(*a*)(2), in some embodiments, the processing hardware/software/firmware 1002 included in the processing apparatus 1000 may process two or more three-dimensional fiducial locations substantially defined by two or more enhanced CT signature marker images included in the three-dimensional medical image, and process two or more current image fiducial locations substantially defined by the two or more enhanced CT signature marker images included in the current image to generate the two or more transform coefficients (operation 2092).

Referring again to FIG. 1(*a*)(1) and FIG. 1(*a*)(2), in some embodiments, the processing hardware/software/firmware 1002 included in the processing apparatus 1000 may process two or more three-dimensional fiducial locations substantially defined by two or more enhanced US signature marker images included in the three-dimensional medical image, and process two or more current image fiducial locations substantially defined by the two or more enhanced US signature marker images included in the current image to generate the two or more transform coefficients (operation 2094).

Enhanced computed tomography (CT) signature marker images include images enhanced using one or more computed tomography contrast agents. Exemplary computed tomography contrast agents may include barium and iodine. In some embodiments, fiducial locations may be substantially defined by two or more enhanced CT signature marker images.

Enhanced ultrasound signature marker images include images enhanced by ultrasound contrast agents. In some embodiments, ultrasound contrast agents may include microspheres or microbubbles. Exemplary microspheres or microbubbles may include a shell, for example a shell that includes a lipid or polymer, and a gas, for example, a gas such as nitrogen or air. In some embodiments, fiducial locations may be substantially defined by two or more enhanced ultrasound signature marker images.

FIG. 2(*a*)(17) shows a flow diagram of the method 2006, illustrated within the context of method 2000 as shown in FIG. 2(*a*)(1), wherein processing two or more fiducials included in a three-dimensional medical image and included in a current image to generate two or more transform coefficients of a transform (operation 2002), may include processing two or more three-dimensional fiducial locations substantially defined by two or more enhanced optical marker images included in the three-dimensional medical image and processing two or more current image fiducial locations substantially defined by the two or more enhanced optical marker images included in the current image to generate the two or more transform coefficients (operation 2098), and may include processing two or more three-dimensional fiducial locations substantially defined by two or more enhanced x-ray marker images included in the three-dimensional medical image and processing two or more current image fiducial locations substantially defined by the two or more enhanced x-ray marker images included in the current image to generate the two or more transform coefficients (operation 2100).

Referring to FIG. 1(*a*)(1) and FIG. 1(*a*)(2), in some embodiments, the processing hardware/software/firmware 1002 included in the processing apparatus 1000 may process two or more three-dimensional fiducial locations substantially defined by two or more enhanced optical marker images included in the three-dimensional medical image, and process two or more current image fiducial locations substantially defined by the two or more enhanced optical marker images included in the current image to generate the two or more transform coefficients (operation 2098).

Referring again to FIG. 1(*a*)(1) and FIG. 1(*a*)(2), in some embodiments, the processing hardware/software/firmware 1002 included in the processing apparatus 1000 may process two or more three-dimensional fiducial locations substantially defined by two or more enhanced x-ray marker images included in the three-dimensional medical image and process two or more current image fiducial locations substantially defined by the two or more enhanced x-ray marker images included in the current image to generate the two or more transform coefficients (operation 2100).

Enhanced optical marker images include images formed using optical tomography including enhancement agents. Optical tomography may include radiologic techniques for forming three-dimensional images of a plane section of an object, such as the human brain. Optical marker images may be formed from light transmitted and scattered by a subject. Exemplary subjects may include organs, such as a brain, heart, or lungs. In some embodiments, fiducial locations may be substantially defined by two or more enhanced optical marker images included in a subject image, such as a human brain.

X-ray marker images may include images formed using x-rays. Exemplary x-rays may include photons having a wavelength from about 0.01 nanometers to about 10 nanometers. In some embodiments, fiducial locations may be substantially defined by two or more enhanced x-ray marker images. X-ray marker images may be enhanced using contrast agents. In some embodiments, barium sulfate may be used as an x-ray contrast agent.

FIG. 2(a)(18) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing two or more three-dimensional image fiducial locations substantially defined by two or more images of two or more beads, having different compositions, included in the three-dimensional medical image and processing two or more current image fiducial locations substantially defined by the two or more images of two or more beads. having different compositions, included in the current image to generate the two or more transform coefficients (operation 2104), and may include processing two or more three-dimensional image fiducial locations substantially defined by two or more images of two or more beads, having different proportions and compositions, included in the three-dimensional medical image and processing two or more current image fiducial locations substantially defined by the two or more images of two or more beads, having different compositions and proportions, included in the current image to generate the two or more transform coefficients (operation 2106).

Referring to FIG. 1(a)(1) and FIG. 1(a)(2), in some embodiments, the processing hardware/software/firmware 1002 included in the processing apparatus 1000 may process two or more three-dimensional image fiducial locations substantially defined by two or more images of two or more beads, having different compositions, included in the three-dimensional medical image, and process two or more current image fiducial locations substantially defined by the two or more images of two or more beads having different compositions, included in the current image to generate the two or more transform coefficients (operation 2104).

Referring again to FIG. 1(a)(1) and FIG. 1(a)(2), in some embodiments, the processing hardware/software/firmware 1002 included in the processing apparatus. 1000 may process two or more three-dimensional image fiducial locations substantially defined by two or more images of two or more beads, having different proportions and compositions, included in the three-dimensional medical image, and process two or more current image fiducial locations substantially defined by the two or more images of two or more beads, having different compositions and proportions, included in the current image to generate the two or more transform coefficients (operation 2106).

Two or more beads having different compositions may be included in a medical image. In some embodiments, the two or more beads include polyacrylonitrile hydrogel and another material. Fiducial locations may be substantially defined by two or more images of two or more beads having different compositions. In some embodiments, the beads having different compositions may be included in the image in different proportions. In some embodiments, one composition may be included in a proportion of thirty percent and the other composition may be included in the proportion of seventy percent.

In some embodiments, fiducial locations may be substantially defined by two or more images of two or more beads having different compositions and proportions.

FIG. 2(a)(19) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing between about ten and about forty three-dimensional image fiducial locations on a surface of a brain and between about ten and about forty three-dimensional fiducial locations in an area to be resected in the brain and included in the three-dimensional medical image and processing between about ten and about forty three-dimensional image fiducial locations on the surface of the brain and between about ten and about forty current image fiducial locations in the area to be resected in the brain included in the current image to generate the two or more transform coefficients (operation 2110), and may include processing a three-dimensional network of two or more fiducials included in the three-dimensional medical image and processing the three-dimensional network of the two or more fiducials included in the current image to generate the two or more transform coefficients (operation 2112).

Referring to FIG. 1(a)(1) and FIG. 1(a)(2), in some embodiments, the processing hardware/software/firmware 1002 included in the processing apparatus 1000 may process between about ten and about forty three-dimensional image fiducial locations on a surface of a brain and between about ten and about forty three-dimensional fiducial locations in an area to be resected in the brain and included in the three-dimensional medical image, and process between about ten and about forty three-dimensional image fiducial locations on the surface of the brain and between about ten and about forty current image fiducial locations in the area to be resected in the brain included in the current image to generate the two or more transform coefficients (operation 2110).

Referring again to FIG. 1(a)(1) and FIG. 1(a)(2), in some embodiments, the processing hardware/software/firmware 1002 included in the processing apparatus 1000 may process a three-dimensional network of two or more fiducials included in the three-dimensional medical image and process the three-dimensional network of the two or more fiducials included in the current image to generate the two or more transform coefficients (operation 2112).

Between about ten and about forty three-dimensional image fiducial locations may be included on a surface of a brain for processing. In some embodiments, between about ten and about forty three-dimensional fiducial locations may be included in an area to be resected in a brain. A resection may include the removal, such as through surgery, of material in a subject. The progress of a resection may be monitored by observing changes in the locations of the between about ten and about forty three-dimensional fiducial locations.

In some embodiments, a three-dimensional network of two or more fiducials may be included in a three-dimensional medical image. In some embodiments, between about ten and about forty three-dimensional image fiducial locations may be included on a surface of a brain for processing. In some embodiments, a three-dimensional network of two or more fiducials may be included in a three-dimensional medical image and may be processed in the processing of the three-dimensional medical image.

Processing is not limited to a particular number of surface locations. In some embodiments, a sufficient number of surface locations of a structure may be processed. In some embodiments, exemplary surface locations may be located on a human brain.

FIG. 2(a)(20) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing an endogenous three-dimensional network of two or more fiducials included in the three-dimensional medical image and processing the endogenous three-dimensional network of the two or more fiducials included in the current image to generate the two or more transform coefficients (operation 2116), and may include processing an endogenous three-dimensional network of two or more indocyanine green highlighted fiducials included in the three-dimensional medical image and processing the endogenous three-dimensional network of the two or more indocyanine green highlighted fiducials included in the current image to generate the two or more transform coefficients (operation 2118).

Referring to FIG. 1(a)(1) and FIG. 1(a)(2), in some embodiments, the processing hardware/software/firmware 1002 included in the processing apparatus 1000 may process an endogenous three-dimensional network of two or more fiducials included in the three-dimensional medical image, and process the endogenous three-dimensional network of the two or more fiducials included in the current image to generate the two or more transform coefficients (operation 2116).

Referring again to FIG. 1(a)(1) and FIG. 1(a)(2), in some embodiments, the processing hardware/software/firmware 1002 included in the processing apparatus 1000 may process an endogenous three-dimensional network of two or more indocyanine green highlighted fiducials included in the three-dimensional medical image, and process the endogenous three-dimensional network of the two or more indocyanine green highlighted fiducials included in the current image to generate the two or more transform coefficients (operation 2118).

An endogenous three-dimensional network of two or more fiducials includes a network of two or more fiducials produced from within a subject, such as a human organ. Exemplary human organs in which an endogenous three-dimensional network of two or more fiducials may be produced include kidneys, lungs, heart, and brain. In some embodiments, the endogenous three-dimensional network may include two or more indocyanine green highlighted fiducials.

FIG. 2(a)(21) shows a flow diagram of the method 2006, illustrated within the context of method 2000 as shown in FIG. 2(a)(1), wherein processing two or more fiducials included in a three-dimensional medical image and included in a current image to generate two or more transform coefficients of a transform (operation 2002), may include processing an endogenous three-dimensional network of x-ray fluorescence highlighted fiducials included in the three-dimensional medical image and processing the two or more x-ray fluorescence highlighted fiducials included in the current image to generate the two or more transform coefficients (operation 2122).

Referring to FIG. 1(a)(1) and FIG. 1(a)(2), in some embodiments, the processing hardware/software/firmware 1002 included in the processing apparatus 1000 may process an endogenous three-dimensional network of x-ray fluorescence highlighted fiducials included in the three-dimensional medical image, and process the two or more x-ray fluorescence highlighted fiducials included in the current image to generate the two or more transform coefficients (operation 2122).

An endogenous three-dimensional network of x-ray fluorescence highlighted fiducials may include a three-dimensional network of fiducials formed from within a subject and highlighted through x-ray fluorescence. For example, in some embodiments an endogenous three-dimensional network of x-ray fluorescence highlighted fiducials may include a three-dimensional network of fiducials, such as blood vessels, formed from within a human brain and highlighted through x-ray fluorescence.

FIG. 2(a)(22) shows a flow diagram of a method 2124, illustrated within the context of method 2000 as shown in FIG. 2(a)(1), wherein applying the transform to the three-dimensional medical image to form a present image (operation 2004), may include applying the transform including an affine transform to the three-dimensional medical image to form the present image (operation 2126), and may include applying the transform including a conformal transform to the three-dimensional medical image to form the present image (2128).

Referring to FIG. 1(a)(1) and FIG. 1(a)(2), in some embodiments, the applying hardware/software/firmware 1004 included in the processing apparatus 1000 may apply the transform including an affine transform to the three-dimensional medical image to form the present image (operation 2126), and may apply the transform including a conformal transform to the three-dimensional medical image to form the present image (2128).

An affine transform may include a transform between two vector spaces including a linear transformation followed by a translation. In some embodiments, an affine transform may include a transformation of coordinates that is equivalent to a linear transformation and a translation. A conformal transform may preserve both angles and the shapes of figures. In some embodiments, a conformal transform may include designating or specifying a mapping of a surface or region upon another surface so that all angles between intersecting curves remain unchanged.

FIG. 2(a)(23) shows a flow diagram of the method 2124, illustrated within the context of method 2000 as shown in FIG. 2(a)(1), wherein applying the transform to the three-dimensional medical image to form a present image (operation 2004), may include applying the transform including a harmonic transform to the three-dimensional medical image to form the present image (operation 2132) and may include applying the transform including a volume harmonic transform to the three-dimensional medical image to form the present image (operation 2134).

Referring to FIG. 1(a)(1) and FIG. 1(a)(2), in some embodiments, the applying hardware/software/firmware 1004 included in the processing apparatus 1000 may apply the transform including a harmonic transform to the three-dimensional medical image to form the present image (operation 2132) and may apply the transform including a volume harmonic transform to the three-dimensional medical image to form the present image (operation 2134).

A harmonic transform may include a transform that transforms information into a form that includes the superposition of basic waves included in the information. A volume harmonic transform may include a transform that transforms information into a form that includes a superposition of basic waves in three dimensions included in the information. In some embodiments, harmonic transform waves that are an integer multiple of waves are included in the information.

FIG. 2(a)(24) shows a flow diagram of the method 2124, illustrated within the context of method 2000 as shown in FIG. 2(a)(1), wherein applying the transform to the three-dimensional medical image to form a present image (operation 2004), may include applying the transform including a continuous transform that preserves nearest neighbor relationships to form the present image (operation 2138), and may include applying the transform including a biomechanics transform including biomechanics information to form the present image (operation 2140).

Referring to FIG. 1(a)(1) and FIG. 1(a)(2), in some embodiments, the applying hardware/software/firmware 1004 included in the processing apparatus 1000 may apply the transform including a continuous transform that preserves nearest neighbor relationships to form the present image (operation 2138), and may apply the transform including a biomechanics transform including biomechanics information to form the present image (operation 2140).

A continuous transform that preserves nearest neighbor relationships may include a transform of a continuous signal that interpolates, if necessary, by selecting the value of the nearest defined point or neighbor. In some embodiments, a transform of a continuous signal may include an image signal, such as a image signal of a human brain, that interpolates, if necessary, by selecting the value of the nearest defined point, such as an image fiducial, such as an artery located in the brain, where the image fiducial is the nearest defined point or neighbor. A biomechanics transform may include a transform of information that includes continuous information such as information included in continuous materials, such as solids or fluids. Exemplary continuous materials, such as biological materials, may provide continuous information in the form of an image of the biological materials. For example, a human organ, such as a brain, may provide continuous information in the form of an image of the brain.

FIG. 2(a)(25) shows a flow diagram of the method 2124, illustrated within the context of method 2000 as shown in FIG. 2(a)(1), wherein applying the transform to the three-dimensional medical image to form a present image (operation 2004), may include applying the transform including an elasticity and modulus transform that includes elasticity and modulus information to form the present image (operation 2144), and may include applying the transform including a stress and strain transform including stress and strain information to form the present image (operation 2146).

Referring to FIG. 1(a)(1) and FIG. 1(a)(2), in some embodiments, the applying hardware/software/firmware 1004 included in the processing apparatus 1000 may apply the transform including an elasticity and modulus transform that includes elasticity and modulus information to form the present image (operation 2144), and may apply the transform including a stress and strain transform including stress and strain information to form the present image (operation 2146).

An elasticity and modulus transform that includes elasticity and modulus information may include information related to the degree to which a material having an original form after deformation returns to the original form. In some embodiments, elasticity and modulus information modulus information may include information related to the degree to which an organ, such as a human brain, kidney, heart, lung, or muscle having an original form after deformation returns to the original form.

A stress and strain transform including stress and strain information that may be related to one or more forces that strain or deform a body. In some embodiments, a stress and strain transform may include stress and strain information that may be related to one or more forces that strain or deform an organ, such as a brain, heart, kidney, lung, spleen, or muscle.

FIG. 2(a)(26) shows a flow diagram of the method 2124, illustrated within the context of method 2000 as shown in FIG. 2(a)(1), wherein applying the transform to the three-dimensional medical image to form a present image (operation 2004), may include applying the transform including separate transforms to separate portions of the three-dimensional medical image to form the present image (operation 2150), and may include applying the transform including a piecewise continuous transform to form the present image (operation 2152).

Referring to FIG. 1(a)(1) and FIG. 1(a)(2), in some embodiments, the applying hardware/software/firmware 1004 included in the processing apparatus 1000 may apply the transform including separate transforms to separate portions of the three-dimensional medical image to form the present image (operation 2150), and may apply the transform including a piecewise continuous transform to form the present image (operation 2152).

Separate transforms may be applied to separate portions of a three-dimensional medical image. In some embodiments, the transforms applied to separate portions of a three-dimensional medical image may be the same transforms. In some embodiments, the transforms applied to separate portions of a three-dimensional medical image may be different transforms. A piecewise continuous transform may be applied to a portion of a three-dimensional medical image. In some embodiments, the piecewise continuous transform may be applied to a piecewise continuous information included in three-dimensional medical image. Piecewise continuous information may include information that is continuous over an interval, such as a continuous function over an interval between 1 and 2 in a Cartesian coordinate system.

FIG. 2(a)(27) shows a flow diagram of the method 2124, illustrated within the context of method 2000 as shown in FIG. 2(a)(1), wherein applying the transform to the three-dimensional medical image to form a present image (operation 2004), may include applying the transform including substantial minimization of a function of two or more fiducial locations in the three dimensional medical image and two or more fiducial locations in the current image (operation 2156), and may include applying the transform including least squares minimization of differences between two or more fiducial locations in the three dimensional medical image and two or more fiducial locations in the current image (operation 2158).

Referring to FIG. 1(a)(1) and FIG. 1(a)(2), in some embodiments, the applying hardware/software/firmware 1004 included in the processing apparatus 1000 may apply the transform including substantial minimization of a function of two or more fiducial locations in the three dimensional medical image and two or more fiducial locations in the current image (operation 2156), and may apply the transform including least squares minimization of differences between two or more fiducial locations in the three dimensional medical image and two or more fiducial locations in the current image (operation 2158).

A transform including substantial minimization of a function of two or more fiducial locations may include a transform of a function formed from substantial minimization of a function of the two or more fiducial locations. For example, in some embodiments, a transform including substantial minimization of a function of two or more fiducial locations may include a transform of a function formed from substantial minimization of a function of the two or more fiducial locations identified, for example, by a radiopaque material, in a human brain. Substantial minimization of a function may include estimating the function by substantially minimizing the difference between the function and other information, such as empirical or theoretical information, such as empirical or theoretical brain image information.

A transform including least squares minimization of difference between two or more fiducial locations may include a transform of a function formed from the least squares minimization of the difference between two or more fiducial locations. For example, in some embodiments, a transform including a least squares minimization of difference between two fiducial locations may include a transform of a function formed from the least squares minimization of the difference between two or more fiducial locations, such as hydrogel dots, included in a human brain. A least squares minimization may include a graph that ensures the least value of the sum of the squares of the deviation between the fitted curve and each of the original data points.

FIG. 2(a)(28) shows a flow diagram of the method 2124, illustrated within the context of method 2000 as shown in FIG. 2(a)(1), wherein applying the transform to the three-dimensional medical image to form a present image (operation 2004), may include applying the transform including a transform including stress and strain information obtained from observing how an elastic wave moves through the current image to form a present image (operation 2162), and may include applying the transform including a transform including stress and strain information obtained from observing how an elastic wave moves from one or more arteries into distal tissue in response to natural brain pulses to form a present image (operation 2164).

Referring to FIG. 1(a)(1) and FIG. 1(a)(2), in some embodiments, the applying hardware/software/firmware 1004 included in the processing apparatus 1000 may apply the transform including a transform including stress and strain information obtained from observing how an elastic wave moves through the current image to form a present image (operation 2162), and may apply the transform including a transform including stress and strain information obtained from observing how an elastic wave moves from one or more arteries into distal tissue in response to natural brain pulses to form a present image (operation 2164).

A transform may include stress and strain information obtained from observing how an elastic wave moves through the current image. Stress information may include information related to one or more forces which when applied to a body deform or strain the body. For example, stress information may include information related to one or more forces which when applied to a human brain deform or strain the human brain. In some embodiments, a transform may include stress and strain information obtained from observing how an elastic wave moves through the current image of an organ, such as a brain, heart, or kidney.

A transform may include stress and strain information obtained from observing how an elastic wave moves from one or more arteries into distal tissue in response to natural brain pulses. Arteries may include blood vessels that carry blood away from the heart. Tissue may include biological cells that perform the same function. For example, brain tissue may include cells that perform similar functions. Distal tissue may include tissue located far from a point of reference. For example, for an artery located on one side of the brain, distal tissue may be located on the substantially opposite side of the brain. Natural brain pulses may include mechanical pulses induced through natural processes such as pumping blood.

In some embodiments, a predictive transformation algorithm based on historical, structural modeling, cyclical stress and strain information and defined inputs, such as retractor blades may be used. For example, a predictive transformation algorithm based on historical, structural modeling of a human brain, cyclical stress and strain information derived empirically or through modeling of the human brain, and defined inputs, such as retractor blades located in the brain may be used.

FIG. 2(a)(29) shows a flow diagram of the method 2124, illustrated within the context of method 2000 as shown in FIG. 2(a)(1), and further including applying the transform including information related to one or more retractor locations in the current image to the three-dimensional image to form the present image (operation 2168) in accordance with some embodiments.

Referring to FIG. 1(a)(1) and FIG. 1(a)(2), in some embodiments, the applying hardware/software/firmware 1004 included in the processing apparatus 1000 may apply the transform including information related to one or more retractor locations in the current image to the three-dimensional image to form the present image (operation 2168) in accordance with some embodiments.

A retractor may include instruments to hold back organs or edges of an incision. In some embodiments, a retractor may be used in connection with brain surgery. A retractor included in a medical image may include medical image location information. Medical image location information may include location information in a coordinate system that includes a retractor having coordinates. In some embodiments, a transform may include information related to one or more retractor locations in a medical image.

FIG. 2(a)(30) shows a flow diagram of a method 2170, illustrated within the context of method 2124 as shown in FIG. 2(a)(30), and further including modifying the transform if the two or more fiducial locations in the present image differ from the two or more fiducial locations in the current image (operation 2172).

Referring to FIG. 1(a)(1) and FIG. 1(a)(2), in some embodiments, the modifying hardware/software/firmware 1008 included in the processing apparatus 1000 may modify the transform if the two or more fiducial locations in the present image differ from the two or more fiducial locations in the current image (operation 2172).

FIG. 2(a)(31) shows a flow diagram of a method 2174, illustrated within the context of method 2000 as shown in FIG. 2(a)(1), and further including forming a time series of images corresponding to two or more instances of the present image (operation 2176), and extrapolating the time series of images forward to a future time to form a future time image (operation 2178).

Referring to FIG. 1(a)(1) and FIG. 1(a)(2), in some embodiments, the forming and extrapolating hardware/software/firmware 1010 included in the processing apparatus 1000 may form a time series of images corresponding to two or more instances of the present image (operation 2176), and may extrapolate the time series of images forward to a future time to form a future time image (operation 2178).

A time series of images may include a series of images formed at different times that includes two or more images corresponding to two or more instances of a present image. In some embodiments, a time series may be extrapolated forward to a future time to form a future time image. A future time image may include an image not previously formed. Extrapolation may include projecting known image information to estimate unknown image information. The time between images is not limited to a particular amount of time.

In some embodiments, the time between images may be on the order of seconds. In some embodiments, the time between images may be on the order of nanoseconds. Exemplary images suitable for use in forming times series may include human organ images, for example, brain images, kidney images, lung images, and heart images.

FIG. 2(a)(32) shows a flow diagram of a method 2180, illustrated within the context of method 2174 as shown in FIG. 2(a)(31), and further including gravity in the extrapolating the time series of images forward to the future time (operation 2182).

Referring to FIG. 1(a)(1) and FIG. 1(a)(2), in some embodiments, the forming and extrapolating hardware/software/firmware 1010 included in the processing apparatus 1000 may include gravity and may extrapolate the time series of images forward to the future time (operation 2182). Gravity is an exemplary force that may be included in extrapolating a time series of images forward to a future time.

FIG. 2(a)(33) shows a flow diagram of a method 2184, illustrated within the context of method 2180 as shown in FIG. 2(a)(32), and further including dynamics in the extrapolating the time series of images forward to the future time (operation 2186).

Referring to FIG. 1(a)(1) and FIG. 1(a)(2), in some embodiments, the forming and extrapolating hardware/software/firmware 1010 included in the processing apparatus 1000 may include dynamics and may extrapolate the time series of images forward to the future time (operation 2186). Forces included in dynamics may be included in extrapolating a time series of images forward to the future time.

FIG. 2(a)(34) shows a flow diagram of a method 2188, illustrated within the context of method 2000 as shown in FIG. 2(a)(1), and further including forming a time series of images corresponding to two or more instances of the present image (operation 2190), and interpolating the time series of images to an intermediate time to form an intermediate time image (operation 2192).

Referring to FIG. 1(a)(1) and FIG. 1(a)(2), in some embodiments, the forming and interpolating hardware/software/firmware 1012 included in the processing apparatus 1000 may form time series of images corresponding to two or more instances of the present image (operation 2190), and may interpolate the time series of images to an intermediate time to form an intermediate time image (operation 2192).

A time series of images may include a series of images formed at different times that includes two or more images corresponding to two or more instances of a present image. In some embodiments, a time series may be interpolated to an intermediate time to form an intermediate time image. Interpolation includes forming an image between two different time images. The time between images is not limited to a particular amount of time. In some embodiments, the time between images may be on the order of seconds. In some embodiments, the time between images may be on the order of nanoseconds. Exemplary images suitable for use in forming time series may include human organ images, for example, brain images, kidney images, lung images, and heart images.

FIG. 2(a)(35) shows a flow diagram of a method 2194, illustrated within the context of method 2000 as shown in FIG. 2(a)(1), and further including forming a time series of images corresponding to two or more instances of the present image (operation 2196), and extrapolating the time series of images backward to a previous time to form a previous time image (operation 2198).

Referring to FIG. 1(a)(1) and FIG. 1(a)(2), in some embodiments, the forming and extrapolating hardware/software/firmware 1010 included in the processing apparatus 1000 may form a time series of images corresponding to two or more instances of the present image (operation 2196), and may extrapolate the time series of images backward to a previous time to form a previous time image (operation 2198).

A time series of images may include a series of images formed at different times that includes two or more images corresponding to two or more instances of a present image. In some embodiments, a time series may be extrapolated backward to a previous time to form a previous time image. Extrapolation may include projecting known image information to estimate unknown image information. A previous time image includes an image not included in the in two or more instances of a present image. The time between images is not limited to a particular amount of time. In some embodiments, the time between images may be on the order of seconds. In some embodiments, the time between images may be on the order of nanoseconds. Exemplary images suitable for use in forming time series may include human or organ images, for example, brain images, kidney images, lung images, and heart images.

FIG. 2(a)(36) shows a flow diagram of a method 2200, illustrated within the context of method 2000 as shown in FIG. 2(a)(1), and further including issuing a command to display the present image (operation 2202).

Referring to FIG. 1(a)(1) and FIG. 1(a)(2), in some embodiments, the issuing hardware/software/firmware 1011 included in the processing apparatus 1000 may issue a command to display the present image (operation 2202).

Exemplary display devices include monitors and display screens. Exemplary monitors and display screens include plasma monitors and display screens, liquid crystal monitor and display screens, and cathode ray tube monitors and display screens.

FIG. 2(a)(37) shows a flow diagram of a method 2204 suitable for use in connection with the processing apparatus 1000 as shown in FIG. 1(a)(1) and FIG. 1(a)(2), in accordance with some embodiments. The method 2204 may include processing two or more fiducials included in a three-dimensional tissue image and included in a current tissue image to generate two or more transform coefficients of a transform (operation 2006), and may include applying the transform to the three-dimensional tissue image to form a present tissue image (operation 2008).

Referring to FIG. 1(a)(1) and FIG. 1(a)(2), in some embodiments, the processing hardware/software/firmware 1002 included in the processing apparatus 1000 may process two or more fiducials included in a three-dimensional tissue image and included in a current tissue image to generate two or more transform coefficients of a transform (operation 2006).

Referring again to FIG. 1(a)(1) and FIG. 1(a)(2), in some embodiments, the applying hardware/software/firmware 1004 included in the processing apparatus 1000 may apply the transform to the three-dimensional tissue image to form a present tissue image (operation 2008).

An image may include a representation of an object formed from electronic images of atoms or molecular structures, such as atoms or structures included in human cells, tissue, or organs. A tissue image may include an image of biological material, such as a collection of similar cells, for example; liver cells, kidney cells, heart cells, lung cells, muscle cells, brain cells, and retinal cells.

FIG. 2(a)(38) shows a flow diagram of a method 2210 suitable for use in connection with the processing apparatus 1000 as shown in FIG. 1(a)(1) and FIG. 1(a)(2), in accordance with some embodiments. The method 2210 may include processing two or more fiducials included in a three-dimensional brain image and included in a current brain image to generate two or more transform coefficients of a transform (operation 2212), and applying the transform to the three-dimensional tissue image to form a present brain image (operation 2214).

Referring to FIG. 1(*a*)(1) and FIG. 1(*a*)(2), in some embodiments, the processing hardware/software/firmware 1002 included in the processing apparatus 1000 may process two or more fiducials included in a three-dimensional brain image and included in a current brain image to generate two or more transform coefficients of a transform (operation 2212).

Referring again to FIG. 1(*a*)(1) and FIG. 1(*a*)(2), in some embodiments, the applying hardware/software/firmware 1004 included in the processing apparatus 1000 may apply the transform to the three-dimensional tissue image to form a present brain image (operation 2214).

An image may include a representation of an object formed from electronic images of atoms or molecular structures, such as atoms or structures included in human cells, tissue, and organs. A human brain is one exemplary embodiment of an object for which an image may be formed.

A brain image may include an image of a portion of a nervous system included in a protective enclosure, such as a cranium. The nervous system may include cells, tissue, and organs that regulate a body's responses to internal and external stimuli. In some vertebrates, the nervous system may include the brain, spinal cord, nerves, and ganglia.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiments several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

What is claimed is:

1. A system, comprising:
    circuitry configured for obtaining a predictive transform based at least partially on (i) structural modeling of a brain, (ii) cyclical stress and strain information associated with at least one observation at a first side of the brain and at least one observation at a substantially opposite side of the brain, and (iii) at least one input related to one or more retractors located in the brain, the circuitry configured for obtaining a predictive transform including at least:
        circuitry configured for processing two or more fiducials included in a three-dimensional image of the brain and included in a current image to generate two or more transform coefficients of the predictive transform,
        wherein at least one transform coefficient of the two or more transform coefficients is at least partially derived from the at least one observation at a first side of the brain and at least another transform coefficient of the two or more transform coefficients is at least partially derived from the at least one observation at a substantially opposite side of the brain, and
        wherein at least one fiducial location in the current image differs from a corresponding fiducial location in the three-dimensional medical image;
    circuitry configured for applying the predictive transform to the three-dimensional image to form a present image; and
    circuitry configured for forming a time series of images corresponding to two or more instances of the present image, including at least one of extrapolating the time series of images forward to a future time, extrapolating the time series of images backward to a previous time, or interpolating the time series of images to an intermediate time.

2. A system, comprising:
    circuitry configured for obtaining a predictive transform associated with an object, the object including one or more of at least some cells, at least some tissue, or at least one organ, based at least partially on (i) structural modeling of the object, (ii) cyclical stress and strain information associated with at least one observation at a reference point with respect to the object and at least one observation at a distal point, and (iii) at least one input related to one or more medical instruments located in the object, the circuitry configured for obtaining a predictive transform including at least:
        circuitry configured for processing two or more fiducials included in a three-dimensional image of the object and included in a current image to generate two or more transform coefficients of the predictive transform,
        wherein at least one transform coefficient of the two or more transform coefficients is at least partially derived from the at least one observation at a reference point with respect to the object and at least another transform coefficient of the two or more transform coefficients is at least partially derived from the at least one observation at a distal point; and
    circuitry configured for applying the predictive transform to the three-dimensional image to form a present image.

3. The system of claim 2, wherein circuitry configured for processing two or more fiducials included in a three-dimensional image of the object and included in a current image to generate two or more transform coefficients of the predictive transform comprises:

circuitry configured for processing two or more three-dimensional image blood vessel locations included in the three-dimensional image of the object and processing two or more current image blood vessel locations included in the current image to generate the two or more transform coefficients.

4. The system of claim 2, wherein circuitry configured for processing two or more fiducials included in a three-dimensional image of the object and included in a current image to generate two or more transform coefficients of the predictive transform comprises:

circuitry configured for processing two or more three-dimensional image post locations included in the three-dimensional image of the object and processing two or more current image post locations included in the current image to generate the two or more transform coefficients.

5. The system of claim 2, wherein circuitry configured for processing two or more fiducials included in a three-dimensional image of the object and included in a current image to generate two or more transform coefficients of the predictive transform comprises:

circuitry configured for processing two or more three-dimensional image dot images, formed from a biodegradable marker included in the three-dimensional image of the object, and processing two or more current image dot images, formed from the biodegradable marker included in the current image to generate the two or more transform coefficients.

6. The system of claim 2, wherein circuitry configured for processing two or more fiducials included in a three-dimensional image of the object and included in a current image to generate two or more transform coefficients of the predictive transform comprises:

circuitry configured for processing two or more three-dimensional image dot images, formed from a contrast enhancing material, in a three-dimensional image including at least the object and processing two or more current image dot images, formed from the contrast enhancing material, in a current image including at least the object to generate the two or more transform coefficients.

7. The system of claim 2, wherein circuitry configured for processing two or more fiducials included in a three-dimensional image of the object and included in a current image to generate two or more transform coefficients of the predictive transform comprises:

circuitry configured for processing two or more three-dimensional image fiducial locations formed to substantially outline an anatomical feature included in the three-dimensional image of the object and processing two or more current image fiducial locations formed to substantially outline the anatomical feature included in the current image to generate the two or more transform coefficients.

8. The system of claim 2, wherein circuitry configured for processing two or more fiducials included in a three-dimensional image of the object and included in a current image to generate two or more transform coefficients of the predictive transform comprises:

circuitry configured for processing two or more three-dimensional fiducial locations substantially defined by two or more enhanced fluorescence bead images included in the three-dimensional image of the object and processing two or more current image fiducial locations substantially defined by the two or more enhanced fluorescence bead images included in the current image to generate the two or more transform coefficients.

9. The system of claim 2, wherein circuitry configured for processing two or more fiducials included in a three-dimensional image of the object and included in a current image to generate two or more transform coefficients of the predictive transform comprises:

circuitry configured for processing two or more three-dimensional fiducial locations substantially defined by two or more tantalum compound bead images included in the three-dimensional image of the object and processing two or more current image fiducial locations substantially defined by the two or more tantalum compound bead images included in the current image to generate the two or more transform coefficients.

10. The system of claim 2, wherein circuitry configured for processing two or more fiducials included in a three-dimensional image of the object and included in a current image to generate two or more transform coefficients of the predictive transform comprises:

circuitry configured for processing two or more three-dimensional fiducial locations substantially defined by two or more enhanced x-ray marker images included in the three-dimensional image of the object and processing two or more current image fiducial locations substantially defined by the two or more enhanced x-ray marker images included in the current image to generate the two or more transform coefficients.

11. The system of claim 2, wherein circuitry configured for applying the predictive transform to the three-dimensional image to form a present image comprises:

circuitry configured for applying the predictive transform including at least an affine transform to the three-dimensional image to form the present image.

12. The system of claim 2, wherein circuitry configured for applying the predictive transform to the three-dimensional image to form a present image comprises:

circuitry configured for applying the predictive transform including at least a volume harmonic transform to the three-dimensional image to form the present image.

13. The system of claim 2, wherein circuitry configured for applying the predictive transform to the three-dimensional image to form a present image comprises:

circuitry configured for applying the predictive transform including at least an elasticity and modulus transform that includes elasticity and modulus information to form the present image.

14. The system of claim 2, wherein circuitry configured for applying the predictive transform to the three-dimensional image to form a present image comprises:

circuitry configured for applying the predictive transform including at least substantial minimization of a function of two or more fiducial locations in the three dimensional image and two or more fiducial locations in the current image.

15. The system of claim 2, wherein circuitry configured for applying the predictive transform to the three-dimensional image to form a present image comprises:

circuitry configured for applying the predictive transform including at least a transform including stress and strain information obtained from observing how an elastic wave moves through the current image to form the present image.

16. The system of claim 2, wherein circuitry configured for applying the predictive transform to the three-dimensional image to form a present image comprises:
   circuitry configured for applying the predictive transform including at least information related to the one or more locations of the one or more medical instruments in the current image to the three-dimensional image to form the present image.

17. The system of claim 2, further comprising:
   circuitry configured for forming a time series of images corresponding to two or more instances of the present image including at least one of extrapolating the time series of images forward to a future time, extrapolating the time series of images backward to a previous time, or interpolating the time series of images to an intermediate time.

18. The system of claim 17, wherein circuitry configured for forming a time series of images corresponding to two or more instances of the present image including at least one of extrapolating the time series of images forward to a future time, extrapolating the time series of images backward to a previous time, or interpolating the time series of images to an intermediate time comprises:
   circuitry configured for forming a time series of images wherein at least some of the time series of images depict an effect of one or more forces that strain or deform an organ including at least gravity.

19. The system of claim 17, wherein circuitry configured for forming a time series of images corresponding to two or more instances of the present image including at least one of extrapolating the time series of images forward to a future time, extrapolating the time series of images backward to a previous time, or interpolating the time series of images to an intermediate time comprises:
   circuitry configured for forming a time series of images wherein at least some of the time series of images depict an effect of one or more forces that strain or deform an organ including at least dynamics.

20. The system of claim 17, wherein circuitry configured for forming a time series of images corresponding to two or more instances of the present image including at least one of extrapolating the time series of images forward to a future time, extrapolating the time series of images backward to a previous time, or interpolating the time series of images to an intermediate time comprises:
   circuitry configured for interpolating the time series of images to an intermediate time to form an intermediate time image.

21. The system of claim 17, wherein circuitry configured for forming a time series of images corresponding to two or more instances of the present image including at least one of extrapolating the time series of images forward to a future time, extrapolating the time series of images backward to a previous time, or interpolating the time series of images to an intermediate time comprises:
   circuitry configured for extrapolating the time series of images backward to a previous time to form a previous time image.

22. The system of claim 2, further comprising:
   circuitry configured for issuing a command to display the present image.

23. A system comprising:
   circuitry configured for obtaining a predictive transform based at least partially on (i) structural modeling of a brain, (ii) cyclical stress and strain information associated with at least one observation at a first side of the brain and at least one observation at an opposite side of the brain, and (iii) at least one input related to one or more retractor blades located in the brain, the circuitry configured for obtaining a predictive transform including at least:
   circuitry configured for processing two or more fiducials included in a three-dimensional image of the brain and included in a current image to generate two or more transform coefficients of the predictive transform,
   wherein at least one transform coefficient of the two or more transform coefficients is at least partially derived from the at least one observation at a first side of the brain and at least another transform coefficient of the two or more transform coefficients is at least partially derived from at least one observation at an opposite side of the brain, and wherein at least one fiducial location in the current image differs from a corresponding fiducial location in the three-dimensional medical image;
   circuitry configured for applying the predictive transform to the three-dimensional image to form a present image; and
   circuitry configured for forming a time series of images corresponding to two or more instances of the present image, including at least one of extrapolating the time series of images forward to a future time, extrapolating the time series of images backward to a previous time, or interpolating the time series of images to an intermediate time.

24. A system, comprising:
   circuitry configured for obtaining a predictive transform based at least partially on (i) structural modeling of a brain, (ii) cyclical stress and strain information associated with at least one observation at a first side of the brain and at least one observation at an opposite side of the brain, and (iii) at least one input related to one or more retractor blades located in the brain, including at least:
   processing two or more fiducials included in a three-dimensional image of the brain and included in a current image to generate two or more transform coefficients of the predictive transform,
   wherein at least one transform coefficient of the two or more transform coefficients is at least partially derived from the at least one observation at a first side of the brain and at least another transform coefficient of the two or more transform coefficients is at least partially derived from the at least one observation at an opposite side of the brain, and
   wherein at least one fiducial location in the current image differs from a corresponding fiducial location in the three-dimensional image; and
   apply the predictive transform to the three-dimensional image to form a present image.

25. The system of claim 2, wherein circuitry configured for processing two or more fiducials included in a three-dimensional image of the object and included in a current image to generate two or more transform coefficients of the predictive transform comprises:
   circuitry configured for selecting the three-dimensional medical image from a volume in three-dimensional space.

26. A system, comprising:
   circuitry configured for obtaining a predictive transform based at least partially on (i) structural modeling of a brain, (ii) cyclical stress and strain information associated with at least one observation at a first side of the brain and at least one observation at a substantially opposite side of the brain, and (iii) at least one input related to one or more medical instruments located in the brain, the circuitry configured for obtaining a predictive transform including at least:

circuitry configured for processing two or more fiducials included in a three-dimensional image of the brain and included in a current image to generate two or more transform coefficients of the predictive transform, wherein at least one transform coefficient of the two or more transform coefficients is at least partially derived from the at least one observation at a first side of the brain and at least another transform coefficient of the two or more transform coefficients is at least partially derived from at least one observation at an opposite side of the brain; and circuitry configured for applying the predictive transform to the three-dimensional image to form a present image.

27. A system, comprising:

circuitry configured to obtain for obtaining a predictive transform based at least partially on (i) structural modeling of a brain, (ii) cyclical stress and strain information associated with at least one observation at a reference point with respect to the brain and at least one observation at a distal point, and (iii) at least one input related to one or more medical instruments located in the brain, the circuitry configured for obtaining a predictive transform including at least:

circuitry configured for processing two or more fiducials included in a three-dimensional image of the brain and included in a current image to generate two or more transform coefficients of the predictive transform, wherein at least one transform coefficient of the two or more transform coefficients is at least partially derived from the at least one observation at a reference point with respect to the brain and at least another transform coefficient of the two or more transform coefficients is at least partially derived from the at least one observation at a distal point; and circuitry configured for applying the predictive transform to the three-dimensional medical image to form a present image.

28. The system of claim 2, wherein circuitry configured for processing two or more fiducials included in a three-dimensional image of the object and included in a current image to generate two or more transform coefficients of the predictive transform comprises:

circuitry configured for processing two or more fiducials included in a three-dimensional image of the object and included in a current image to generate two or more numerical values suitable for use in connection with the transform.

29. The system of claim 2, wherein circuitry configured for processing two or more fiducials included in a three-dimensional image of the object and included in a current image to generate two or more transform coefficients of the predictive transform comprises:

circuitry configured for processing two or more fiducials included in a three-dimensional image and included in a current image to generate two or more complex numerical values suitable for use in connection with the transform, at least some of the complex numerical values having at least a real value and an imaginary value.

30. The system of claim 2, wherein circuitry configured for applying the predictive transform to the three-dimensional image to form a present image comprises:

circuitry configured for applying the predictive transform to a first three-dimensional image to form a second three-dimensional image.

31. The system of claim 2, wherein circuitry configured for processing two or more fiducials included in a three-dimensional image of the object and included in a current image to generate two or more transform coefficients of the predictive transform comprises:

circuitry configured for processing fiducial locations selected to substantially outline at least one anatomical feature, wherein the size of the at least one anatomical feature included in the three-dimensional image differs from the size of the at least one anatomical feature in the current image.

32. The system of claim 17, wherein circuitry configured for forming a time-series of images corresponding to two or more instances of the present image including at least one of extrapolating the time series of images forward to a future time, extrapolating the time-series of images backward to a previous time, or interpolating the time series of images to an intermediate time comprises:

circuitry configured for extrapolating the time series of images forward to a future time to form a future time image.

33. The system of claim 2, wherein circuitry configured for applying the predictive transform to the three-dimensional image to form a present image comprises:

circuitry configured for applying the predictive transform including at least applying one or more separate transforms to one or more separate portions of the three-dimensional image to form the present image.

34. The system of claim 33, wherein circuitry configured for applying the predictive transform including at least applying one or more separate transforms to one or more separate portions of the three-dimensional image to form the present image comprises:

circuitry configured for applying the predictive transform including at least applying a first type of transform to at least a first portion of the three-dimensional image and applying a second type of transform to at least a second portion of the three-dimensional image to form the present image.

35. The system of claim 2, wherein circuitry configured for obtaining a predictive transform associated with an object, the object including one or more of at least some cells, at least some tissue, or at least one organ, based at least partially on (i) structural modeling of the object, (ii) cyclical stress and strain information associated with at least one observation at a reference point with respect to the object and at least one observation at a distal point, and (iii) at least one input related to one or more medical instruments located in the object comprises:

circuitry configured for obtaining a predictive transform based at least partially on at least one input related to one or more medical instruments located in the object, the one or more medical instruments associated with location information in a coordinate system that at least includes a retractor having coordinates.

36. The system of claim 2, wherein circuitry configured for obtaining a predictive transform associated with an object, the object including one or more of at least some cells, at least some tissue, or at least one organ, based at least partially on (i) structural modeling of the object, (ii) cyclical stress and strain information associated with at least one observation at a reference point with respect to the object and at least one observation at a distal point, and (iii) at least one input related to one or more medical instruments located in the object comprises:

circuitry configured for obtaining a mathematical predictive transform based at least partially on (i) structural modeling of the object, (ii) cyclical stress and strain information associated with at least one observation at a reference point with respect to the object and at least one observation at a distal point, and (iii) at least one input related to one or more medical instruments located in the object.

37. The system of claim 2, wherein circuitry configured for obtaining a predictive transform associated with an object, the object including one or more of at least some cells, at least some tissue, or at least one organ, based at least partially on (i) structural modeling of the object, (ii) cyclical stress and strain information associated with at least one observation at a reference point with respect to the object and at least one observation at a distal point, and (iii) at least one input related to one or more medical instruments located in the object comprises:

circuitry configured for obtaining a predictive affine transform based at least partially on (i) structural modeling of the object, (ii) cyclical stress and strain information associated with at least one observation at a reference point with respect to the object and at least one observation at a distal point, and (iii) at least one input related to one or more medical instruments located in the object.

38. The system of claim 2, wherein circuitry configured for obtaining a predictive transform associated with an object, the object including one or more of at least some cells, at least some tissue, or at least one organ, based at least partially on (i) structural modeling of the object, (ii) cyclical stress and strain information associated with at least one observation at a reference point with respect to the object and at least one observation at a distal point, and (iii) at least one input related to one or more medical instruments located in the object comprises:

circuitry configured for obtaining a predictive transform operable to account for an effect of one or more natural brain pulses in the transform.

\* \* \* \* \*